United States Patent
Kasi et al.

(10) Patent No.: US 10,503,630 B2
(45) Date of Patent: Dec. 10, 2019

(54) METHOD AND SYSTEM FOR TEST-EXECUTION OPTIMIZATION IN AN AUTOMATED APPLICATION-RELEASE-MANAGEMENT SYSTEM DURING SOURCE-CODE CHECK-IN

(71) Applicant: VMWARE, INC., Palo Alto, CA (US)

(72) Inventors: Thangamani Kasi, Bangalore (IN); Sriram Balasubramanian, Bangalore (IN); Narayanasamy Ramesh, Bangalore (IN); Nishant Shreshth, Bangalore (IN); Praveen Rudrappa, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 274 days.

(21) Appl. No.: 15/404,210

(22) Filed: Jan. 12, 2017

(65) Prior Publication Data
US 2018/0060216 A1    Mar. 1, 2018

(30) Foreign Application Priority Data

Aug. 31, 2016   (IN) .............................. 201641029710

(51) Int. Cl.
*G06F 11/36* (2006.01)
*G06F 11/00* (2006.01)

(52) U.S. Cl.
CPC .......... *G06F 11/3636* (2013.01); *G06F 11/00* (2013.01); *G06F 11/3684* (2013.01)

(58) Field of Classification Search
CPC .. G06F 11/3688; G06F 11/3684; G06F 11/07; G06F 11/3636

USPC .......................................... 717/100, 124–135
See application file for complete search history.

(56) References Cited

U.S. PATENT DOCUMENTS

| | | | |
|---|---|---|---|
| 6,694,509 B1 * | 2/2004 | Stoval ................. | G06F 11/3688 707/999.202 |
| 7,490,319 B2 * | 2/2009 | Blackwell ........... | G06F 11/3664 717/124 |
| 8,745,589 B2 * | 6/2014 | Arumugham ......... | G06F 11/368 717/125 |
| 8,806,450 B1 * | 8/2014 | Maharana ........... | G06F 11/3688 717/133 |
| 9,329,978 B2 * | 5/2016 | Kadishay .............. | G06F 11/368 |
| 9,792,443 B1 * | 10/2017 | Sheridan ............... | G06F 21/577 |
| 9,880,924 B2 * | 1/2018 | Peck .................... | G06F 11/3696 |
| 2011/0161936 A1* | 6/2011 | Huang ................ | G06F 11/3688 717/130 |

(Continued)

*Primary Examiner* — Marina Lee

(74) *Attorney, Agent, or Firm* — Clayton, McKay & Bailey, PC

(57) ABSTRACT

The current document is directed to a subsystem that is incorporated, in one implementation, within an automated application-release-management system. The subsystem to which the current document is directed determines, based on modifications to the source code for an application or another system that are submitted through a check-in process, a subset of tests within a large set of tests developed to test the application or system that invoke routines or other compilation units affected by the submitted source-code modifications. Only those tests that invoke routines and other compilation units affected by the source-code submissions need then be applied during testing and verification of the revised application or system.

20 Claims, 46 Drawing Sheets

(56) References Cited

U.S. PATENT DOCUMENTS

| | | | |
|---|---|---|---|
| 2012/0030651 A1* | 2/2012 | Kemmler | G06F 11/3688 717/124 |
| 2016/0246709 A1* | 8/2016 | Peck | G06F 11/3696 |
| 2017/0075789 A1* | 3/2017 | Skinner | G06F 11/3664 |
| 2018/0060216 A1* | 3/2018 | Kasi | G06F 11/3684 |

* cited by examiner

| | | |
|---|---|---|
| 1402 — Start Workflow | The starting point of the workflow. All workflows contain this element. A workflow can have only one start element. Start elements have one output and no input, and cannot be removed from the workflow schema. |  |
| 1408 — Scriptable task | General purpose tasks you define. You write JavaScript functions in this element. |  |
| 1406 — Decision | A boolean function. Decision elements take one input parameters and return either true or false. The type of decision that the element makes depends on the type of the input parameter. Decision elements let the workflow branch into different directions, depending on the input parameter the decision element receives. If the received input parameter corresponds to an expected value, the workflow continues along a certain route. If the input is not the expected value, the workflow continues on an alaternative path. |  |
| 1407 — Custom decision | A boolean function. Custom decisions can take several input parameters and process them according to custom scripts. Returns either true or false. |  |
| Decision activity | A boolean function. A decision activity runs a workflow and binds its output parameters to a true or a false path. |  |
| 1410 — User interaction | Lets users pass new input parameters to the workflow. You can design how the user interaction element presents the request for input parameters and place constraints on the parameters that users can provide. You can set permissions to determine which users can provide the input parameters. When a running workflow arrives at a user interaction element, it enters a passive state and prompts the user for input. You can set a timeout period within which the users must provide input. The workflow resumes according to the data the user passes to it, or returns an exception if the timeout period expires. While it is waiting for the user to respond, the workflow token is in the waiting. |  |
| 1412 — Waiting timer | Used by long-running workflows. When a running workflow arrives at a Waiting Timer element, it enters a passive state. You set an abosoulte date at which the workflow resumes running. While it is waiting for the date, the workflow token is in the waiting-signal state. |  |
| 1413 — Waiting event | Used in long-running workflows. When a running workflow arrives at a Waiting Event element, it enters a passive state. You define a trigger event that the workflow awaits before it resumes running. While it is waiting for the event, the workflow token is in the waiting-signal state. |  |
| 1404 — End workflow | The end point of a workflow. You can have multiple end elements in a schema, to represent the various possible outcomes of the workflow. End elements have one input with no output. When a workflow reaches an End Workflow element, the workflow token enters the completed state. |  |

FIG. 14A

| | | | |
|---|---|---|---|
| 1414 | Thrown exception | Creates an exception and stops the workflow. Multiple occurrences of this element can be present in the workflow schema. Exception elements have one input parameters, which can only be of the String type, and have no output parameter. When a workflow reaches an Exception element, the workflow token enters the failed state. |  |
| 1426 | Workflow note | Lets you annotate sections of the workflow. You can stretch notes to delineate sections of the workflow. You can change the background color to the notes to differentiate workflow zones. Workflow notes provide only visual information, to help you understand the schema. |  |
| 1424 | Action element | Calls on an action from the Orchestrator libraries of action. When a workflow reaches an action element, it calls and runs that action. |  |
| 1422 | Workflow element | Starts another workflow synchronously. When a workflow reaches a Workflow element in its schema, it runs that workflow as part of its own process. The original workflow continues only after the called workflow completes its run. |  |
| 1420 | Foreach element | Runs a workflow on every element from an array. For example, you can run the Rename Virtual Machine workflow on all virtual machines from a folder. |  |
| 1423 | Asynchronous workflow | Starts a workflow asynchronously. When a workflow reaches an asynchronous workflow element, it starts that workflow and continues its own run. The original workflow does not wait for the called workflow to complete. |  |
| 1428 | Schedule workflow | Create a task to run the workflow at a set time, and then the workflow continues its run. |  |
| 1429 | Nested workflows | Starts several workflows simultaneously. You can choose to nest local workflows and remote workflows that are in a different Orchestrator server. You can also run workflows with different credentials. The workflow waits for all the nested workflows to complete before continuing its run. |  |
| 1415 | Handle error | Handles an error for a specific workflow element. The workflow can handle the error by creating an exception, calling another workflow, or running a custom script. |  |
| 1416 | Default error handler | Handles workflow errors that are not caught by standard error handlers. You can use any available scheme elements to handle errors. |  |
| 1418 | Switch | Switches to alternative workflow paths, based on workflow attribute or parameter. |  |

FIG. 14B

| Server Role | Inbound Ports | Service/System Outbound Ports |
|---|---|---|
| vCloud Automation Center | | |
| vCenter Single Sign-On | 7444 | LDAP: 389<br>LDAPS: 636<br>vCenter Single Sign-On: 11711, 11712, 12721 |
| vCloud Automation Center virtual Appliance (VA) | 443, 5432*, 5672* | vCenter Single Sign-On Load Balancer: 7444<br><br>vCloud Automation Center virtual appliances (VA): 5432, 5672*<br><br>vCloud Automation Center Infrastructure Web Load Balancer: 443<br><br>vCloud Orchestrator Load Balancer: 8281<br><br>*This is a communication requirement between clustered vCAC virtual appliances. |
| Infrastructure Web Server | 135, 443, 1024-65535* | vCenter Single Sign-On Load Balancer: 7444<br>vCloud Automation Center virtual appliance Load Balancer: 443<br>MSSQL: 135, 1433, 1024-65535* |
| Infrastructure Manager Server | 135, 443, 1024-65535* | vCloud Automation Center Infrastructure Web Load Balancer: 443<br>MSSQL: 135, 1433, 1024-65535* |
| Infrastructure DEM Server | NA | vCenter Single Sign-On Load Balancer: 7444<br><br>vCloud Automation Center virtual appliance Load Balancer: 443<br><br>vCloud Automation Center Infrastructure Web Load Balancer: 443<br><br>vCloud Automation Center Infrastructure Manager Load Balancer: 443 |
| Infrastructure Agent Server | NA | vCloud Automation Center Infrastructure Web Load Balancer: 443<br><br>vCloud Automation Center Infrastructure Manager Load Balancer: 443 |
| MSSQL Database Server | 135, 1433, 1024-65535* | Infrastructure Web Server: 135, 1024-65535*<br><br>Infrastructure Management Server: 135, 1024-65535* |
| | Do not change or block these ports: | |
| vCloud Application Services Server | 8443 HTTPS User Interface connection<br><br>8080 HTTP (legacy port, do not use) | vCenter Single Sign-On: 1433<br><br>vCloud Automation Center virtual appliance Load Balancer: 443<br><br>vCloud Automation Center Infrastructure Web Load Balancer: 443 |
| vFabric RabbitMQ | 5671 AMQP over SSL | |
| External SSH connection | 22 | |
| Content Server | 80 HTTP (used to host OOB content, agent binary, and CLI binary) | |
| IT Business Management Suite Standard Edition Server | | vCenter Single Sign-On: 1433<br><br>vCloud Automation Center virtual appliance Load Balancer: 443<br><br>vCloud Automation Center Infrastructure Web Load Balancer: 443 |
| IT Business Management Suite Standard Edition UI connection | 443 HTTPS | |
| External SSH connection | 22 | |
| Web console access (VAMI) | 5480 | |

FIG. 16B

| Load Balancer | Ports Balanced |
|---|---|
| vCenter Single Sign-On Load Balancer | 7444 |
| vCloud Automation Center virtual appliance Load Balancer | 443 |
| vCloud Automation Center Infrastructure Web Load Balancer | 443 |
| vCloud Automation Center Infrastructure Manager Service Load Balancer | 443 |
| vCloud Orchestrator Load Balancer | 8281 |

FIG. 16C

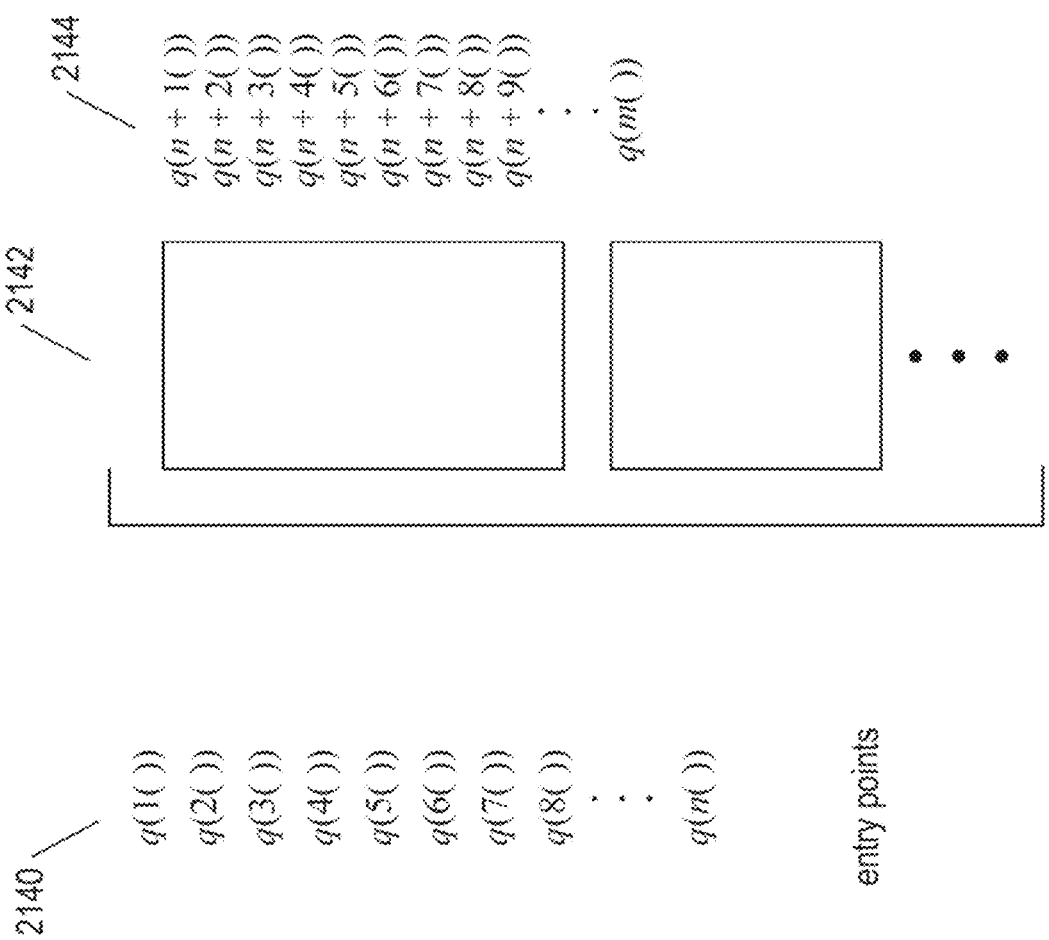

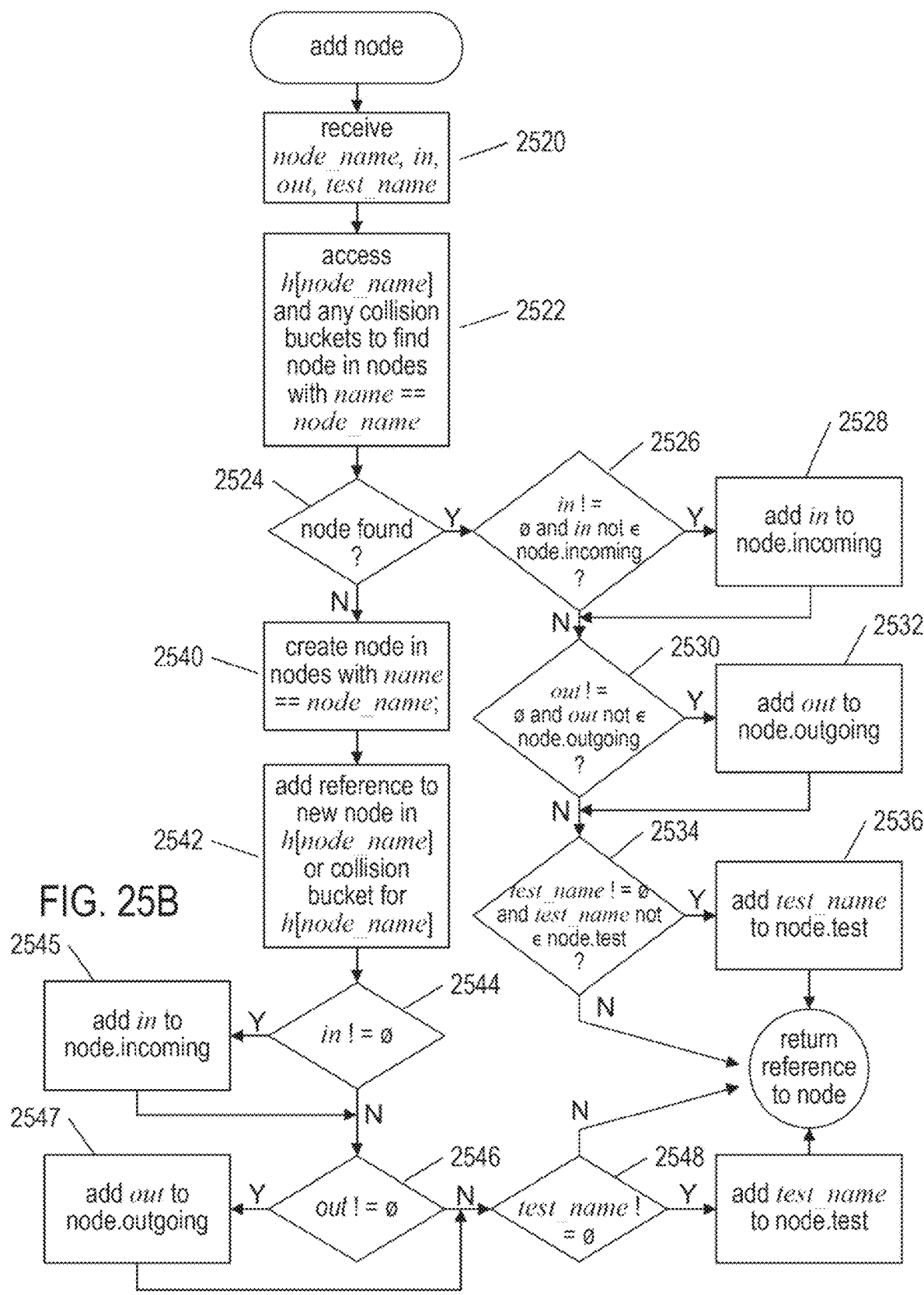

METHOD AND SYSTEM FOR TEST-EXECUTION OPTIMIZATION IN AN AUTOMATED APPLICATION-RELEASE-MANAGEMENT SYSTEM DURING SOURCE-CODE CHECK-IN

RELATED APPLICATIONS

Benefit is claimed under 35 U.S.C. 119)(a)-(d) to Foreign Application Serial No. 201641029710 filed in India entitled "METHOD AND SYSTEM FOR TEST-EXECUTION OPTIMIZATION IN AN AUTOMATED APPLICATION-RELEASE-MANAGEMENT SYSTEM DURING SOURCE-CODE CHECK-IN", on Aug. 31, 2016, by VMware, Inc., which is herein incorporated in its entirety by reference for purposes.

TECHNICAL FIELD

The current document is directed to automated application-release-management systems and source-code-maintenance subsystems within automated application-release-management systems and, in particular, to methods and subsystems that determine which of a large number of tests developed to test and verify an application need to be applied to a revised system generated, following source-code check-in, by compiling the source code and building one or more system executables.

BACKGROUND

Early computer systems were generally large, single-processor systems that sequentially executed jobs encoded on huge decks of Hollerith cards. Over time, the parallel evolution of computer hardware and software produced main-frame computers and minicomputers with multi-tasking operation systems, increasingly capable personal computers, workstations, and servers, and, in the current environment, multi-processor mobile computing devices, personal computers, and servers interconnected through global networking and communications systems with one another and with massive virtual data centers and virtualized cloud-computing facilities. This rapid evolution of computer systems has been accompanied with greatly expanded needs for computer-system management and administration. Currently, these needs have begun to be addressed by highly capable automated management and administration tools and facilities. As with many other types of computational systems and facilities, from operating systems to applications, many different types of automated administration and management facilities have emerged, providing many different products with overlapping functionalities, but each also providing unique functionalities and capabilities. Owners, managers, and users of large-scale computer systems continue to seek methods and technologies to provide efficient and cost-effective management and administration of cloud-computing facilities and other large-scale computer systems. In particular, significant temporal and computational overheads accompany submission, or check-in, of source-code changes to the body of source code that implements an application or system. Often, source-code modifications may be relatively modest, but verification of the revised system following incorporation of the source-code modifications may involve applying a large battery of tests to the revised system. Designers and developers of automated application-release-management systems and other systems that maintain source code and test systems implemented by the source code therefore are keen to find more time-efficient and computationally efficient methods and subsystems for testing and verification of revised source-code-implemented systems.

SUMMARY

The current document is directed to a subsystem that is incorporated, in one implementation, within an automated application-release-management system. The subsystem to which the current document is directed determines, based on modifications to the source code for an application or another system that are submitted through a check-in process, a subset of tests within a large set of tests developed to test the application or system that invoke routines or other compilation units affected by the submitted source-code modifications. Only those tests that invoke routines and other compilation units affected by the source-code submissions need then be applied during testing and verification of the revised application or system.

BRIEF DESCRIPTION OF THE DRAWINGS

FIGS. 14A-14B include a table of different types of elements that may be included in a workflow.

FIGS. 16A-C illustrate an example implementation and configuration of virtual appliances within a cloud-computing facility that implement the workflow-based management and administration facilities of the above-described WFMAD.

FIGS. 21A-C illustrate source code and entry points for an application or system constructed from executables generated by compiling the source code.

FIGS. 25A-C provide control-flow diagrams that illustrate one implementation of a method that converts the contents of a traceRes data structure (2308 in FIG. 23), generated during execution of multiple tests against a system or application, into a set of node data structures (2312 and 2322 in FIG. 23) that contain information equivalent to an execution-trace tree (2336 in FIG. 23).

DETAILED DESCRIPTION

The current document is directed to a subsystem, within an automated application-release-management system, that determines, based on modifications to the source code for an application or another system that are submitted through a check-in process, a subset of tests within a large set of tests developed to test the application or system that need to be applied during testing and verification of the revised application or system. In a first subsection, below, an overview of computer systems and architecture is provided. In a second subsection, an automated-application-release-management subsystem is described. A third subsection describes, in detail, the subsystem, and methods incorporated within the subsystem, to which the current document is directed.

Overview of Computer Systems and Computer Architecture

Figure 1:
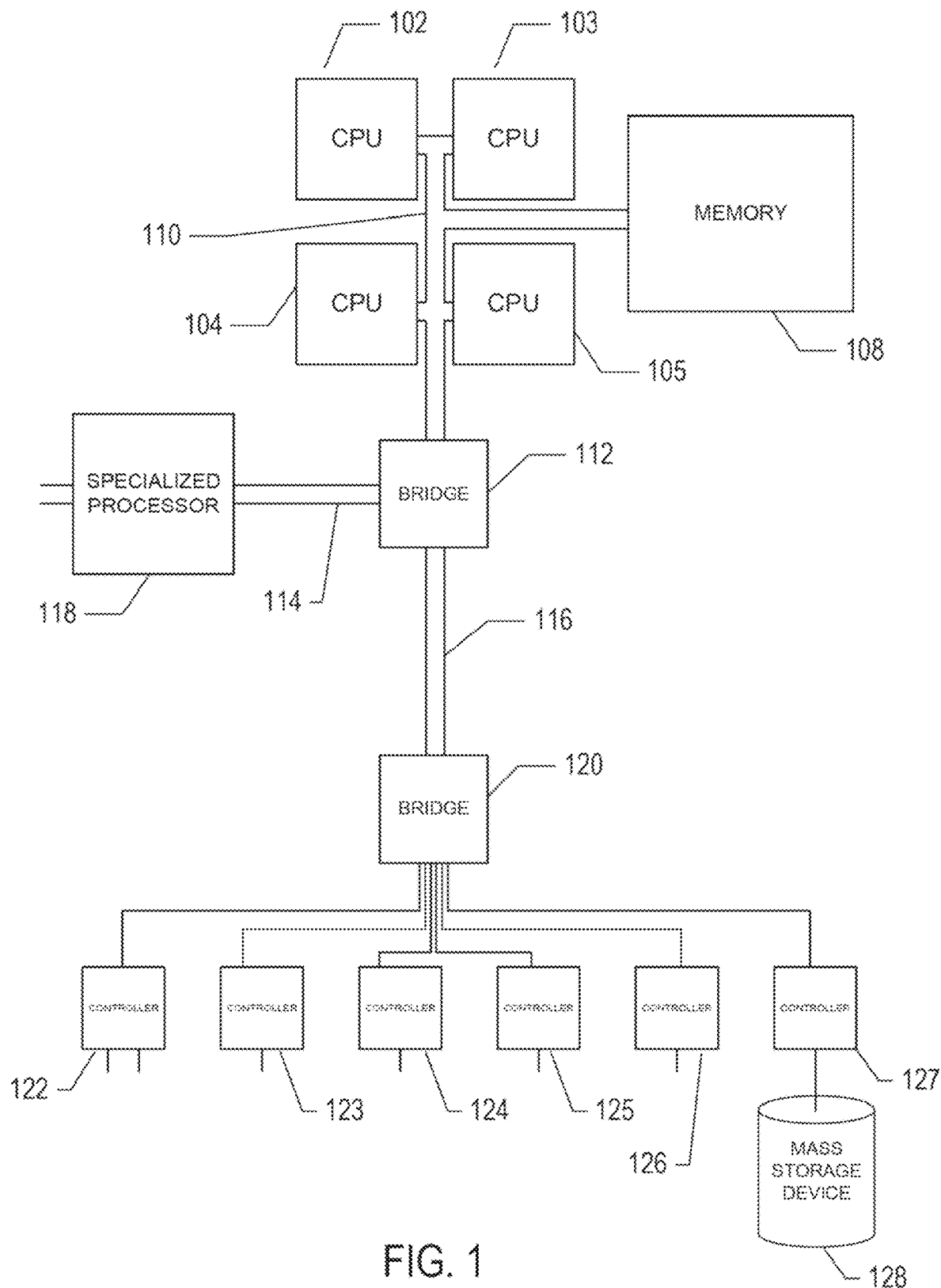
FIG. 1 provides a general architectural diagram for various types of computers.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
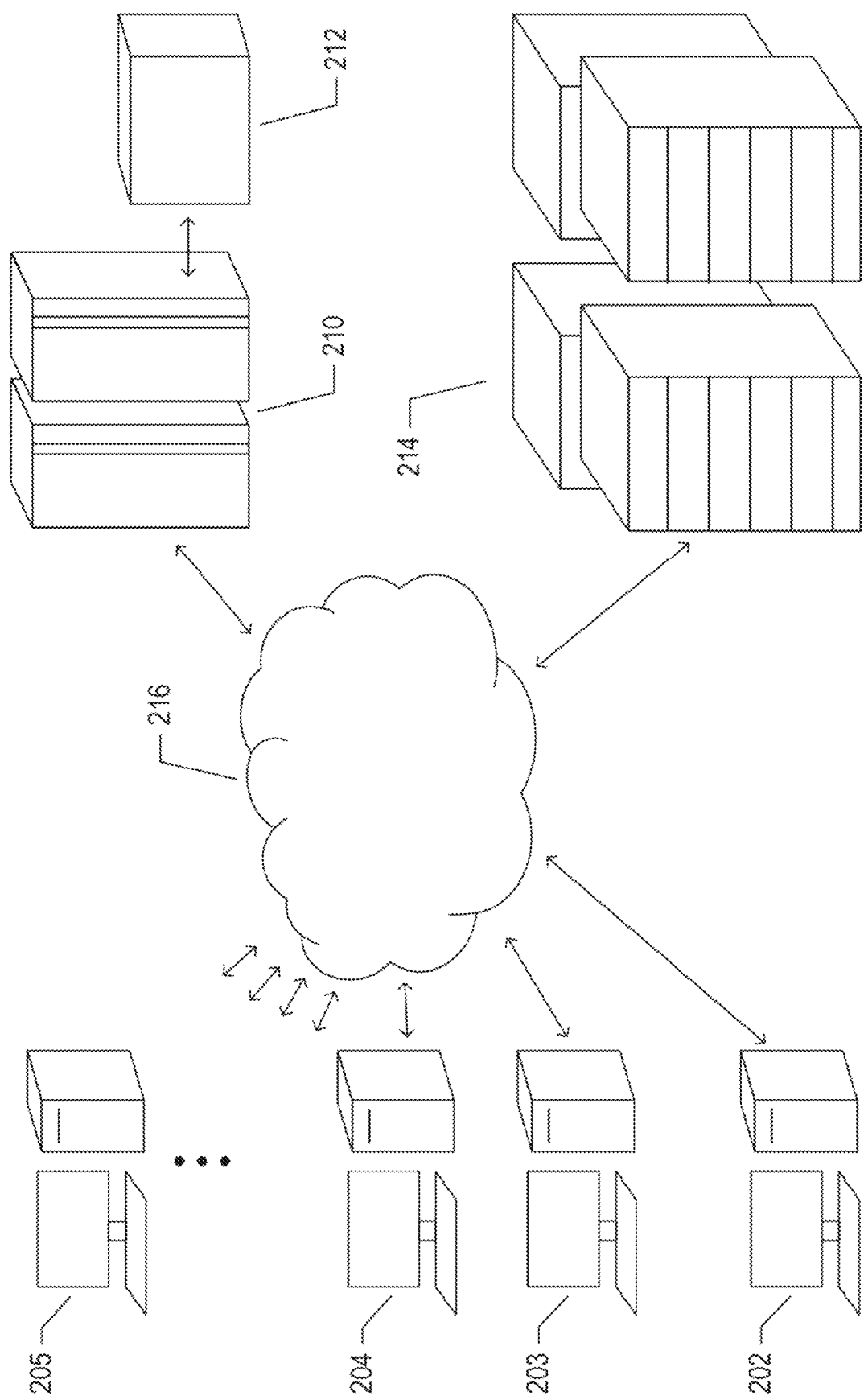
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computer systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
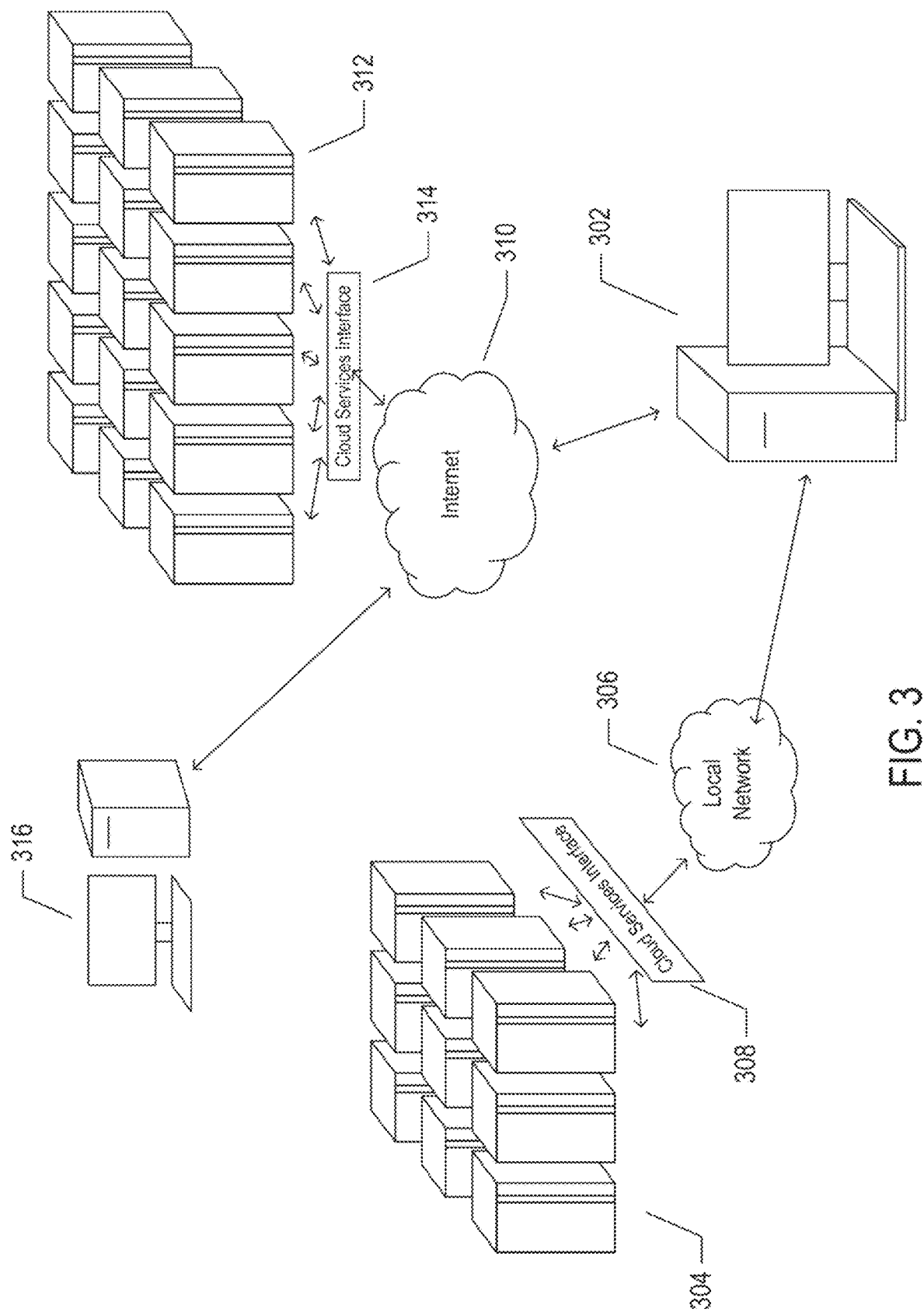
FIG. 3 illustrates cloud computing.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Figure 4:
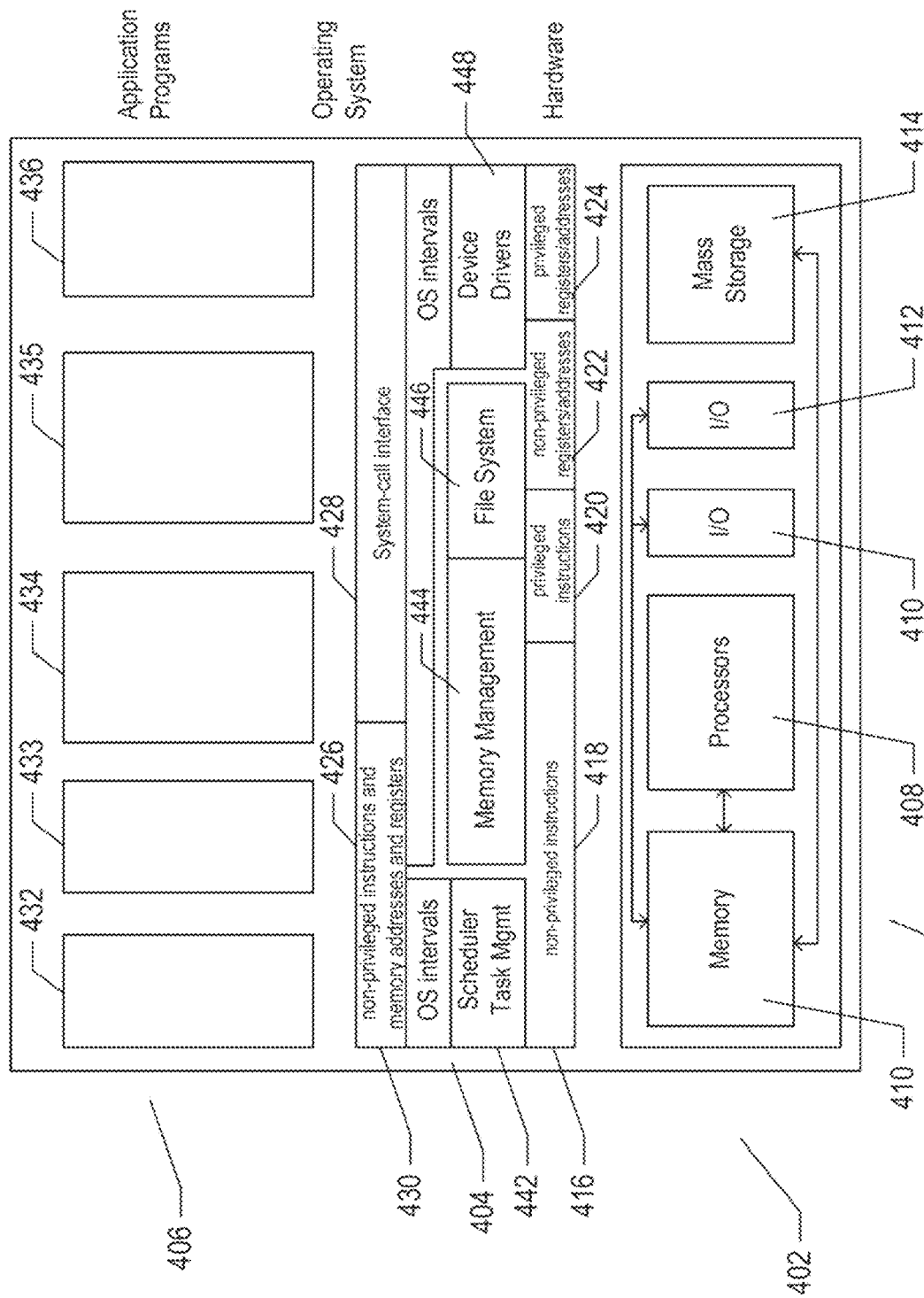
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 446 facilitates abstraction of mass-storage-device and memory resources as a high-level, easy-to-access, file-system interface. In many modern operating systems, the operating system provides an execution environment for concurrent execution of a large number of processes, each corresponding to an executing application program, on one or a relatively small number of hardware processors by temporal multiplexing of process execution. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
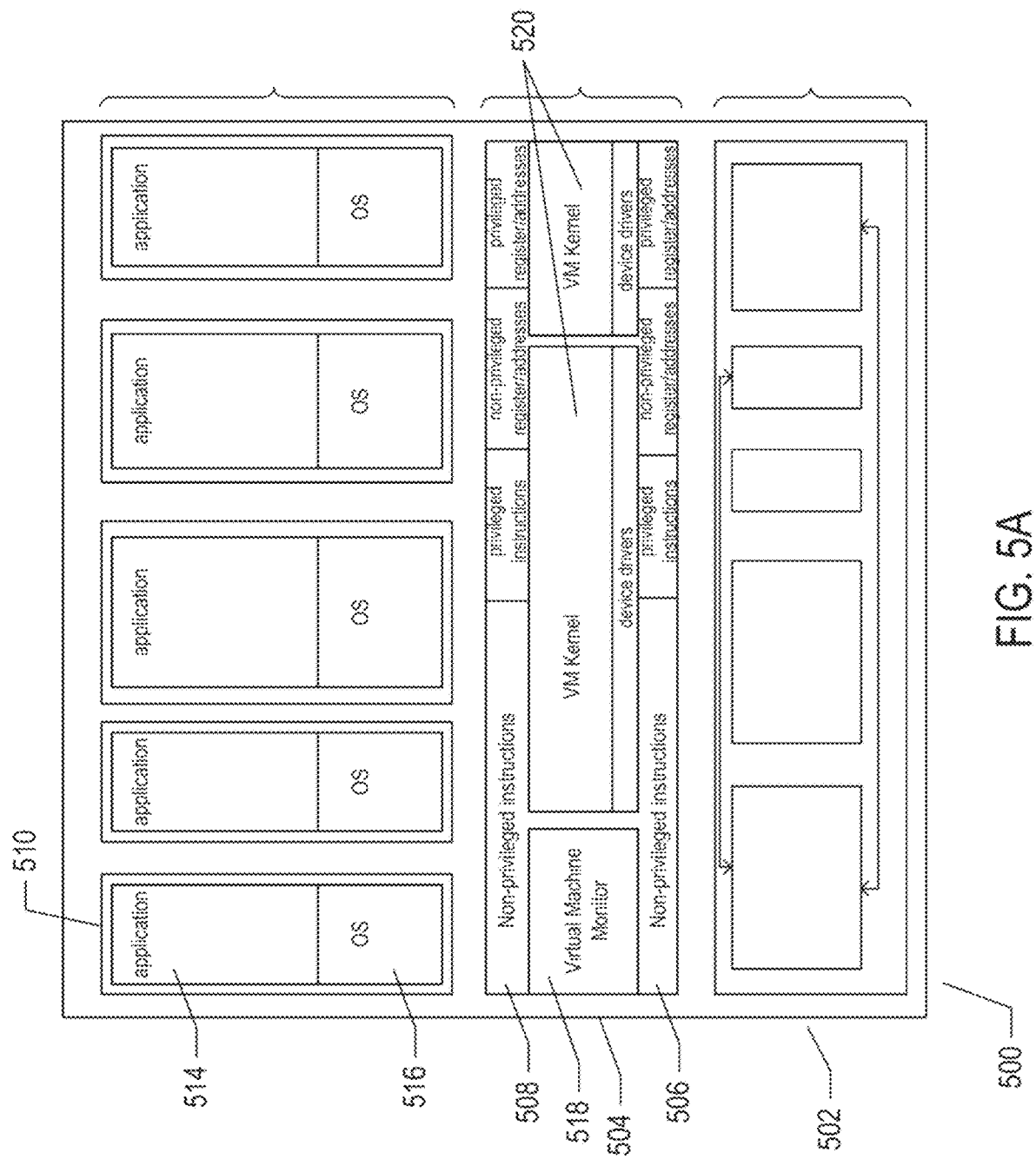
FIGS. 5A-D illustrate several types of virtual machine and virtual-machine execution environments.

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-D illustrate several types of virtual machine and virtual-machine execution environments. FIGS. 5A-D use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

Figure 5B:
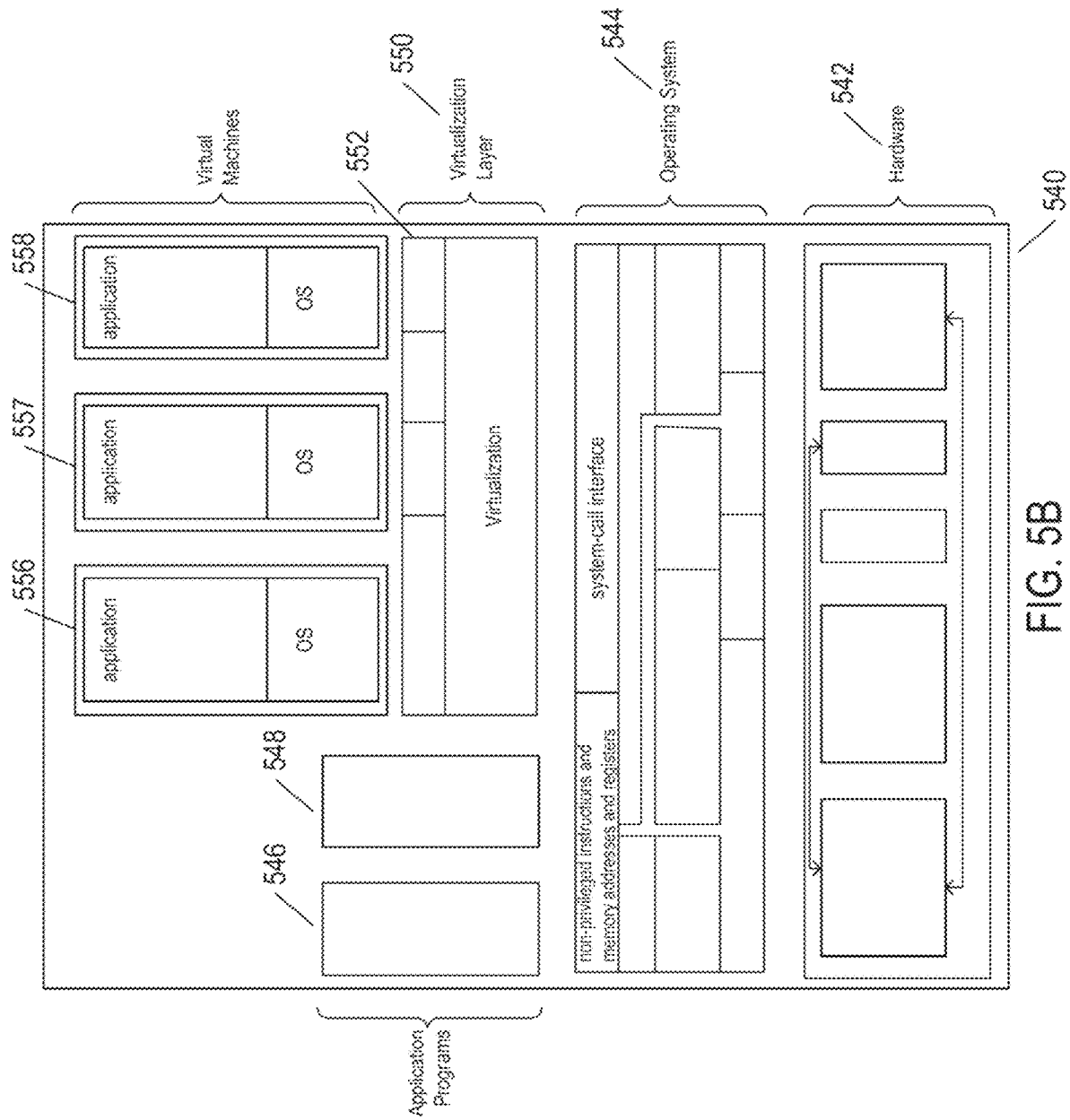

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

Figure 5C:
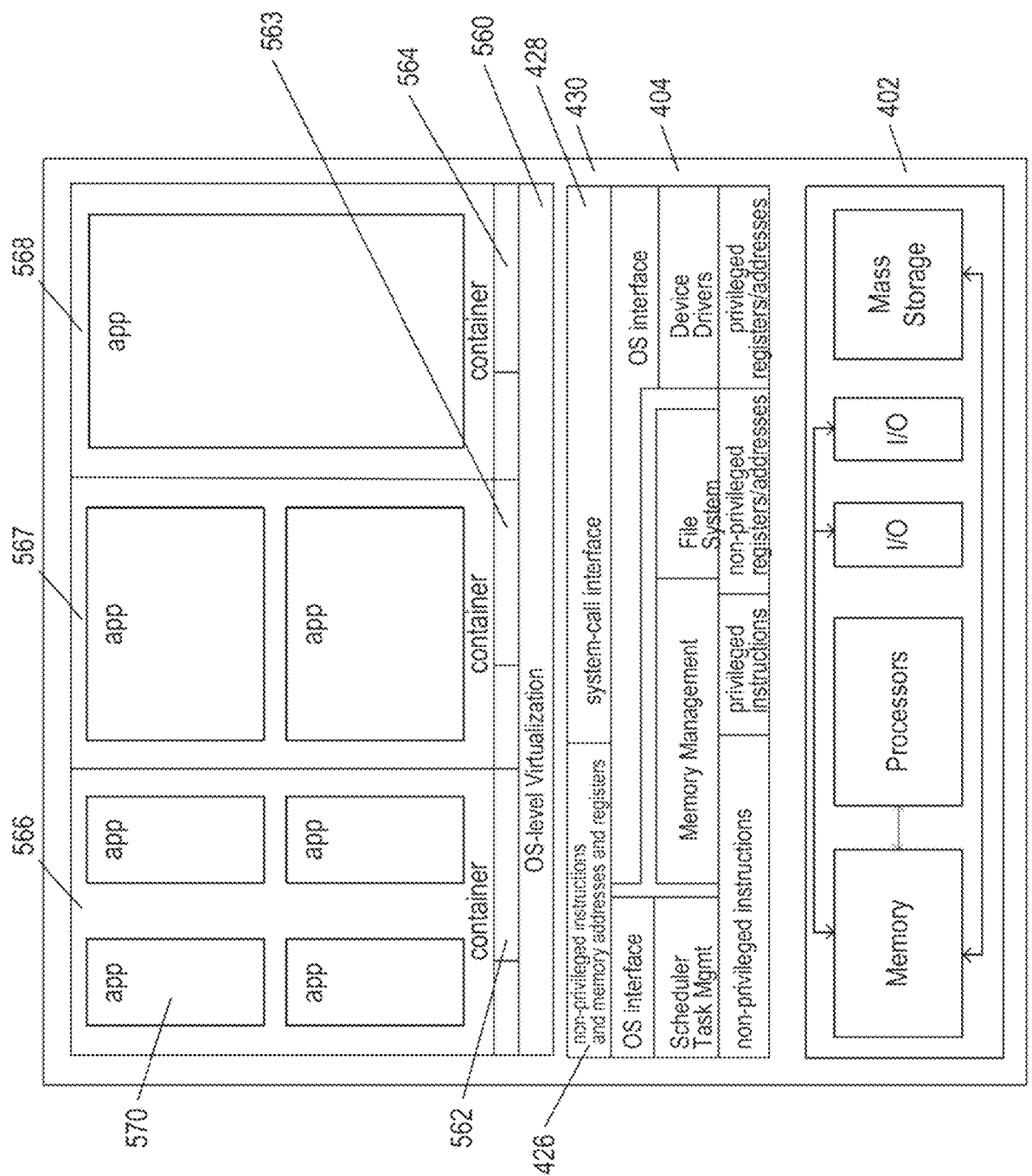

While the traditional virtual-machine-based virtualization layers, described with reference to FIGS. 5A-B, have enjoyed widespread adoption and use in a variety of different environments, from personal computers to enormous distributed computing systems, traditional virtualization technologies are associated with computational overheads. While these computational overheads have been steadily decreased, over the years, and often represent ten percent or less of the total computational bandwidth consumed by an application running in a virtualized environment, traditional virtualization technologies nonetheless involve computational costs in return for the power and flexibility that they provide. Another approach to virtualization is referred to as operating-system-level virtualization ("OSL virtualization"). FIG. 5C illustrates the OSL-virtualization approach. In FIG. 5C, as in previously discussed FIG. 4, an operating system 404 runs above the hardware 402 of a host computer. The operating system provides an interface for higher-level computational entities, the interface including a system-call interface 428 and exposure to the non-privileged instructions and memory addresses and registers 426 of the hardware layer 402. However, unlike in FIG. 5A, rather than applications running directly above the operating system, OSL virtualization involves an OS-level virtualization layer 560 that provides an operating-system interface 562-564 to each of one or more containers 566-568. The containers, in turn, provide an execution environment for one or more applications, such as application 570 running within the execution environment provided by container 566. The container can be thought of as a partition of the resources generally available to higher-level computational entities through the operating system interface 430. While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system. In essence, OSL virtualization uses operating-system features, such as name space support, to isolate each container from the remaining containers so that the applications executing within the execution environment provided by a container are isolated from applications executing within the execution environments provided by all other containers. As a result, a container can be booted up much faster than a virtual machine, since the container uses operating-system-kernel features that are already available within the host computer. Furthermore, the containers share computational bandwidth, memory, network bandwidth, and other computational resources provided by the operating system, without resource overhead allocated to virtual machines and virtualization layers. Again, however, OSL virtualization does not provide many desirable features of traditional virtualization. As mentioned above, OSL virtualization does not provide a way to run different types of operating systems for different groups of containers within the same host system, nor does OSL-virtualization provide for live migration of containers between host computers, as does traditional virtualization technologies.

Figure 5D:
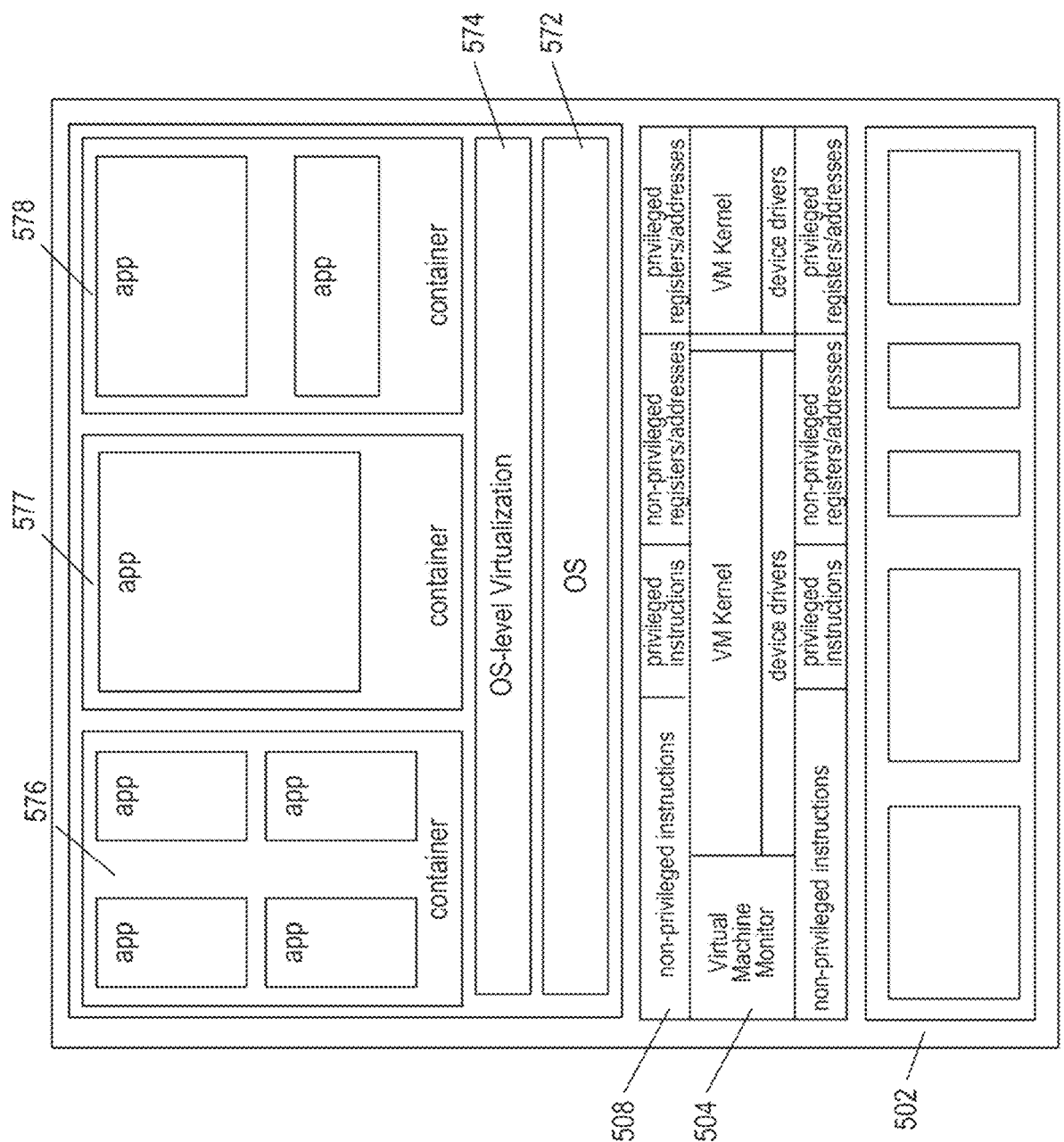

FIG. 5D illustrates an approach to combining the power and flexibility of traditional virtualization with the advantages of OSL virtualization. FIG. 5D shows a host computer similar to that shown in FIG. 5A, discussed above. The host computer includes a hardware layer 502 and a virtualization layer 504 that provides a simulated hardware interface 508 to an operating system 572. Unlike in FIG. 5A, the operating system interfaces to an OSL-virtualization layer 574 that provides container execution environments 576-578 to multiple application programs. Running containers above a guest operating system within a virtualized host computer provides many of the advantages of traditional virtualization and OSL virtualization. Containers can be quickly booted in order to provide additional execution environments and associated resources to new applications. The resources available to the guest operating system are efficiently partitioned among the containers provided by the OSL-virtualization layer 574. Many of the powerful and flexible features of the traditional virtualization technology can be applied to containers running above guest operating systems including live migration from one host computer to another, various types of high-availability and distributed resource sharing, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides flexible and easy scaling and a simple approach to operating-system upgrades and patches. Thus, the use of OSL virtualization above traditional virtualization, as illustrated in FIG. 5D, provides much of the advantages of both a traditional virtualization layer and the advantages of OSL virtualization. Note that, although only a single guest operating system and OSL virtualization layer as shown in FIG. 5D, a single virtualized host system can run multiple different guest operating systems within multiple virtual machines, each of which supports one or more containers.

In FIGS. 5A-D, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files.

Figure 6:
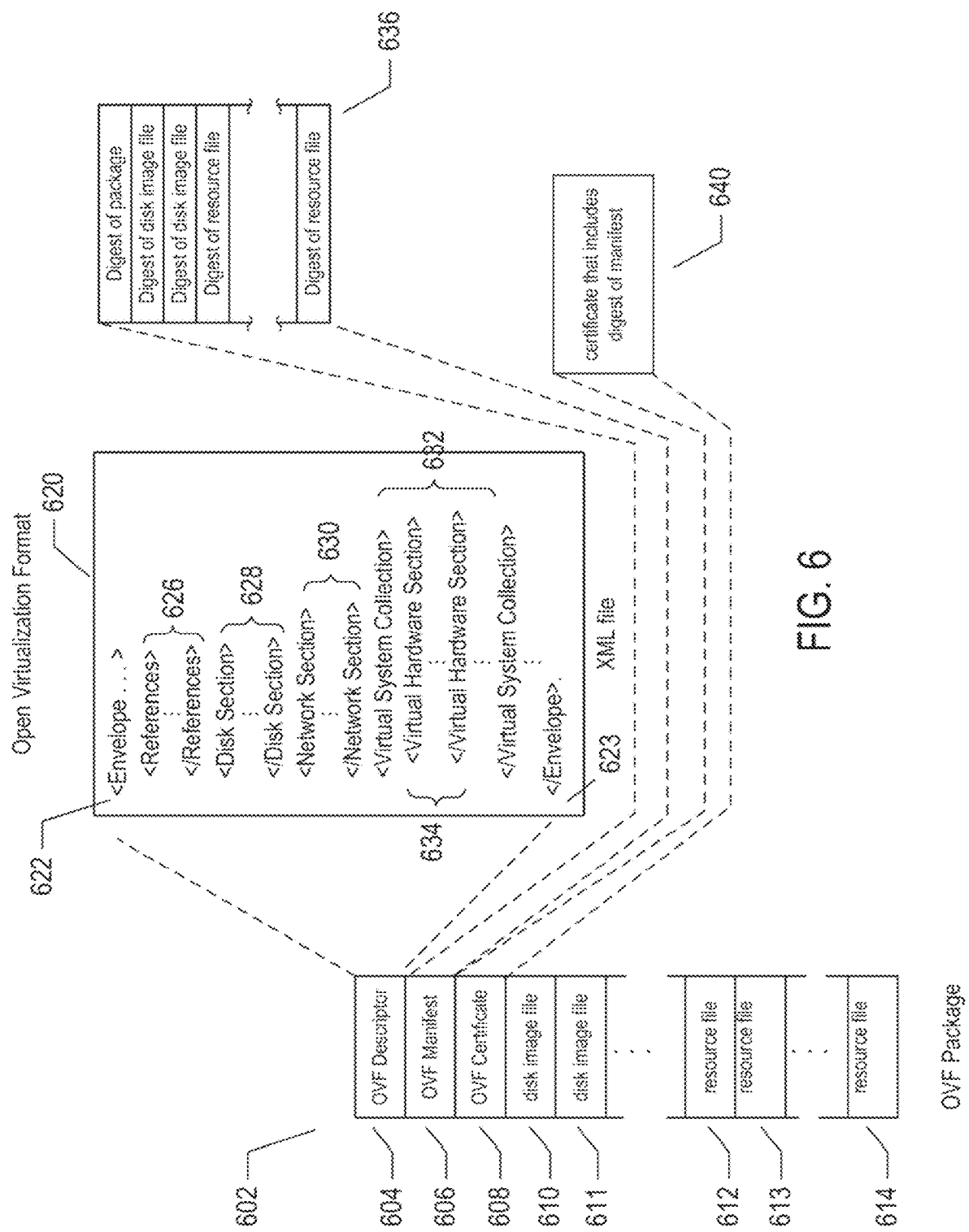
FIG. 6 illustrates an OVF package.

FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
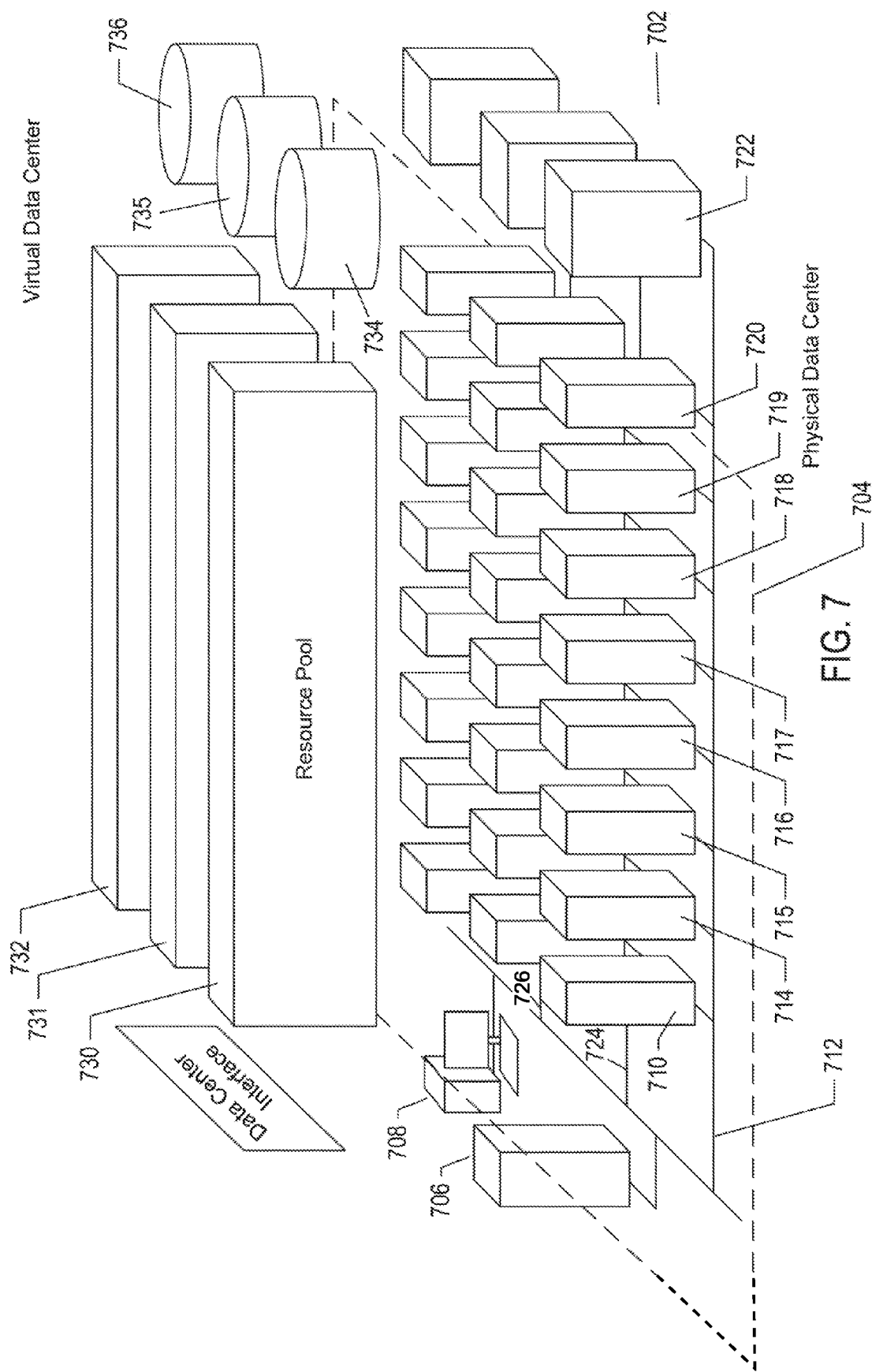
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers which are one example of a broader virtual-infrastructure category, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-infrastructure management server ("VI-management-server") 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the VI-management-server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 8:
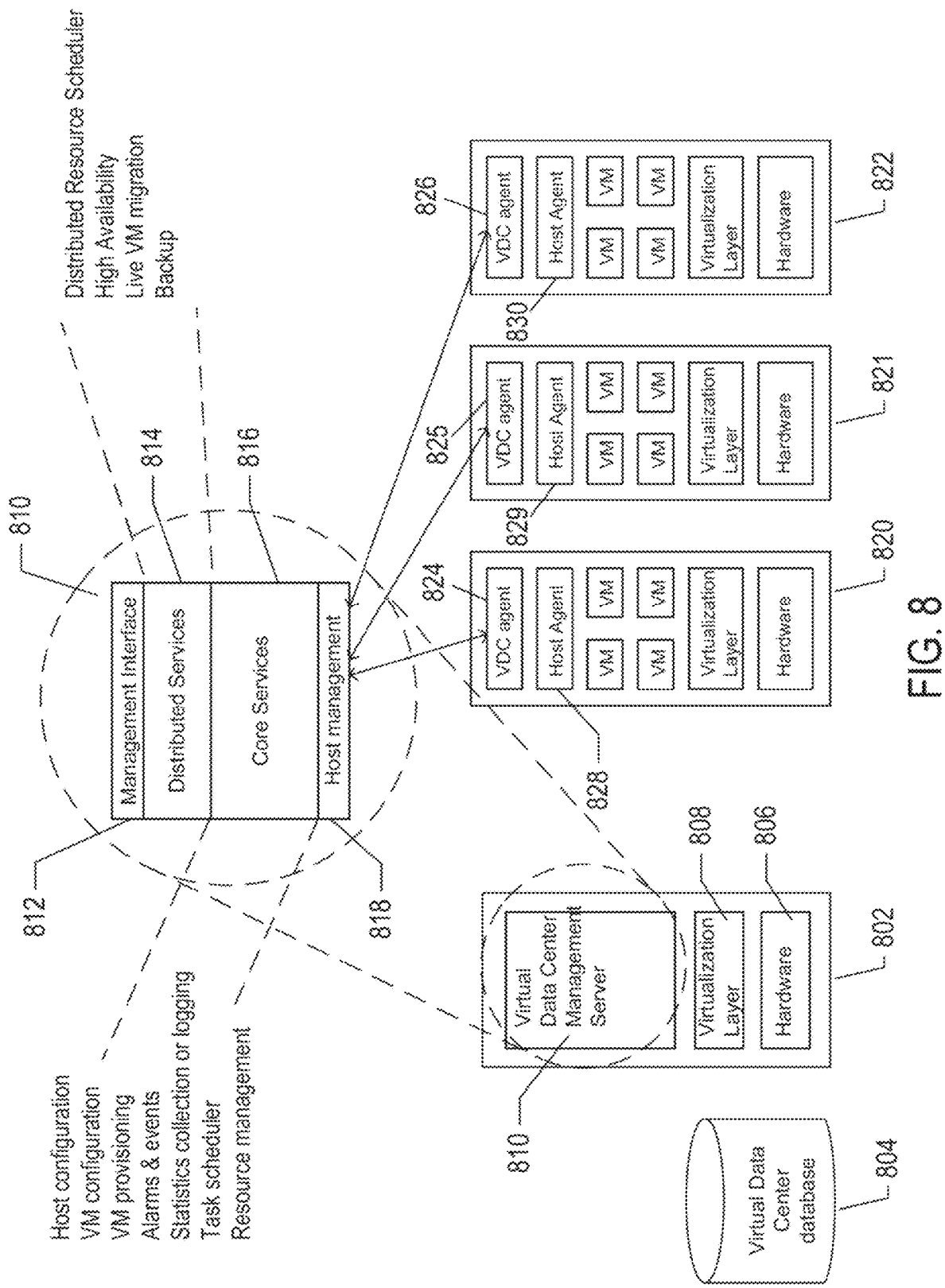
FIG. 8 illustrates virtual-machine components of a VI-management-server and physical servers of a physical data center above which a virtual-data-center interface is provided by the VI-management-server.

FIG. 8 illustrates virtual-machine components of a VI-management-server and physical servers of a physical data center above which a virtual-data-center interface is provided by the VI-management-server. The VI-management-server 802 and a virtual-data-center database 804 comprise the physical components of the management component of the virtual data center. The VI-management-server 802 includes a hardware layer 806 and virtualization layer 808, and runs a virtual-data-center management-server virtual machine 810 above the virtualization layer. Although shown as a single server in FIG. 8, the VI-management-server ("VI management server") may include two or more physical server computers that support multiple VI-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VI management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VI management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VI management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions virtual data centers ("VDCs") into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
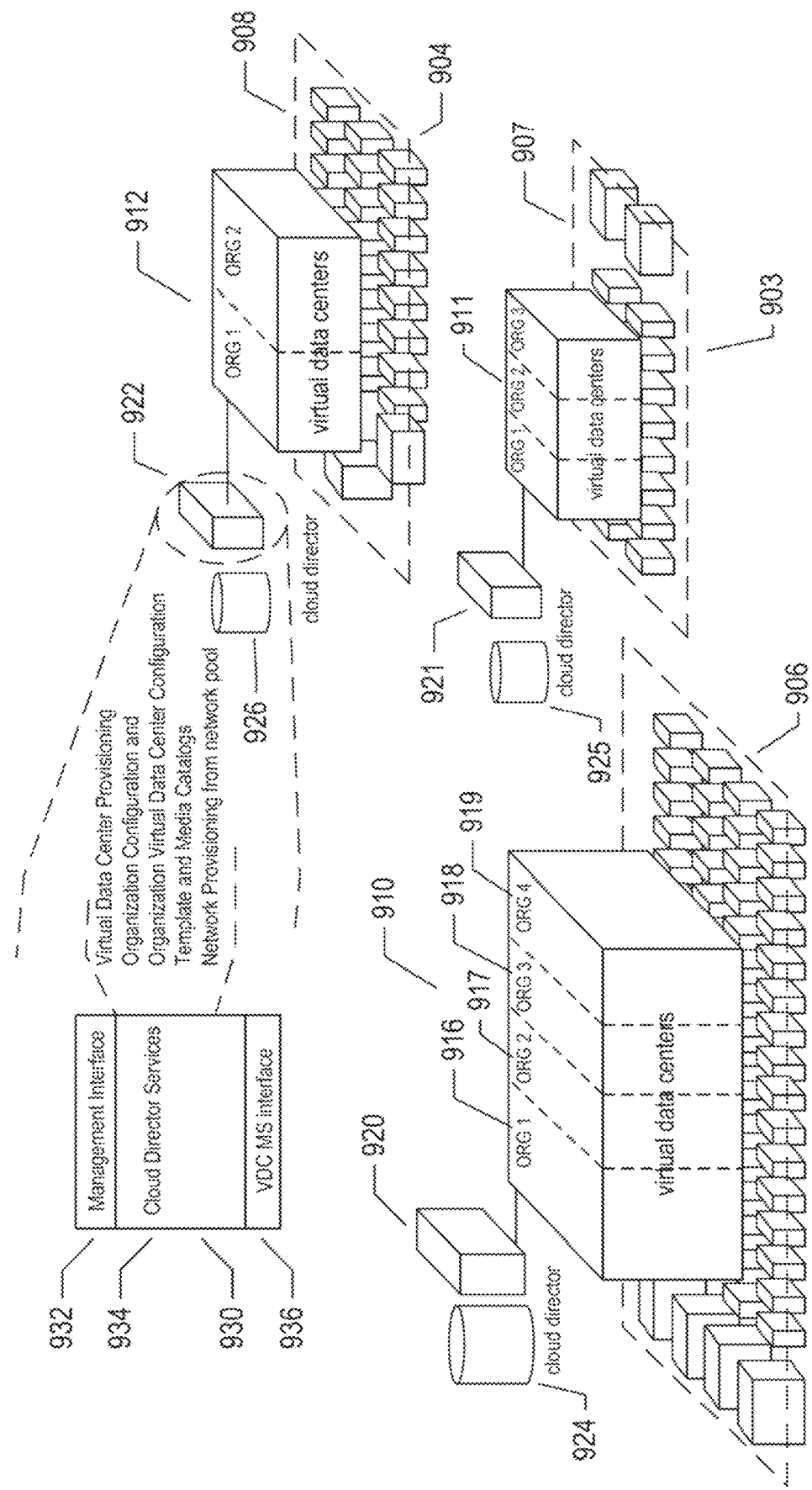
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VI management server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
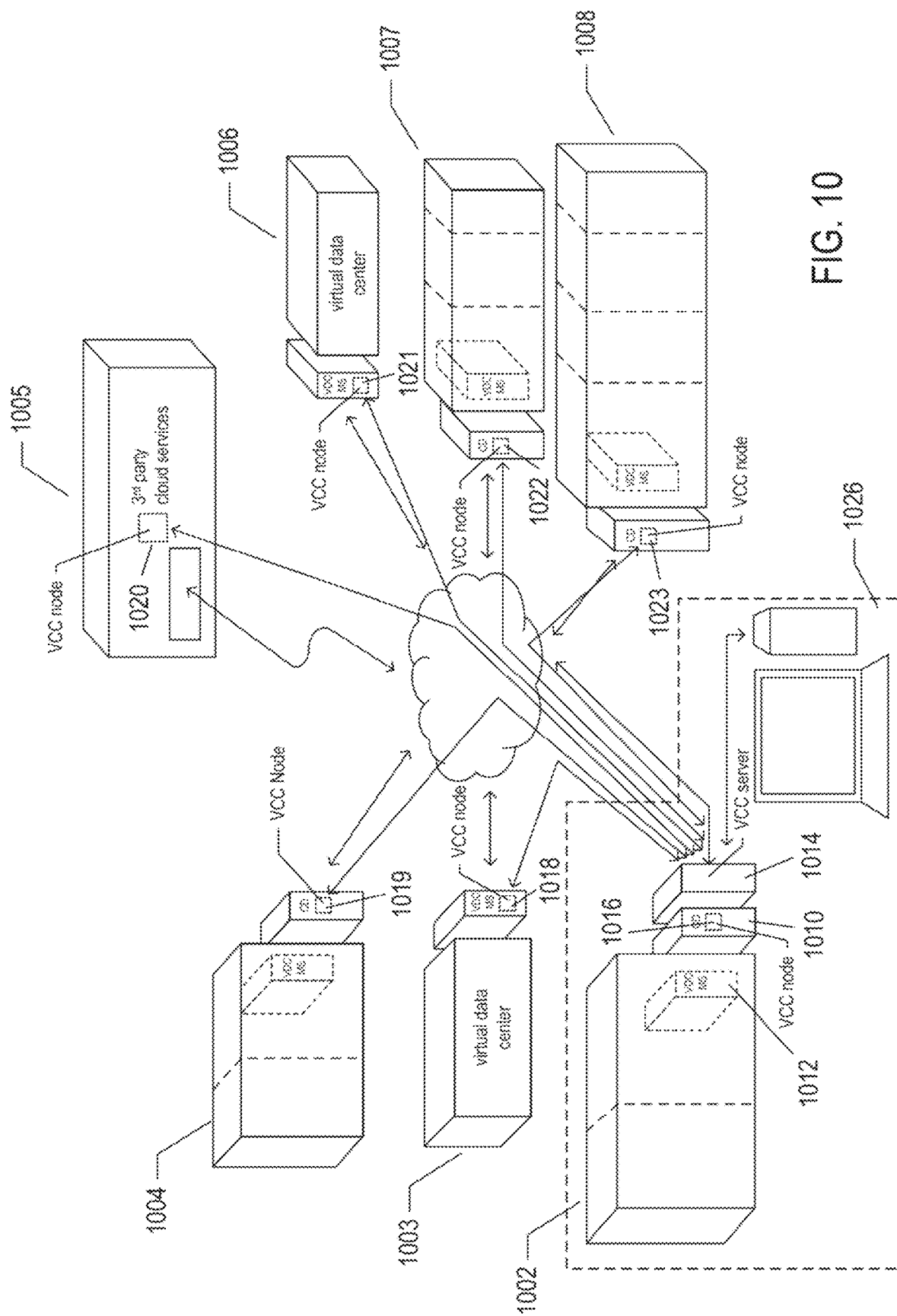
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VI management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VI management server that manages a single-tenant private cloud. The VCC server 1014 additionally interfaces, through the Internet, to VCC node virtual appliances executing within remote VI management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Figure 11:
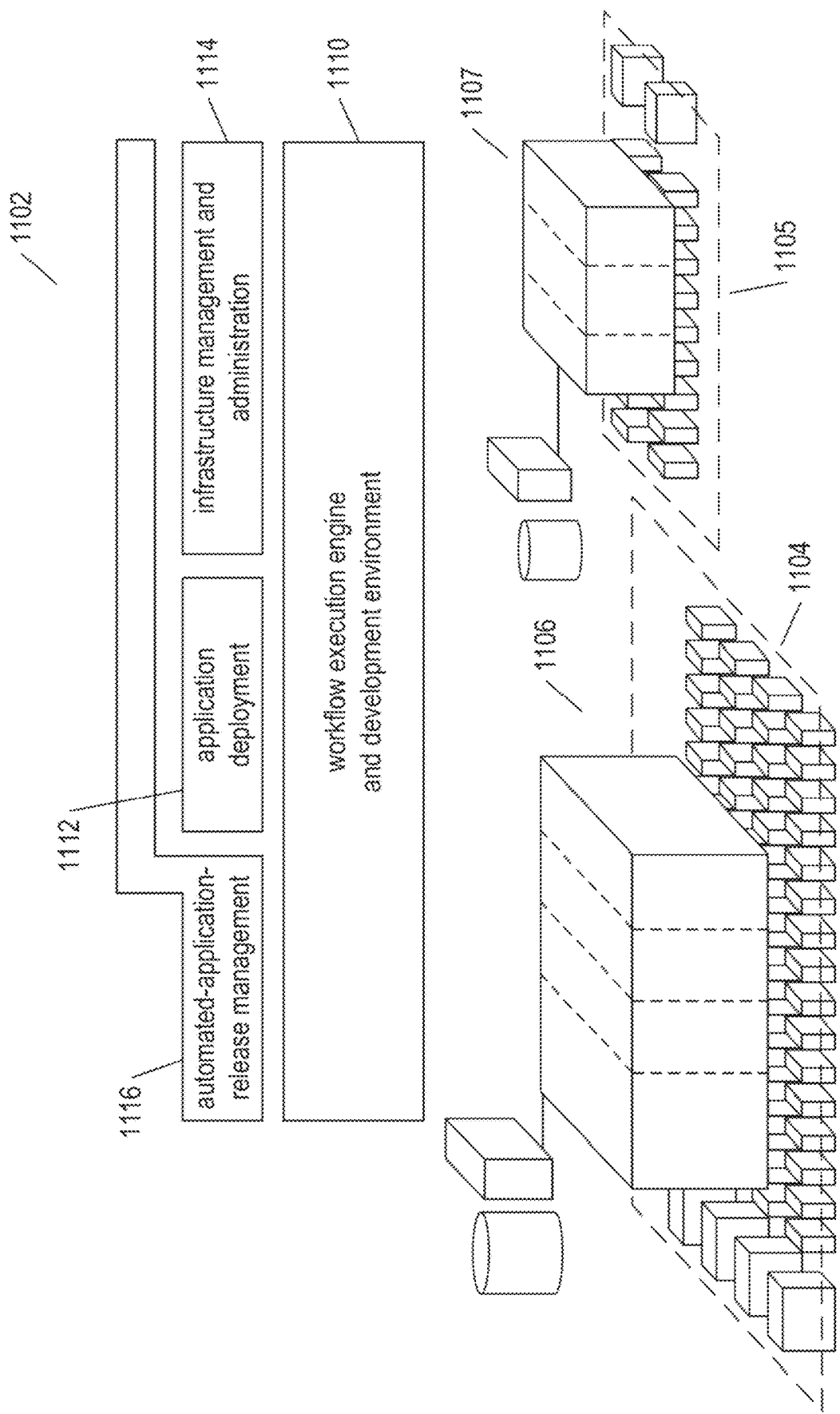
FIG. 11 shows a workflow-based cloud-management facility that has been developed to provide a powerful administrative and development interface to multiple multi-tenant cloud-computing facilities.

Workflow-Based Cloud Management that Includes an Automated-Application-Release-Management Subsystem FIG. 11 shows workflow-based cloud-management facility that has been developed to provide a powerful administrative and development interface to multiple multi-tenant cloud-computing facilities. The workflow-based management, administration, and development facility ("WFMAD") is used to manage and administer cloud-computing aggregations, such as those discussed above with reference to FIG. 10, cloud-computing aggregations, such as those discussed above with reference to FIG. 9, and a variety of additional types of cloud-computing facilities as well as to deploy applications and continuously and automatically release complex applications on various types of cloud-computing aggregations. As shown in FIG. 11, the WFMAD 1102 is implemented above the physical hardware layers 1104 and 1105 and virtual data centers 1106 and 1107 of a cloud-computing facility or cloud-computing-facility aggregation. The WFMAD includes a workflow-execution engine and development environment 1110, an application-deployment facility 1112, an infrastructure-management-and-administration facility 1114, and an automated-application-release-management facility 1116. The workflow-execution engine and development environment 1110 provides an integrated development environment for constructing, validating, testing, and executing graphically expressed workflows, discussed in detail below. Workflows are high-level programs with many built-in functions, scripting tools, and development tools and graphical interfaces. Workflows provide an underlying foundation for the infrastructure-management-and-administration facility 1114, the application-development facility 1112, and the automated-application-release-management facility 1116. The infrastructure-management-and-administration facility 1114 provides a powerful and intuitive suite of management and administration tools that allow the resources of a cloud-computing facility or cloud-computing-facility aggregation to be distributed among clients and users of the cloud-computing facility or facilities and to be administered by a hierarchy of general and specific administrators. The infrastructure-management-and-administration facility 1114 provides interfaces that allow service architects to develop various types of services and resource descriptions that can be provided to users and clients of the cloud-computing facility or facilities, including many management and administrative services and functionalities implemented as workflows. The application-deployment facility 1112 provides an integrated application-deployment environment to facilitate building and launching complex cloud-resident applications on the cloud-computing facility or facilities. The application-deployment facility provides access to one or more artifact repositories that store and logically organize binary files and other artifacts used to build complex cloud-resident applications as well as access to automated tools used, along with workflows, to develop specific automated application-deployment tools for specific cloud-resident applications. The automated-application-release-management facility 1116 provides workflow-based automated release-management tools that enable cloud-resident-application developers to continuously generate application releases produced by automated deployment, testing, and validation functionalities. Thus, the WFMAD 1102 provides a powerful, programmable, and extensible management, administration, and development platform to allow cloud-computing facilities and cloud-computing-facility aggregations to be used and managed by organizations and teams of individuals.

Figure 12:
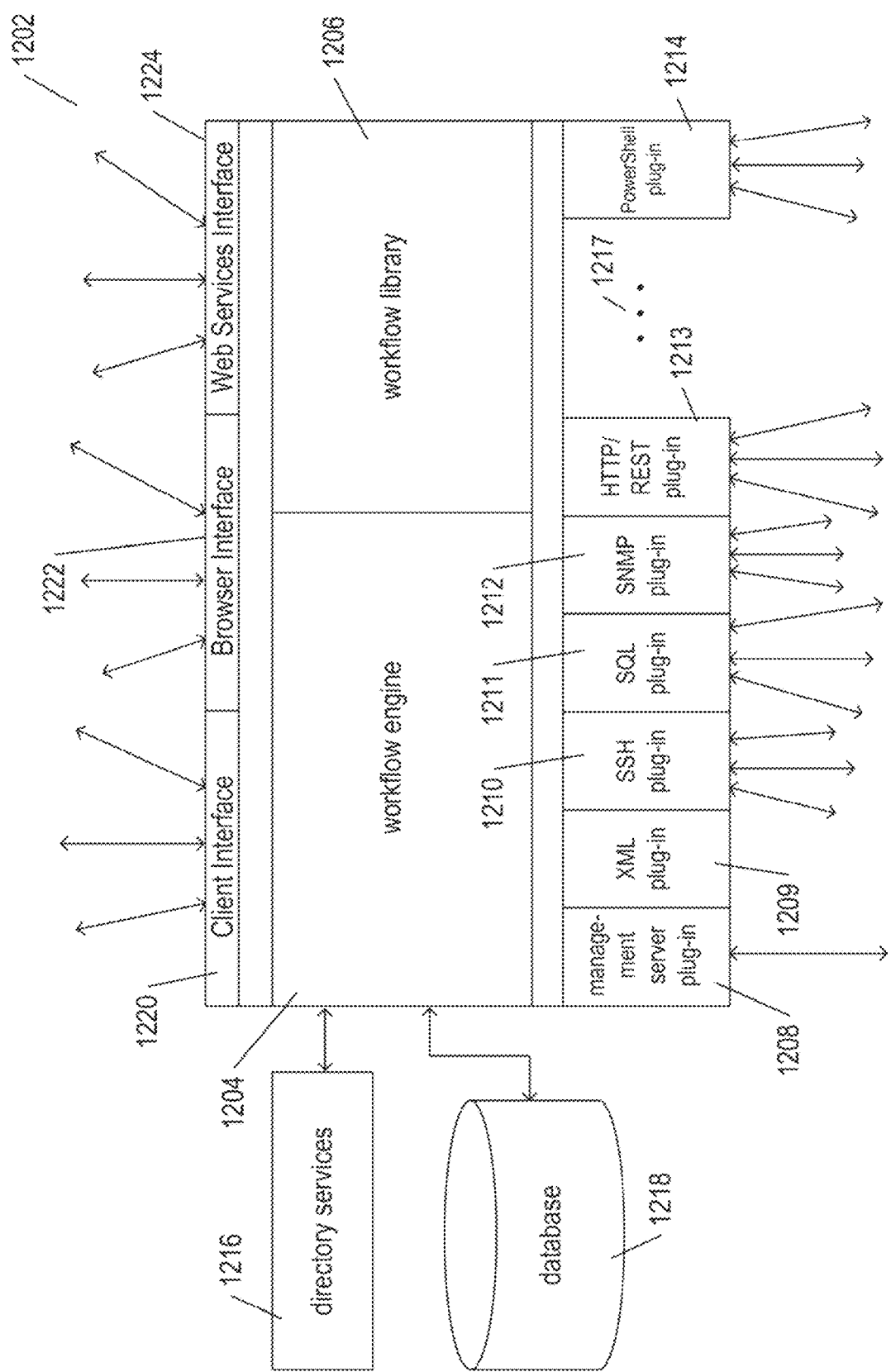
FIG. 12 provides an architectural diagram of the workflow-execution engine and development environment.

Next, the workflow-execution engine and development environment is discussed in grater detail. FIG. 12 provides an architectural diagram of the workflow-execution engine and development environment. The workflow-execution engine and development environment 1202 includes a workflow engine 1204, which executes workflows to carry out the many different administration, management, and development tasks encoded in workflows that comprise the functionalities of the WFMAD. The workflow engine, during execution of workflows, accesses many built-in tools and functionalities provided by a workflow library 1206. In addition, both the routines and functionalities provided by the workflow library and the workflow engine access a wide variety of tools and computational facilities, provided by a wide variety of third-party providers, through a large set of plug-ins 1208-1214. Note that the ellipses 1216 indicate that many additional plug-ins provide, to the workflow engine and workflow-library routines, access to many additional third-party computational resources. Plug-in 1208 provides for access, by the workflow engine and workflow-library routines, to a cloud-computing-facility or cloud-computing-facility-aggregation management server, such as a cloud director (920 in FIG. 9) or VCC server (1014 in FIG. 10). The XML plug-in 1209 provides access to a complete document object model ("DOM") extensible markup language ("XML") parser. The SSH plug-in 1210 provides access to an implementation of the Secure Shell v2 ("SSH-2") protocol. The structured query language ("SQL") plug-in 1211 provides access to a Java database connectivity ("JDBC") API that, in turn, provides access to a wide range of different types of databases. The simple network management protocol ("SNMP") plug-in 1212 provides access to an implementation of the SNMP protocol that allows the workflow-execution engine and development environment to connect to, and receive information from, various SNMP-enabled systems and devices. The hypertext transfer protocol ("HTTP")/representational state transfer ("REST") plug-in 1213 provides access to REST web services and hosts. The PowerShell plug-in 1214 allows the workflow-execution engine and development environment to manage PowerShell hosts and run custom PowerShell operations. The workflow engine 1204 additionally accesses directory services 1216, such as a lightweight directory access protocol ("LDAP") directory, that maintain distributed directory information and manages password-based user login. The workflow engine also accesses a dedicated database 1218 in which workflows and other information are stored. The workflow-execution engine and development environment can be accessed by clients running a client application that interfaces to a client interface 1220, by clients using web browsers that interface to a browser interface 1222, and by various applications and other executables running on remote computers that access the workflow-execution engine and development environment using a REST or small-object-access protocol ("SOAP") via a web-services interface 1224. The client application that runs on a remote computer and interfaces to the client interface 1220 provides a powerful graphical user interface that allows a client to develop and store workflows for subsequent execution by the workflow engine. The user interface also allows clients to initiate workflow execution and provides a variety of tools for validating and debugging workflows. Workflow execution can be initiated via the browser interface 1222 and web-services interface 1224. The various interfaces also provide for exchange of data output by workflows and input of parameters and data to workflows.

Figure 13A:
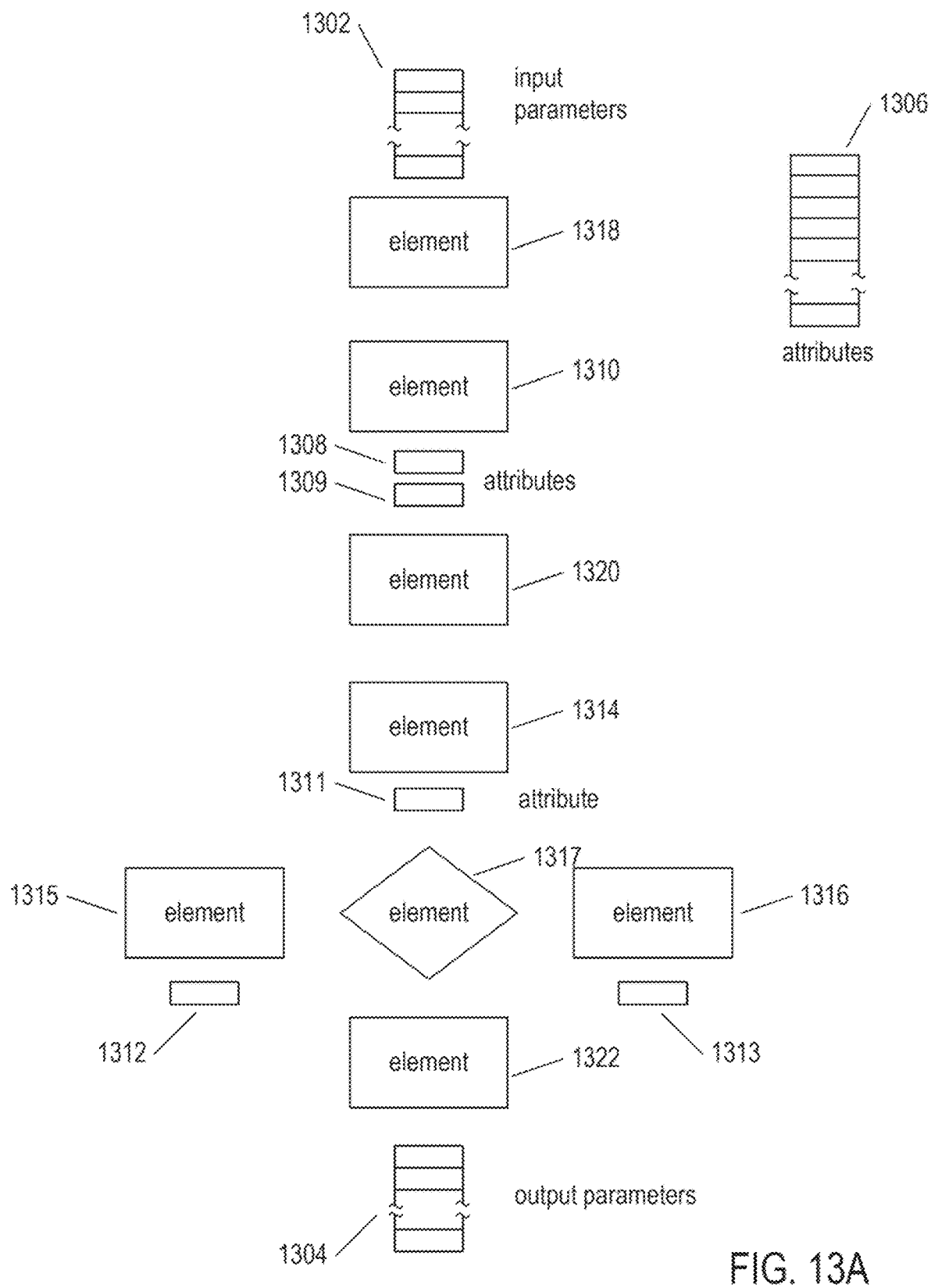
FIGS. 13A-C illustrate the structure of a workflow.
Figure 13B:
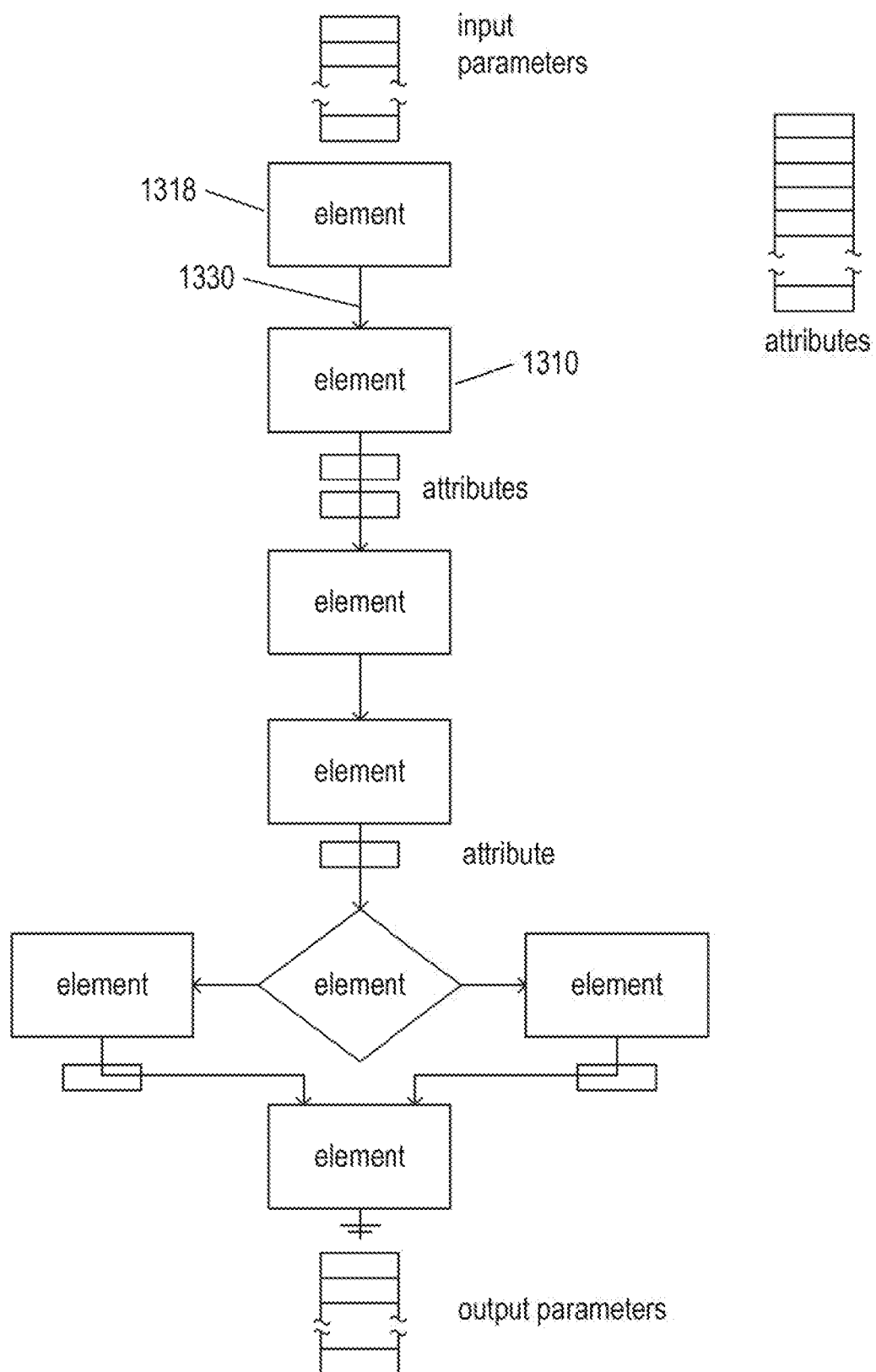
Figure 13C:
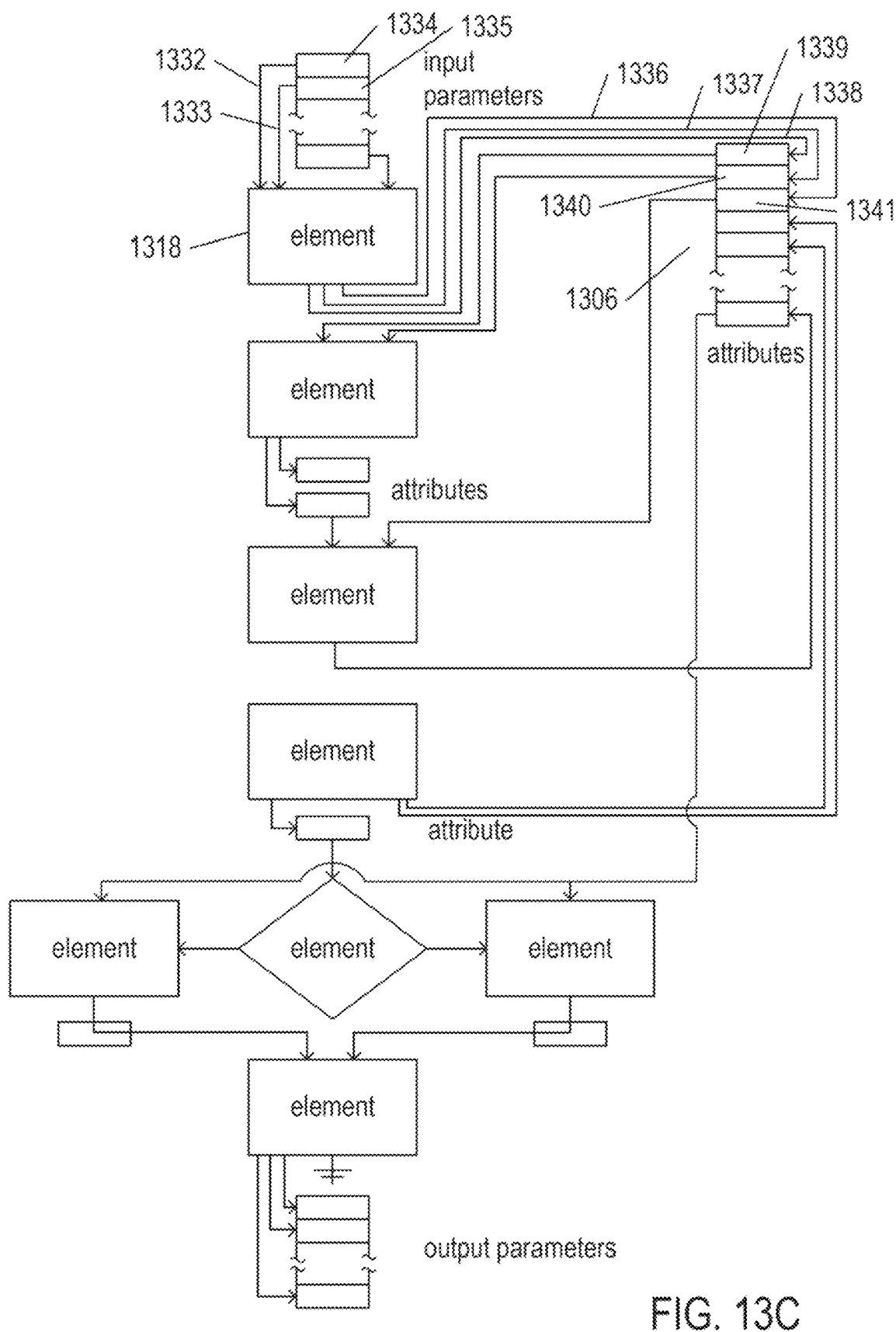

FIGS. 13A-C illustrate the structure of a workflow. A workflow is a graphically represented high-level program. FIG. 13A shows the main logical components of a workflow. These components include a set of one or more input parameters 1302 and a set of one or more output parameters 1304. In certain cases, a workflow may not include input and/or output parameters, but, in general, both input parameters and output parameters are defined for each workflow. The input and output parameters can have various different data types, with the values for a parameter depending on the data type associated with the parameter. For example, a parameter may have a string data type, in which case the values for the parameter can include any alphanumeric string or Unicode string of up to a maximum length. A workflow also generally includes a set of parameters 1306 that store values manipulated during execution of the workflow. This set of parameters is similar to a set of global variables provided by many common programming languages. In addition, attributes can be defined within individual elements of a workflow, and can be used to pass values between elements. In FIG. 13A, for example, attributes 1308-1309 are defined within element 1310 and attributes 1311, 1312, and 1313 are defined within elements 1314, 1315, and 1316, respectively. Elements, such as elements 1318, 1310, 1320, 1314-1316, and 1322 in FIG. 13A, are the execution entities within a workflow. Elements are equivalent to one or a combination of common constructs in programming languages, including subroutines, control structures, error handlers, and facilities for launching asynchronous and synchronous procedures. Elements may correspond to script routines, for example, developed to carry out an almost limitless number of different computational tasks. Elements are discussed, in greater detail, below.

As shown in FIG. 13B, the logical control flow within a workflow is specified by links, such as link 1330 which indicates that element 1310 is executed following completion of execution of element 1318. In FIG. 13B, links between elements are represented as single-headed arrows. Thus, links provide the logical ordering that is provided, in a common programming language, by the sequential ordering of statements. Finally, as shown in FIG. 13C, bindings that bind input parameters, output parameters, and attributes to particular roles with respect to elements specify the logical data flow in a workflow. In FIG. 13C, single-headed arrows, such as single-headed arrow 1332, represent bindings between elements and parameters and attributes. For example, bindings 1332 and 1333 indicate that the values of the first input parameters 1334 and 1335 are input to element 1318. Thus, the first two input parameters 1334-1335 play similar roles as arguments to functions in a programming language. As another example, the bindings represented by arrows 1336-1338 indicate that element 1318 outputs values that are stored in the first three attributes 1339, 1340, and 1341 of the set of attributes 1306.

Thus, a workflow is a graphically specified program, with elements representing executable entities, links representing logical control flow, and bindings representing logical data flow. A workflow can be used to specific arbitrary and arbitrarily complex logic, in a similar fashion as the specification of logic by a compiled, structured programming language, an interpreted language, or a script language.

FIGS. 14A-B include a table of different types of elements that may be included in a workflow. Workflow elements may include a start-workflow element 1402 and an end-workflow element 1404, examples of which include elements 1318 and 1322, respectively, in FIG. 13A. Decision workflow elements 1406-1407, an example of which is element 1317 in FIG. 13A, function as an if-then-else construct commonly provided by structured programming languages. Scriptable-task elements 1408 are essentially script routines included in a workflow. A user-interaction element 1410 solicits input from a user during workflow execution. Waiting-timer and waiting-event elements 1412-1413 suspend workflow execution for a specified period of time or until the occurrence of a specified event. Thrown-exception elements 1414 and error-handling elements 1415-1416 provide functionality commonly provided by throw-catch constructs in common programming languages. A switch element 1418 dispatches control to one of multiple paths, similar to switch statements in common programming languages, such as C and C++. A for each element 1420 is a type of iterator. External workflows can be invoked from a currently executing workflow by a workflow element 1422 or asynchronous-workflow element 1423. An action element 1424 corresponds to a call to a workflow-library routine. A workflow-note element 1426 represents a comment that can be included within a workflow. External workflows can also be invoked by schedule-workflow and nested-workflows elements 1428 and 1429.

Figure 15A:
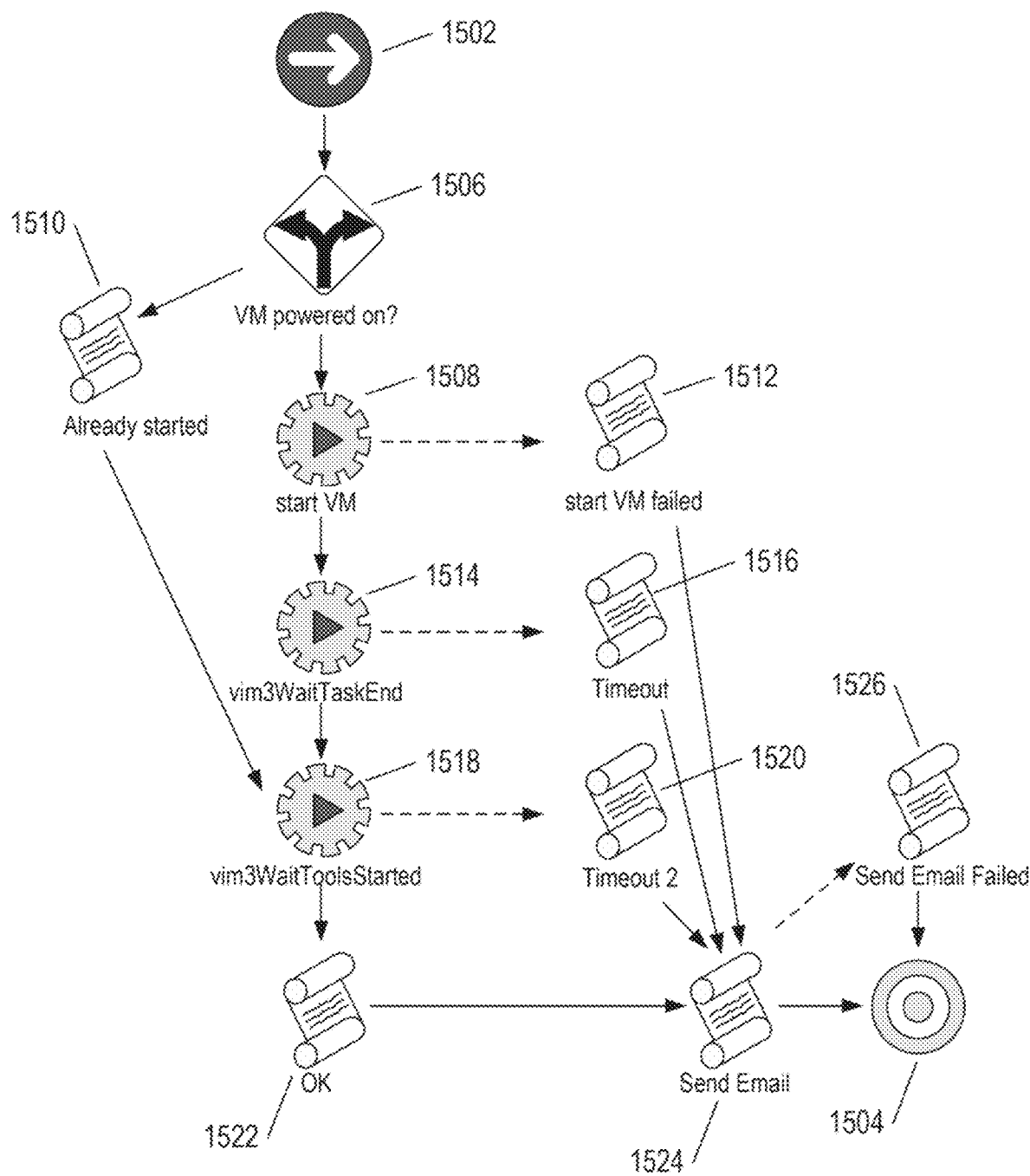
FIGS. 15A-B show an example workflow.
Figure 15B:
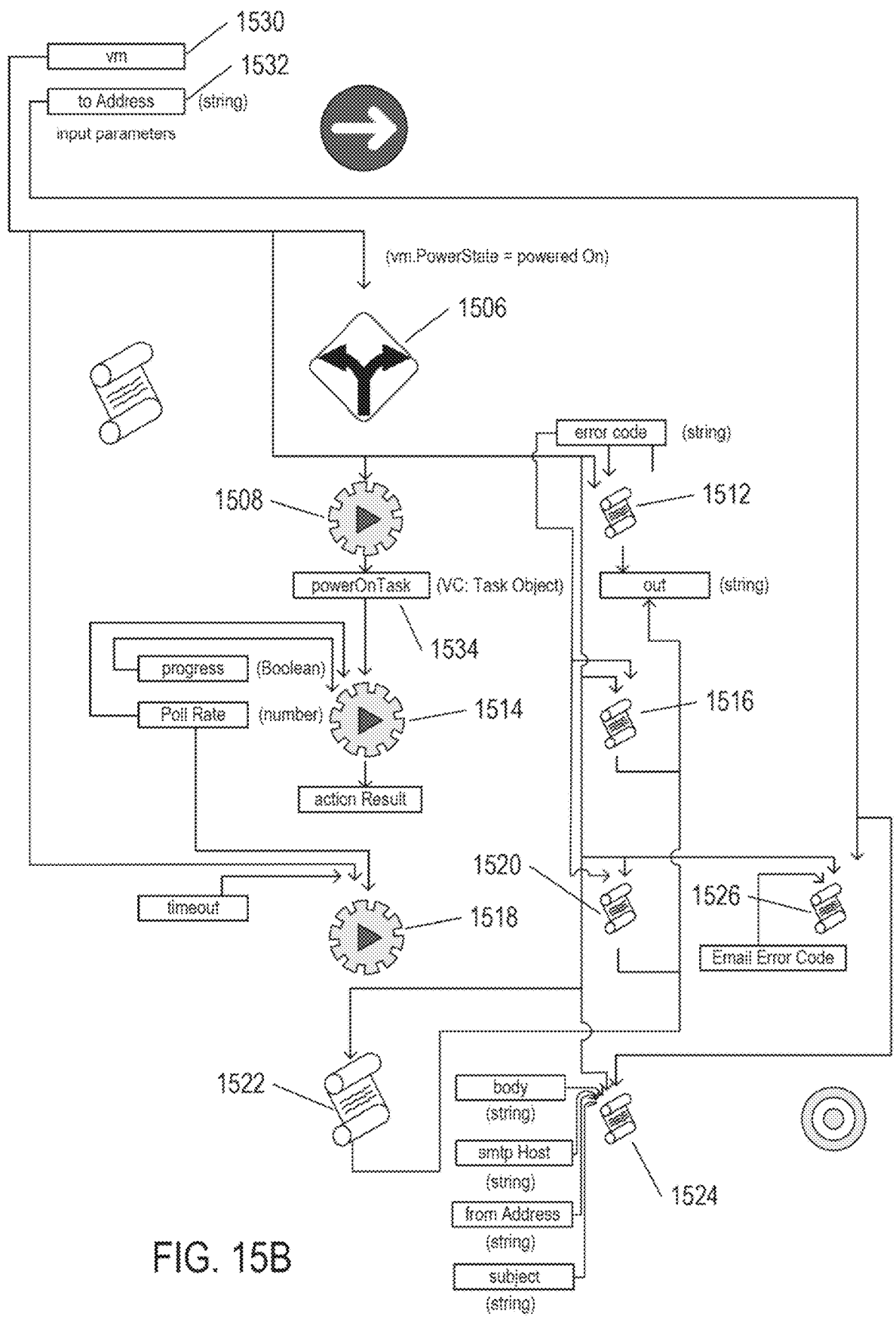

FIGS. 15A-B show an example workflow. The workflow shown in FIG. 15A is a virtual-machine-starting workflow that prompts a user to select a virtual machine to start and provides an email address to receive a notification of the outcome of workflow execution. The prompts are defined as input parameters. The workflow includes a start-workflow element 1502 and an end-workflow element 1504. The decision element 1506 checks to see whether or not the specified virtual machine is already powered on. When the VM is not already powered on, control flows to a start-VM action 1508 that calls a workflow-library function to launch the VM. Otherwise, the fact that the VM was already powered on is logged, in an already-started scripted element 1510. When the start operation fails, a start-VM-failed scripted element 1512 is executed as an exception handler and initializes an email message to report the failure. Otherwise, control flows to a vim3WaitTaskEnd action element 1514 that monitors the VM-starting task. A timeout exception handler is invoked when the start-VM task does not finish within a specified time period. Otherwise, control flows to a vim3WaitToolsStarted task 1518 which monitors starting of a tools application on the virtual machine. When the tools application fails to start, then a second timeout exception handler is invoked 1520. When all the tasks successfully complete, an OK scriptable task 1522 initializes an email body to report success. The email that includes either an error message or a success message is sent in the send-email scriptable task 1524. When sending the email fails, an email exception handler 1526 is called. The already-started, OK, and exception-handler scriptable elements 1510, 1512, 1516, 1520, 1522, and 1526 all log entries to a log file to indicate various conditions and errors. Thus, the workflow shown in FIG. 15A is a simple workflow that allows a user to specify a VM for launching to run an application.

FIG. 15B shows the parameter and attribute bindings for the workflow shown in FIG. 15A. The VM to start and the address to send the email are shown as input parameters 1530 and 1532. The VM to start is input to decision element 1506, start-VM action element 1508, the exception handlers 1512, 1516, 1520, and 1526, the send-email element 1524, the OK element 1522, and the vim3WaitToolsStarted element 1518. The email address furnished as input parameter 1532 is input to the email exception handler 1526 and the send-email element 1524. The VM-start task 1508 outputs an indication of the power on task initiated by the element in attribute 1534 which is input to the vim3WaitTaskEnd action element 1514. Other attribute bindings, input, and outputs are shown in FIG. 15B by additional arrows.

Figure 16A:
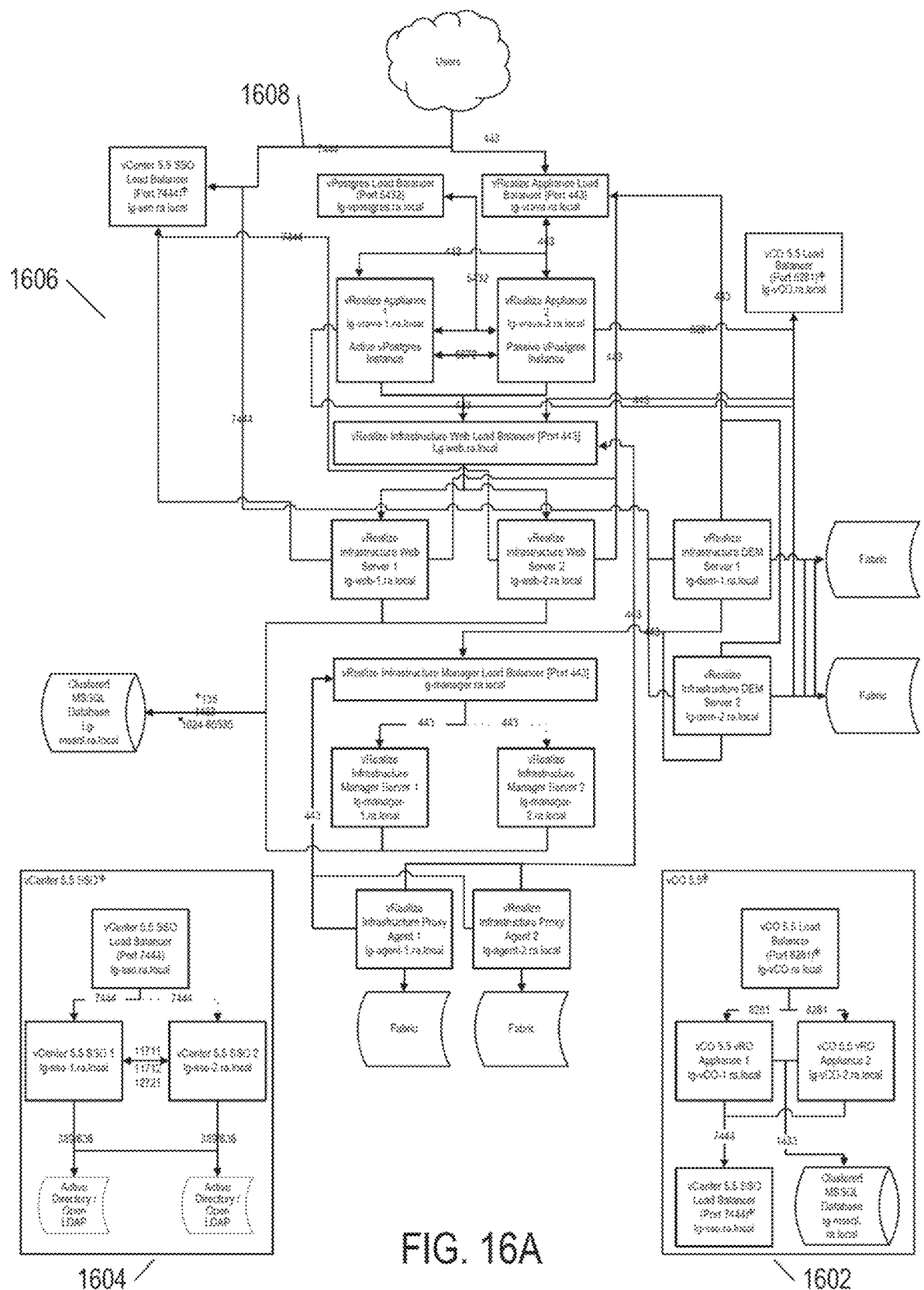

FIGS. 16A-C illustrate an example implementation and configuration of virtual appliances within a cloud-computing facility that implement the workflow-based management and administration facilities of the above-described WFMAD. FIG. 16A shows a configuration that includes the workflow-execution engine and development environment 1602, a cloud-computing facility 1604, and the infrastructure-management-and-administration facility 1606 of the above-described WFMAD. Data and information exchanges between components are illustrated with arrows, such as arrow 1608, labeled with port numbers indicating inbound and outbound ports used for data and information exchanges. FIG. 16B provides a table of servers, the services provided by the server, and the inbound and outbound ports associated with the server. Table 16C indicates the ports balanced by various load balancers shown in the configuration illustrated in FIG. 16A. It can be easily ascertained from FIGS. 16A-C that the WFMAD is a complex, multi-virtual-appliance/virtual-server system that executes on many different physical devices of a physical cloud-computing facility.

Figure 16D:
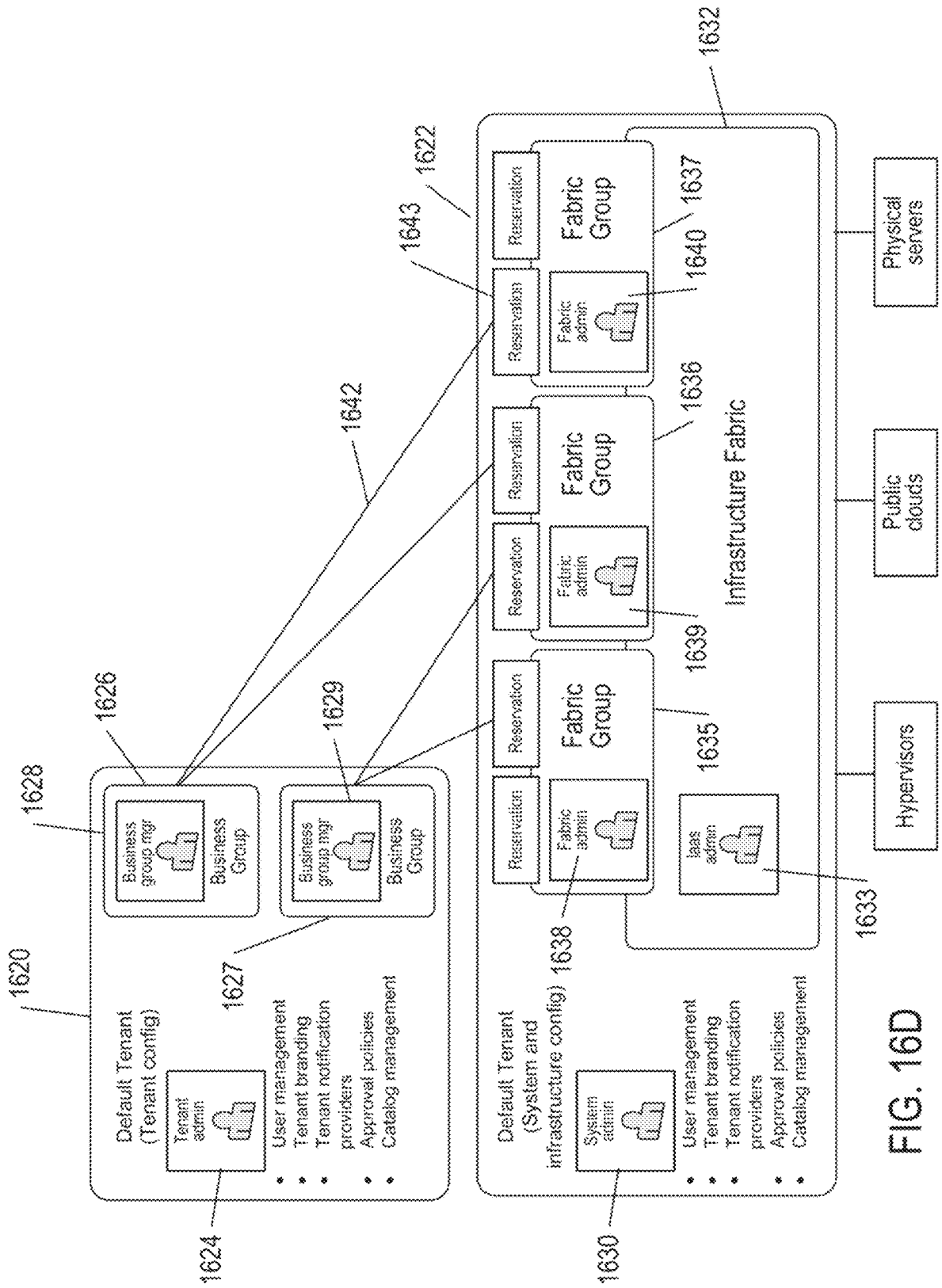
FIGS. 16D-F illustrate the logical organization of users and user roles with respect to the infrastructure-management-and-administration facility of the WFMAD.
Figure 16E:
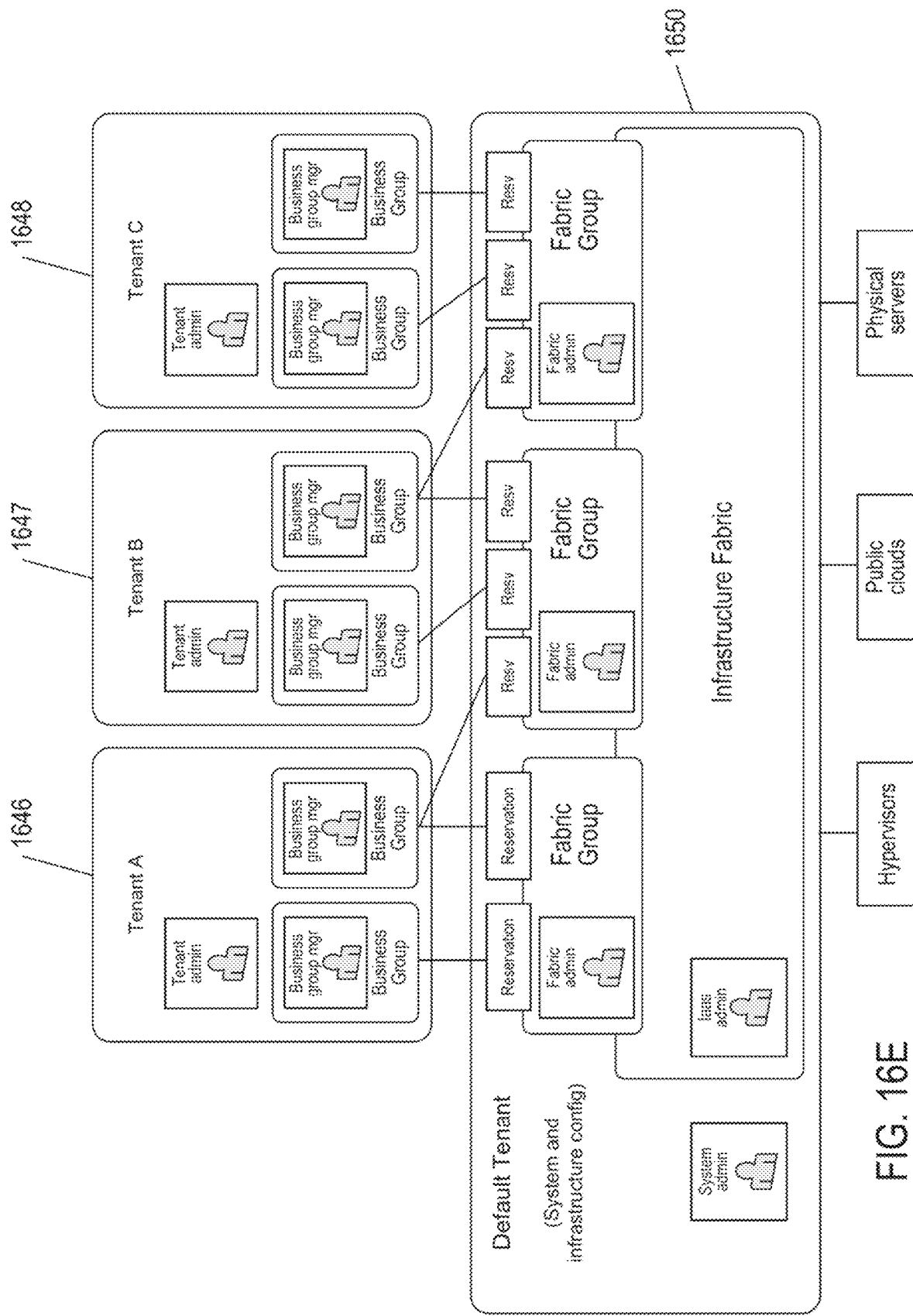
Figure 16F:
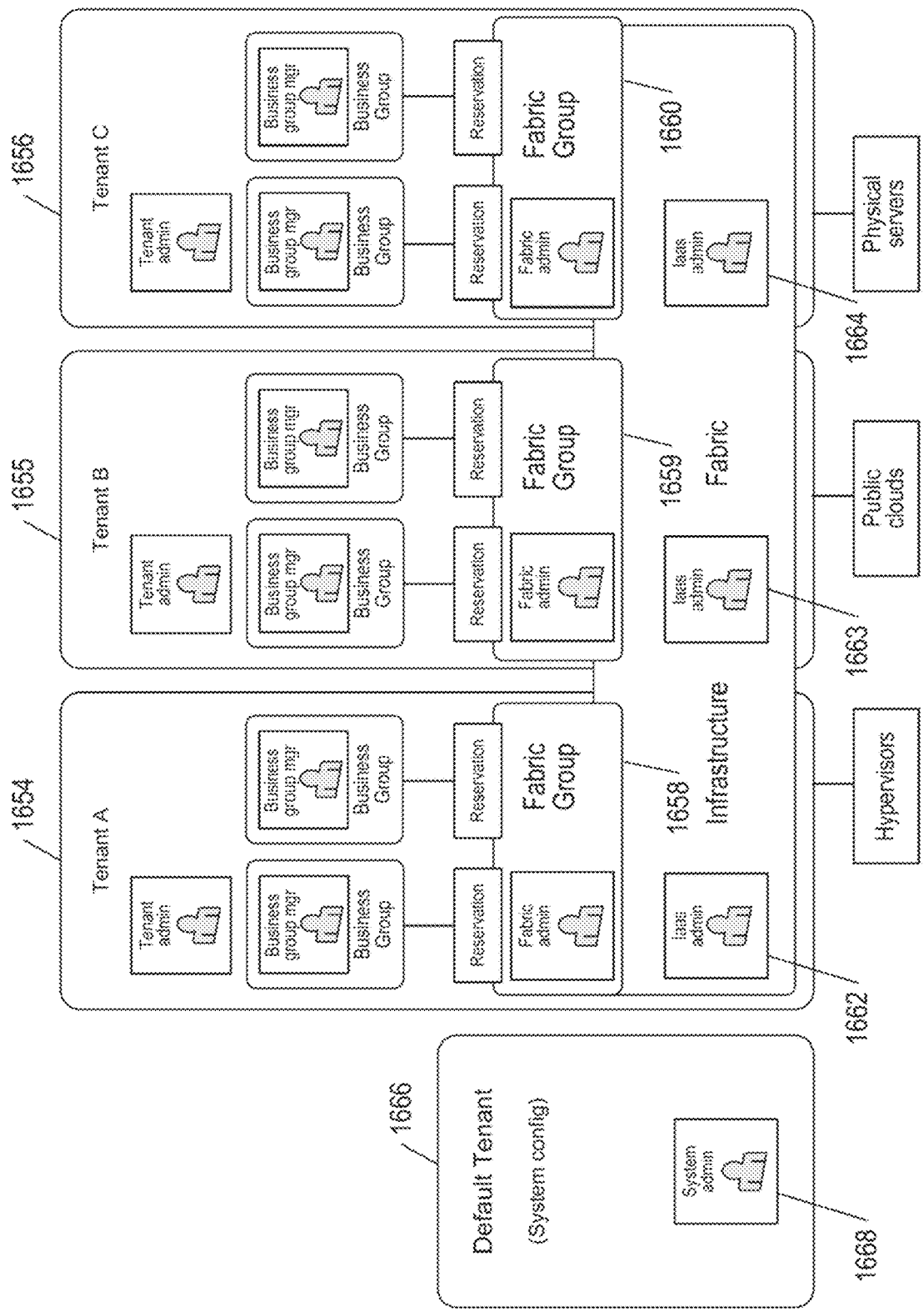

FIGS. 16D-F illustrate the logical organization of users and user roles with respect to the infrastructure-management-and-administration facility of the WFMAD (1114 in FIG. 11). FIG. 16D shows a single-tenant configuration, FIG. 16E shows a multi-tenant configuration with a single default-tenant infrastructure configuration, and FIG. 16F shows a multi-tenant configuration with a multi-tenant infrastructure configuration. A tenant is an organizational unit, such as a business unit in an enterprise or company that subscribes to cloud services from a service provider. When the infrastructure-management-and-administration facility is initially deployed within a cloud-computing facility or cloud-computing-facility aggregation, a default tenant is initially configured by a system administrator. The system administrator designates a tenant administrator for the default tenant as well as an identity store, such as an active-directory server, to provide authentication for tenant users, including the tenant administrator. The tenant administrator can then designate additional identity stores and assign roles to users or groups of the tenant, including business groups, which are sets of users that correspond to a department or other organizational unit within the organization corresponding to the tenant. Business groups are, in turn, associated with a catalog of services and infrastructure resources. Users and groups of users can be assigned to business groups. The business groups, identity stores, and tenant administrator are all associated with a tenant configuration. A tenant is also associated with a system and infrastructure configuration. The system and infrastructure configuration includes a system administrator and an infrastructure fabric that represents the virtual and physical computational resources allocated to the tenant and available for provisioning to users. The infrastructure fabric can be partitioned into fabric groups, each managed by a fabric administrator. The infrastructure fabric is managed by an infrastructure-as-a-service ("IAAS") administrator. Fabric-group computational resources can be allocated to business groups by using reservations.

FIG. 16D shows a single-tenant configuration for an infrastructure-management-and-administration facility deployment within a cloud-computing facility or cloud-computing-facility aggregation. The configuration includes a tenant configuration 1620 and a system and infrastructure configuration 1622. The tenant configuration 1620 includes a tenant administrator 1624 and several business groups 1626-1627, each associated with a business-group manager 1628-1629, respectively. The system and infrastructure configuration 1622 includes a system administrator 1630, an infrastructure fabric 1632 managed by an IAAS administrator 1633, and three fabric groups 1635-1637, each managed by a fabric administrator 1638-1640, respectively. The computational resources represented by the fabric groups are allocated to business groups by a reservation system, as indicated by the lines between business groups and reservation blocks, such as line 1642 between reservation block 1643 associated with fabric group 1637 and the business group 1626.

FIG. 16E shows a multi-tenant single-tenant-system-and-infrastructure-configuration deployment for an infrastructure-management-and-administration facility of the WFMAD. In this configuration, there are three different tenant organizations, each associated with a tenant configuration 1646-1648. Thus, following configuration of a default tenant, a system administrator creates additional tenants for different organizations that together share the computational resources of a cloud-computing facility or cloud-computing-facility aggregation. In general, the computational resources are partitioned among the tenants so that the computational resources allocated to any particular tenant are segregated from and inaccessible to the other tenants. In the configuration shown in FIG. 16E, there is a single default-tenant system and infrastructure configuration 1650, as in the previously discussed configuration shown in FIG. 16D.

FIG. 16F shows a multi-tenant configuration in which each tenant manages its own infrastructure fabric. As in the configuration shown in FIG. 16E, there are three different tenants 1654-1656 in the configuration shown in FIG. 16F. However, each tenant is associated with its own fabric group 1658-1660, respectively, and each tenant is also associated with an infrastructure-fabric IAAS administrator 1662-1664, respectively. A default-tenant system configuration 1666 is associated with a system administrator 1668 who administers the infrastructure fabric, as a whole.

System administrators, as mentioned above, generally install the WFMAD within a cloud-computing facility or cloud-computing-facility aggregation, create tenants, manage system-wide configuration, and are generally responsible for insuring availability of WFMAD services to users, in general. IAAS administrators create fabric groups, configure virtualization proxy agents, and manage cloud service accounts, physical machines, and storage devices. Fabric administrators manage physical machines and computational resources for their associated fabric groups as well as reservations and reservation policies through which the resources are allocated to business groups. Tenant administrators configure and manage tenants on behalf of organizations. They manage users and groups within the tenant organization, track resource usage, and may initiate reclamation of provisioned resources. Service architects create blueprints for items stored in user service catalogs which represent services and resources that can be provisioned to users. The infrastructure-management-and-administration facility defines many additional roles for various administrators and users to manage provision of services and resources to users of cloud-computing facilities and cloud-computing facility aggregations.

Figure 17:
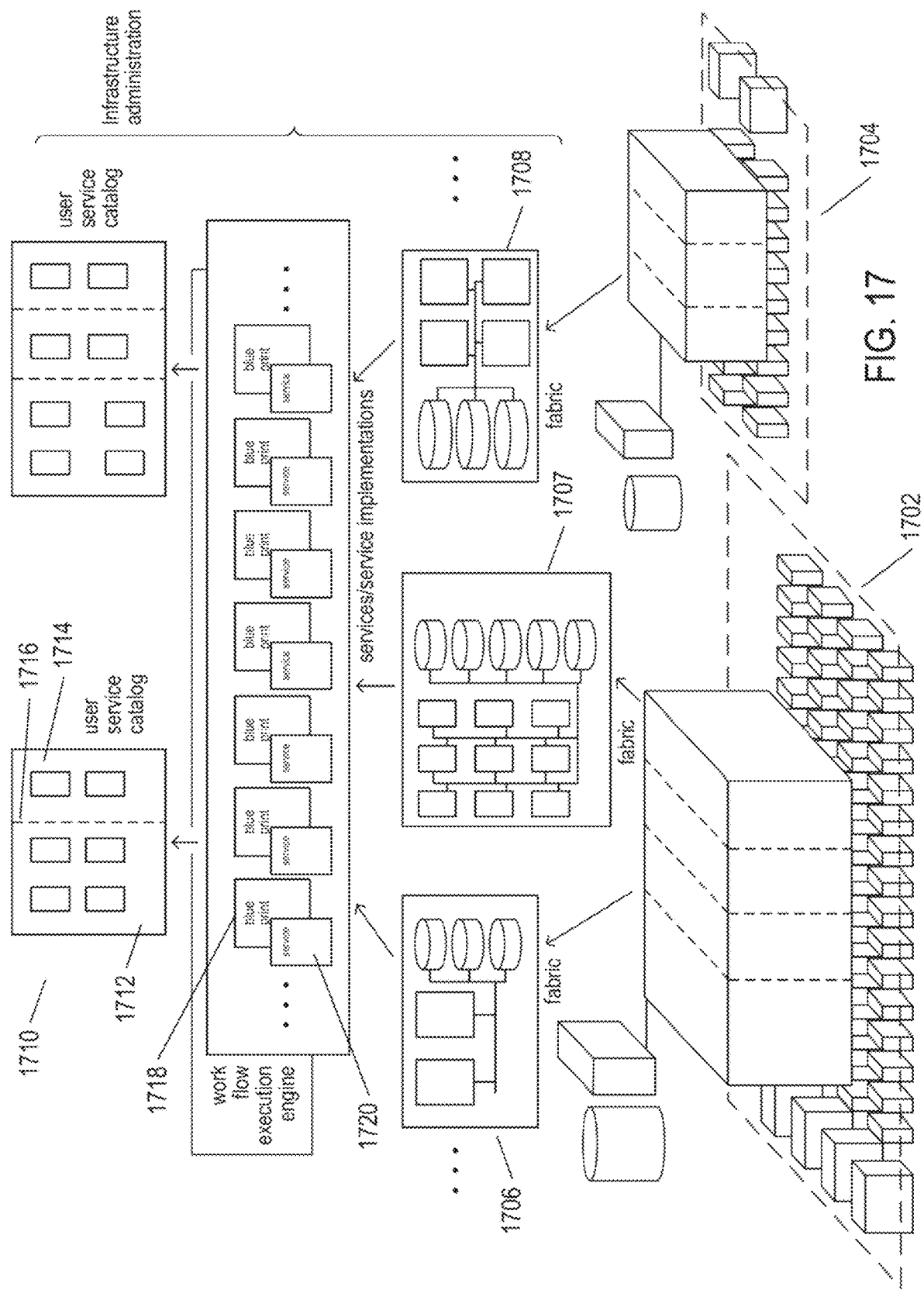
FIG. 17 illustrates the logical components of the infrastructure-management-and-administration facility of the WFMAD.

FIG. 17 illustrates the logical components of the infrastructure-management-and-administration facility (1114 in FIG. 11) of the WFMAD. As discussed above, the WFMAD is implemented within, and provides a management and development interface to, one or more cloud-computing facilities 1702 and 1704. The computational resources provided by the cloud-computing facilities, generally in the form of virtual servers, virtual storage devices, and virtual networks, are logically partitioned into fabrics 1706-1708. Computational resources are provisioned from fabrics to users. For example, a user may request one or more virtual machines running particular applications. The request is serviced by allocating the virtual machines from a particular fabric on behalf of the user. The services, including computational resources and workflow-implemented tasks, which a user may request provisioning of, are stored in a user service catalog, such as user service catalog 1710, that is associated with particular business groups and tenants. In FIG. 17, the items within a user service catalog are internally partitioned into categories, such as the two categories 1712 and 1714 and separated logically by vertical dashed line 1716. User access to catalog items is controlled by entitlements specific to business groups. Business group managers create entitlements that specify which users and groups within the business group can access particular catalog items. The catalog items are specified by service-architect-developed blueprints, such as blueprint 1718 for service 1720. The blueprint is a specification for a computational resource or task-service and the service itself is implemented by a workflow that is executed by the workflow-execution engine on behalf of a user.

FIGS. 18-20B provide a high-level illustration of the architecture and operation of the automated-application-release-management facility (1116 in FIG. 11) of the WFMAD. The application-release management process involves storing, logically organizing, and accessing a variety of different types of binary files and other files that represent executable programs and various types of data that are assembled into complete applications that are released to users for running on virtual servers within cloud-computing facilities. Previously, releases of new version of applications may have occurred over relatively long time intervals, such as biannually, yearly, or at even longer intervals. Minor versions were released at shorter intervals. However, more recently, automated application-release management has provided for continuous release at relatively short intervals in order to provide new and improved functionality to clients as quickly and efficiently as possible.

Figure 18:
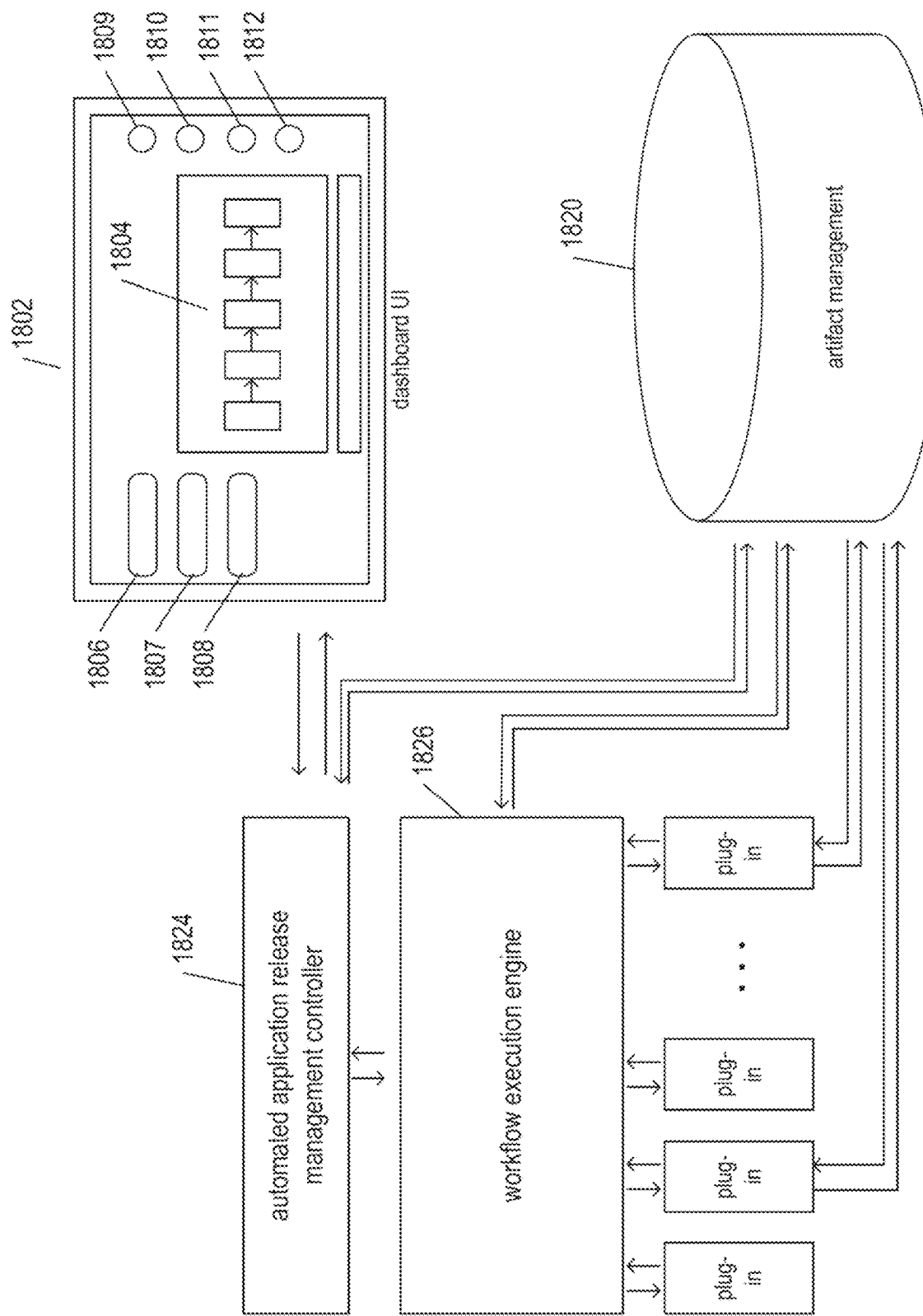
FIGS. 18-20B provide a high-level illustration of the architecture and operation of the automated-application-release-management facility of the WFMAD.

FIG. 18 shows main components of the automated-application-release-management facility (1116 in FIG. 11). The automated-application-release-management component provides a dashboard user interface 1802 to allow release managers and administrators to launch release pipelines and monitor their progress. The dashboard may visually display a graphically represented pipeline 1804 and provide various input features 1806-1812 to allow a release manager or administrator to view particular details about an executing pipeline, create and edit pipelines, launch pipelines, and generally manage and monitor the entire application-release process. The various binary files and other types of information needed to build and test applications are stored in an artifact-management component 1820. An automated-application-release-management controller 1824 sequentially initiates execution of various workflows that together implement a release pipeline and serves as an intermediary between the dashboard user interface 1802 and the workflow-execution engine 1826.

Figure 19:
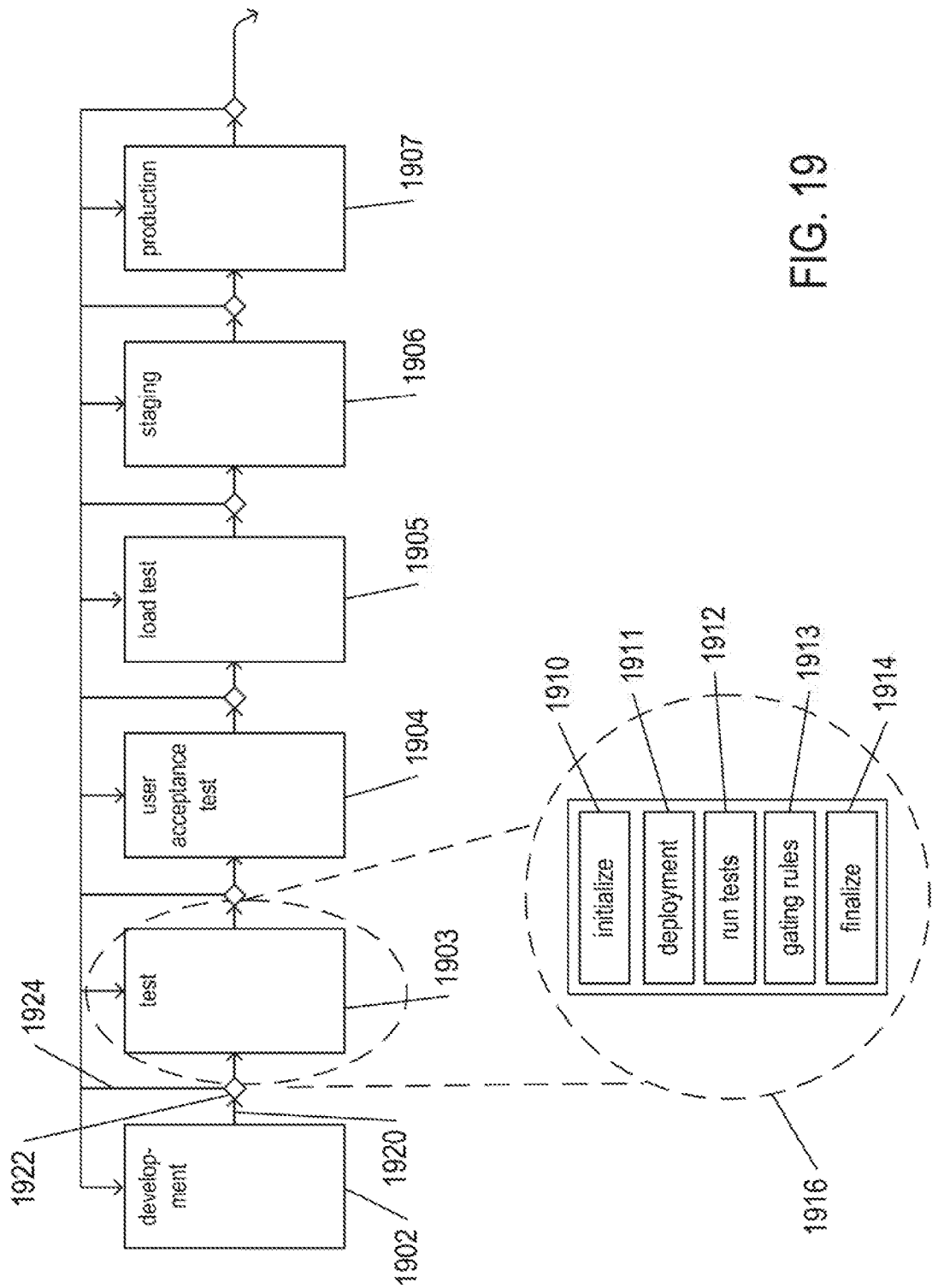

FIG. 19 illustrates a release pipeline. The release pipeline is a sequence of stages 1902-1907 that each comprises a number of sequentially executed tasks, such as the tasks 1910-1914 shown in inset 1916 that together compose stage 1903. In general, each stage is associated with gating rules that are executed to determine whether or not execution of the pipeline can advance to a next, successive stage. Thus, in FIG. 19, each stage is shown with an output arrow, such as output arrow 1920, that leads to a conditional step, such as conditional step 1922, representing the gating rules. When, as a result of execution of tasks within the stage, application of the gating rules to the results of the execution of the tasks indicates that execution should advance to a next stage, then any final tasks associated with the currently executing stage are completed and pipeline execution advances to a next stage. Otherwise, as indicated by the vertical lines emanating from the conditional steps, such as vertical line 1924 emanating from conditional step 1922, pipeline execution may return to re-execute the current stage or a previous stage, often after developers have supplied corrected binaries, missing data, or taken other steps to allow pipeline execution to advance.

Figure 20A:
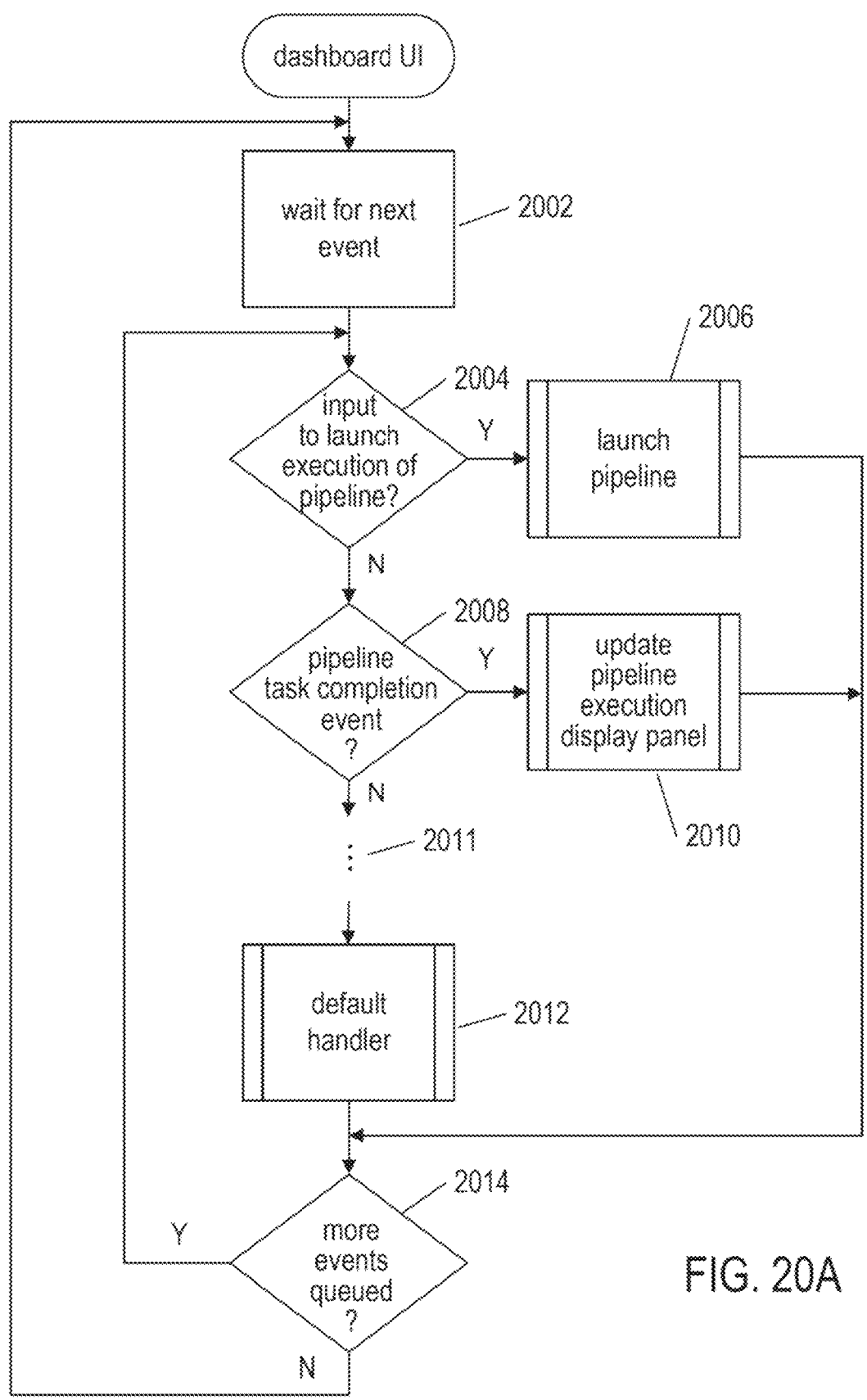

FIGS. 20A-8 provide control-flow diagrams that indicate the general nature of dashboard and automated-application-release-management-controller operation. FIG. 20A shows a partial control-flow diagram for the dashboard user interface. In step 2002, the dashboard user interface waits for a next event to occur. When the next occurring event is input, by a release manager, to the dashboard to direct launching of an execution pipeline, as determined in step 2004, then the dashboard calls a launch-pipeline routine 2006 to interact with the automated-application-release-management controller to initiate pipeline execution. When the next-occurring event is reception of a pipeline task-completion event generated by the automated-application-release-management controller, as determined in step 2008, then the dashboard updates the pipeline-execution display panel within the user interface via a call to the routine "update pipeline execution display panel" in step 2010. There are many other events that the dashboard responds to, as represented by ellipses 2011, including many additional types of user input and many additional types of events generated by the automated-application-release-management controller that the dashboard responds to by altering the displayed user interface. A default handler 2012 handles rare or unexpected events. When there are more events queued for processing by the dashboard, as determined in step 2014, then control returns to step 2004. Otherwise, control returns to step 2002 where the dashboard waits for another event to occur.

Figure 20B:
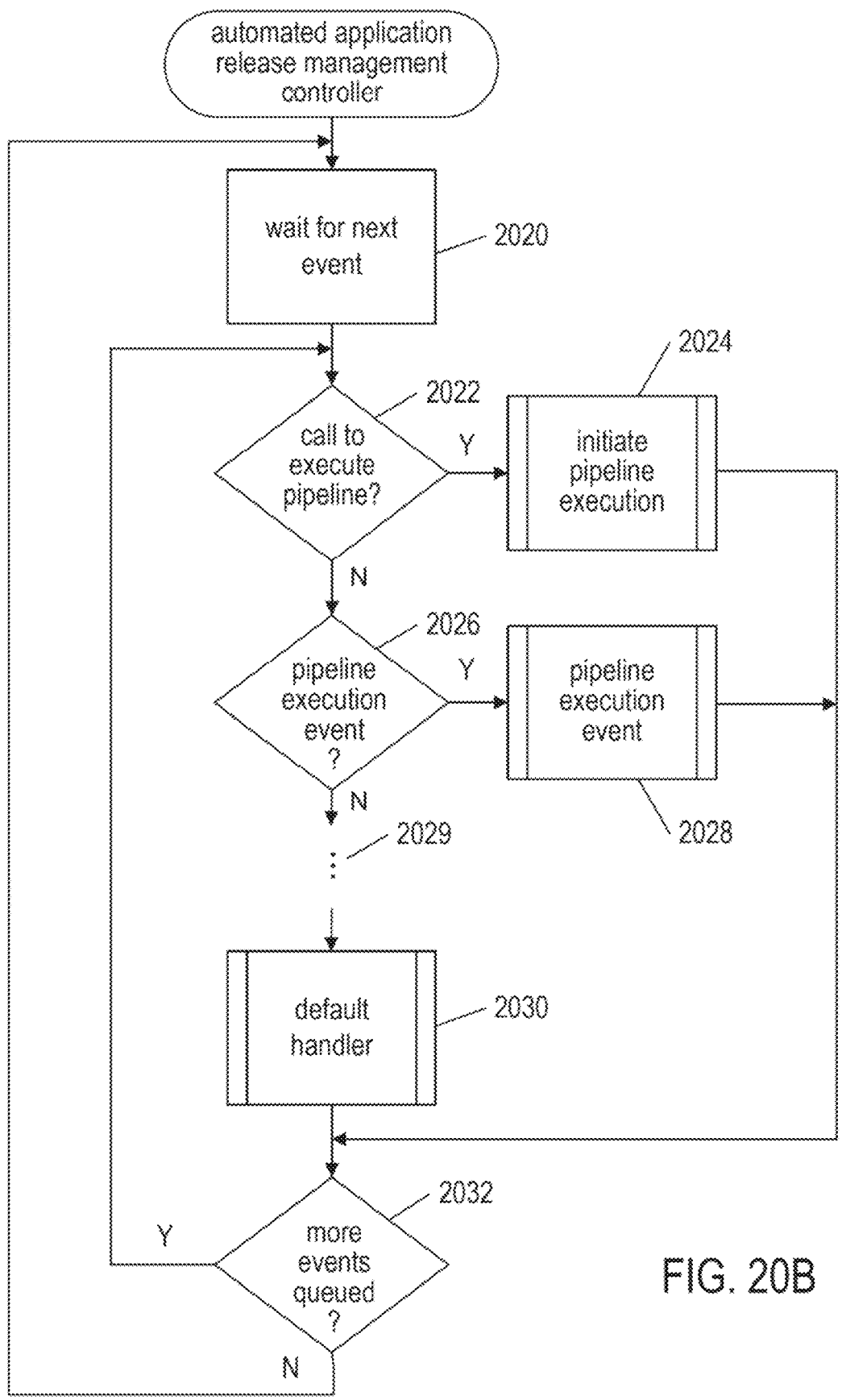

FIG. 20B shows a partial control-flow diagram for the automated application-release-management controller. The control-flow diagram represents an event loop, similar to the event loop described above with reference to FIG. 20A. In step 2020, the automated application-release-management controller waits for a next event to occur. When the event is a call from the dashboard user interface to execute a pipeline, as determined in step 2022, then a routine is called, in step 2024, to initiate pipeline execution via the workflow-execution engine. When the next-occurring event is a pipeline-execution event generated by a workflow, as determined in step 2026, then a pipeline-execution-event routine is called in step 2028 to inform the dashboard of a status change in pipeline execution as well as to coordinate next steps for execution by the workflow-execution engine. Ellipses 2029 represent the many additional types of events that are handled by the event loop. A default handler 2030 handles rare and unexpected events. When there are more events queued for handling, as determined in step 2032, control returns to step 2022. Otherwise, control returns to step 2020 where the automated application-release-management controller waits for a next event to occur.

The Subsystem, and Methods Incorporated within the Subsystem, to which the Current Document is Directed The current document is directed to optimizing testing of applications and other computer-instruction-implemented systems during a source-code-submission, or check-in, process carried out by an automated application-release-management system. The currently disclosed methods and subsystems are discussed below with reference to FIGS. 21A-27C.

Figure 21A:
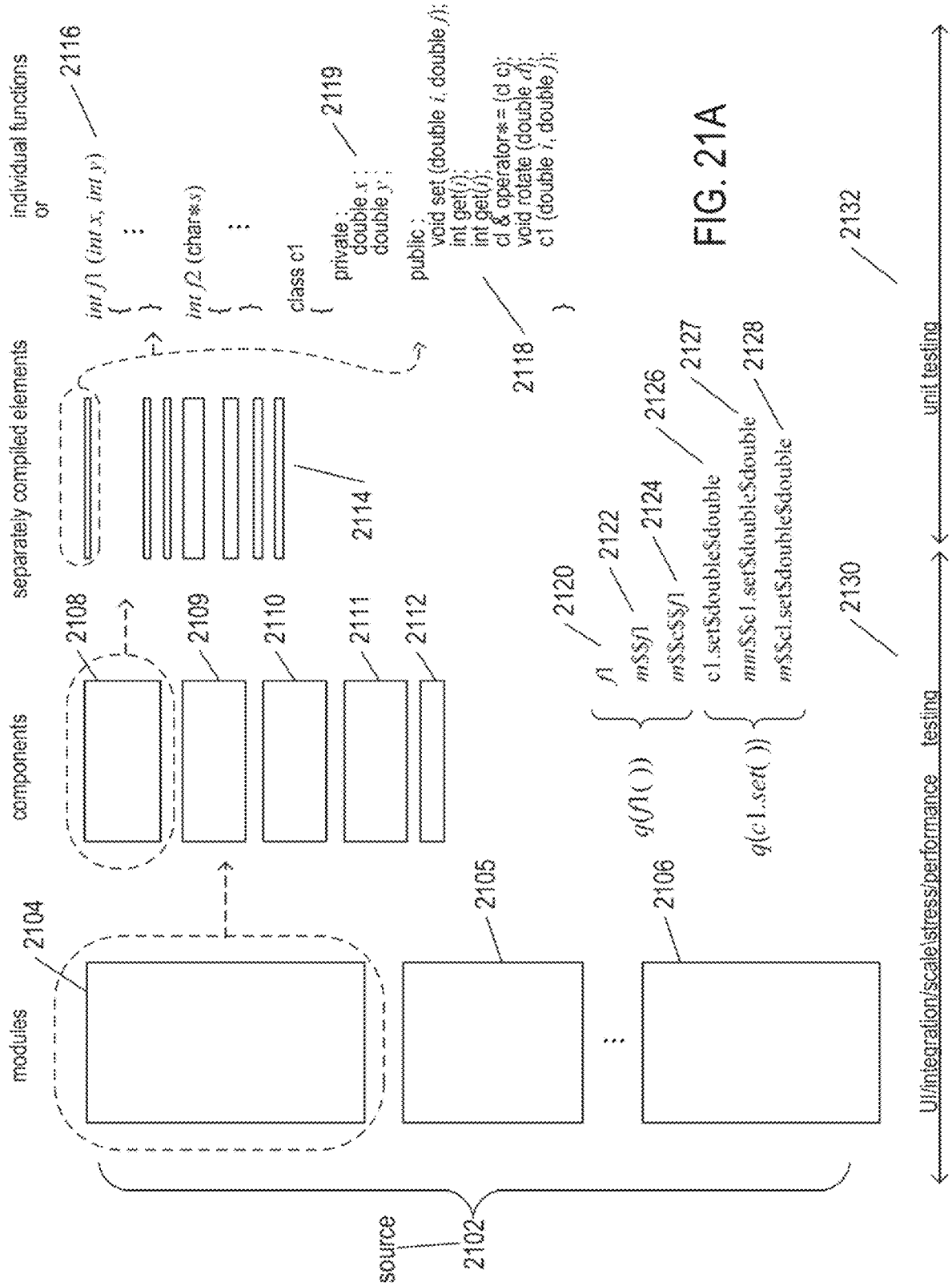
Figure 21C:
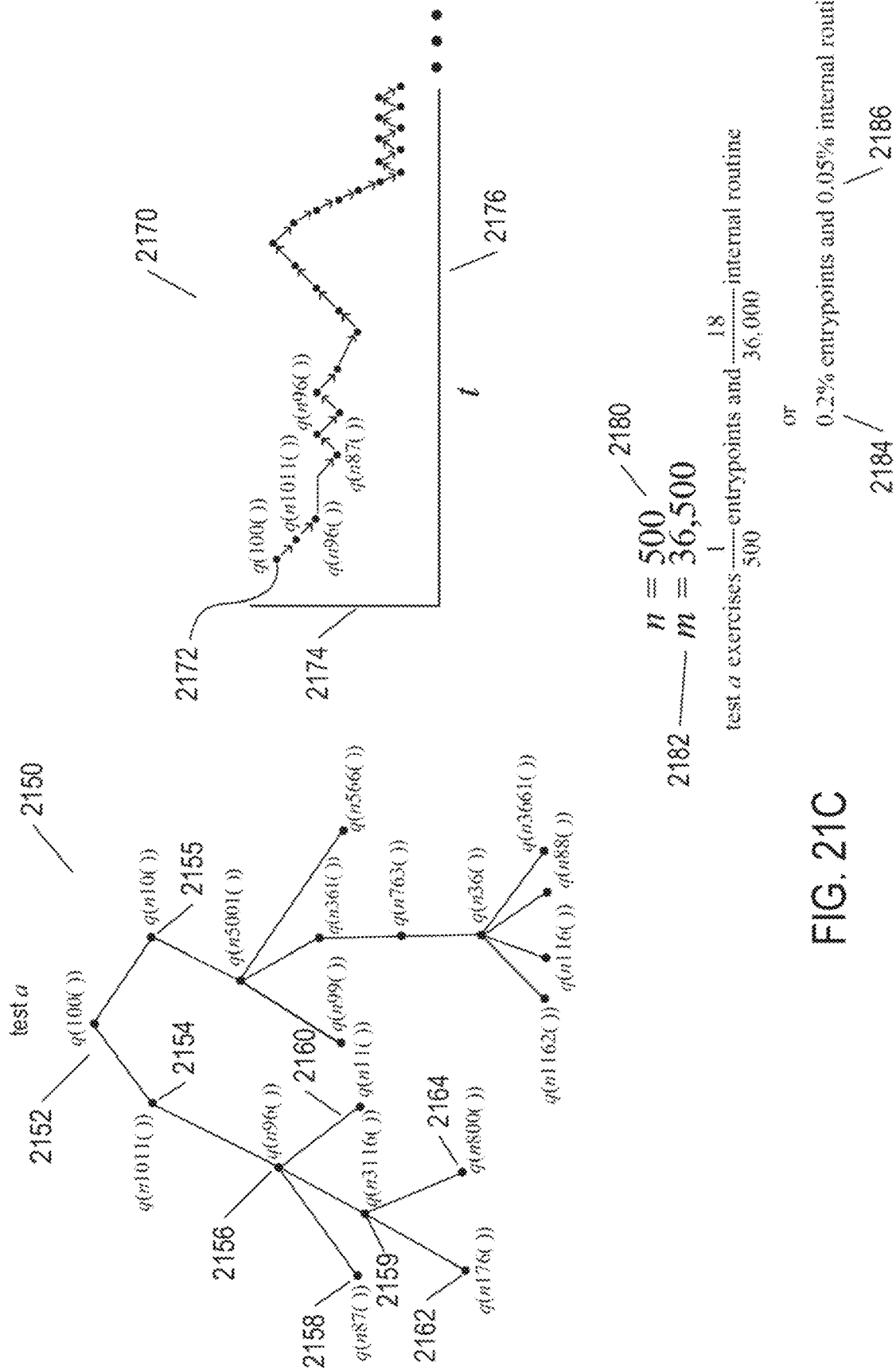

FIGS. 21A-C illustrate source code and entry points for an application or system constructed from executables generated by compiling the source code. FIG. 21A illustrates a source-code hierarchy as well as the concept of fully qualified routine names. In FIG. 21A, the source code for an application or other system 2102 can be considered to comprise a set of high-level modules 2104-2106, each of which can be considered to comprise a number of components 2108-2112. Each component comprises a number of separately compilable elements, or compilation units 2114, each of which may include the source code for individual functions and routines or for a group of functions or routines. In procedural languages, such as C, the names of routines or functions, such as the function "ƒ1" 2116, are generally globally unique either within the entire source code or up to the high-level modules in which they are included. In object-oriented language, such as C++, a compilation unit may include individual member functions or member routines of classes or, in most cases, the member routines within a class, such as the member functions 2118 within class "c1" 2119 shown in FIG. 21A. In general, in object-orientated languages, member-function names are not globally unique, and must be qualified with additional information, including the name of the class in which they are included and the types of their input arguments. In the following discussion, it is assumed that a function q( ) can be applied to a function or routine name within the source code in order to generate a fully qualified name that is unique with respect to the entire source code. For example, applying the function q( ) to the routine name "ƒ1" for the procedural function 2116 may generate "ƒ1" 2120, when function names are globally unique for the entire source code, may generate the string 2122 when function names are unique only within the modules in which they are contained, or may generate the string 2124 when function names are unique only within the components in which they are contained. Note that double dollar signs ($$) are used in the strings to separate the names of modules, components, and functions or routines. Similarly, the function q( ) applied to the member function name c1.set( ) within the class c1 2119 may generate a fully qualified corresponding member function name, such as the examples 2126-2128 shown in FIG. 21A, depending on the level and the source code at which member-function names are unique. These examples of fully-qualified function or routine names are but a few of the many possible types of globally unique renderings of function names that may be produced by alternative implementations of the function q( ).

At the bottom of FIG. 21A, double-arrow annotations 2130 and 2132 indicate the levels of the source-code hierarchy at which different types of tests are applied. Unit tests 2132 are generally applied to separately compilable elements, or compilation units. In many cases, unit testing is incorporated into the logic or workflows responsible for compiling compilation units during the check-in process. By contrast, the other types of testing, including user interface testing, integration testing, scale/stress testing, and performance testing are generally carried out once large executable portions of the application or system have been generated or, in many cases, once the entire system has been generated. The source-code hierarchy illustrated in FIG. 21A is only one example of many possible source-code hierarchies.

FIG. 21B illustrates a higher-level view of a system built by compiling source code to computer instructions, building the compiled source code into executables, and combining executables into a large application or other type of computer-instruction-implemented system. From the standpoint of testing routines and for other types of programs that call or invoke functionality within the application or system, the system can be viewed as a set of entry points, or externally accessible routines and functions 2140. The actual computer-instruction-implemented application or system 2142 is, in this view, generally a black box that is known to include a much larger number of internal routines 2144 in addition to the entry-point routines and functions 2140. Note that, in FIG. 21B, the notation q(1( ) indicates the fully qualified function or routine name for a first entry-point routine. There are n entry point routines 2140 and m-n internal routines 2144.

FIG. 21C illustrates the functionality invoked by a test routine a. This functionality can be illustrated using an acyclic graph 2150 in which the root node 2152 corresponds to an entry point called by the test routine and subsequent, lower-level nodes, such as nodes 2154 and 2155, represent internal routines. A path from the root node downward represents a sequence of nested routine calls that occur when the entry point is called by the test routine. For example, the test routine illustrated by acyclic graph 2150 first calls entry point 2152. This entry-point routine calls internal routines 2154 and 2155. Internal routine 2154 calls internal routine 2156, which calls internal routines 2158-2160. Internal routine 2159 calls routines 2162 and 2164. The execution sequence of internal routines may be alternatively plotted in a time plot 2170 where the nodes or points, such as 2172, represent particular routines, the vertical axis 2174 represents the depth of nested routine calls, and the horizontal axis represents time 2176.

As shown at the bottom of FIG. 21C, in an example application or system, there may be 500 entry points 2180 and 36,500 total entry points and internal routines 2182. Test a, illustrated by acyclic graph 2150, calls or executes only a single entry point of the 500 entry points provided by the application or system and, when the entry point routine executes, a total of 18 internal routines are executed by direct or nested calls. Thus, test a exercises only 0.2 percent 2184 of the entry points and only 0.05 percent 2186 of the internal routines within a full application or system. Of course, in a real-world situation, the percentage of internal routines exercised by a particular test may be far higher, but the general point is that, in order to fully verify a system, a generally large set of individual tests are run in order to ensure that all of the internal routines are exercised during the testing process. Multiple tests may exercise any particular routine but, in many cases, only a small set of the total number of internal routines are exercised by any particular test.

Figure 22A:
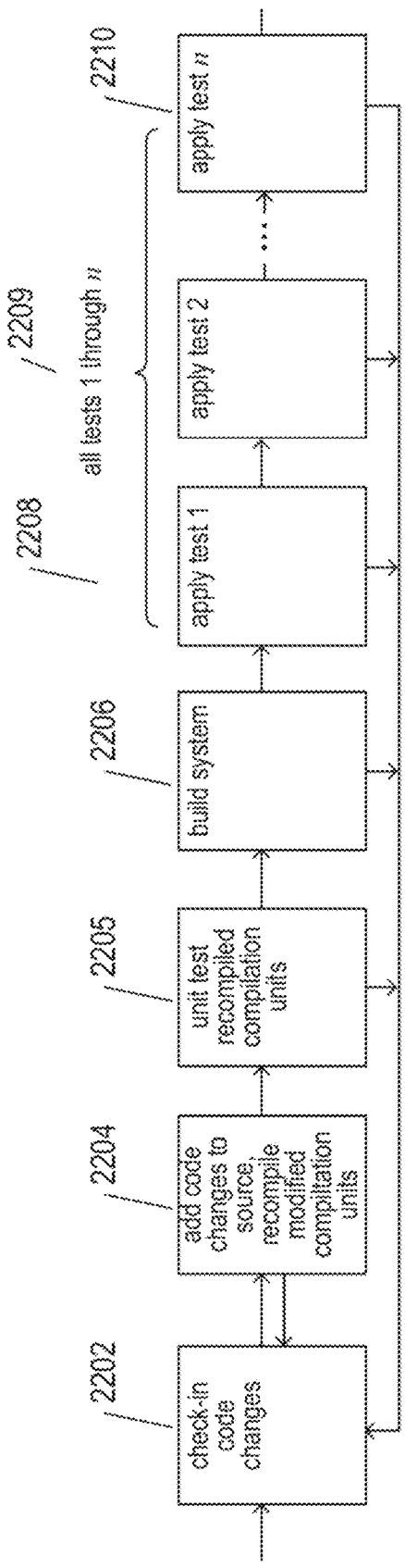
FIGS. 22A-B illustrate check-in pipelines or workflows that implement a source-code check-in process within an automated application-release-management system.
Figure 22B:
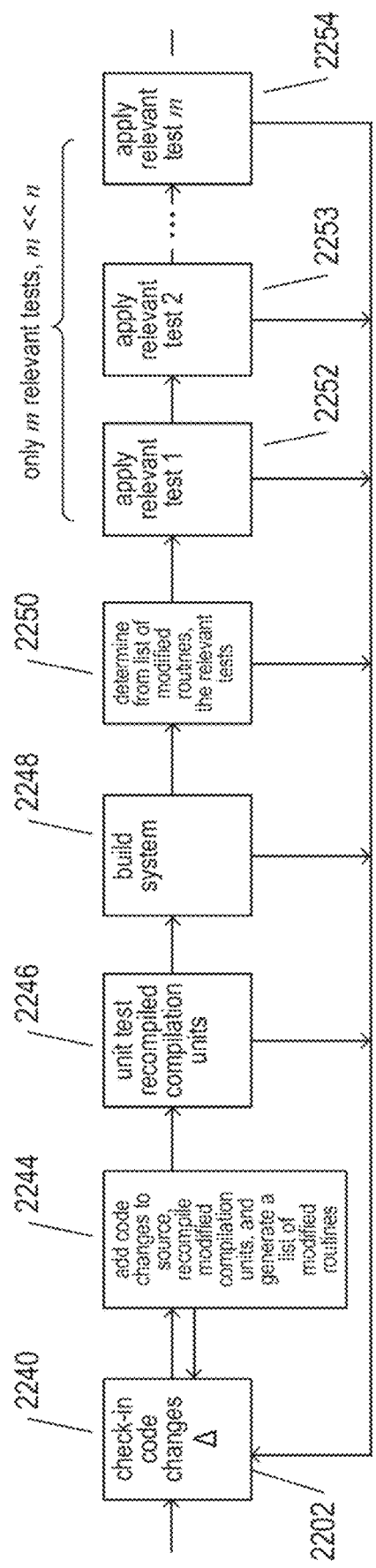

FIGS. 22A-B illustrate check-in pipelines or workflows that implement a source-code check-in process within an automated application-release-management system. FIG. 22A illustrates conventional check-in logic. In step 2202, a developer checks in source-code changes through a displayed interface or through a local check-in executable that accesses the check-in logic of the automated application-release-management system. In step 2204, the code changes are made to the source code for the application or system and the modified compilation units are recompiled. In step 2205, the recompiled compilation units are unit tested. Then, in step 2206, the computer instructions produced by recompiling are assembled into executables which are then combined to produce the application or system. Then, in a series of steps 2208-2210, each of a large number n of tests are applied to the system in order to verify the system. Following testing, additional logic not shown in FIG. 22A may be involved in informing the developer or a system administrator of test failures, making the source code changes permanent or bifurcating a revision-control path, and other automated application-release-management operations that follow successful testing.

In many cases, the code changes checked in in step 2202 are relatively modest. For example, the code changes may affect only a single routine or a handful of routines. However, in conventional and currently available automated application-release-management systems, all of the tests that have been developed to test the application or system are run, even when many of these tests do not invoke routines that were modified by the code changes checked in step 2202. This represents a significant and unnecessary temporal and computational-resource inefficiency with respect to the check-in process as well as with respect to the entire automated application-release-management system, since an automated application-release-management system may carry out, in parallel, many different types of operations on many different managed applications and system, an inefficient check-in and subsequent system testing may impact all concurrently executing workflows within the automated application-release-management system.

FIG. 22B illustrates the use of test optimization according to the currently disclosed methods and subsystems in order to ameliorate the unnecessary temporal and computational-resource overheads attendant with exhaustive testing following check-in of modest code changes. In step 2240, a developer checks in code changes as well as a file indicating the differences between the current source code and the routines being checked in, represented in FIG. 22B by the symbol Δ 2242. In step 2244, the code changes are added to the source code and the affected compilation units are recompiled. A list of modified routines is generated from the submitted differences between the checked-in code and the current source code. In step 2246, the recompiled compilation units are unit tested. In step 2248, the application or system is built to incorporate the recompiled compilation units. In step 2250, the currently disclosed test-optimization subsystem is called to determine, from the list of modified routines generated in step 2244, a set of relevant tests that need to be run in order to exercise the routines modified by the check-in code changes. Then, in the series of steps 2252-2254, only the determined relevant tests are run, rather than running all of the tests, as in the current and conventional automated application-release-management systems illustrated in steps 2208-2210 of FIG. 22A. As shown in FIG. 22B, only m relevant tests are run for the checked-in code changes, where in is generally much small than the total number of tests n that have been developed for system verification.

Figure 23:
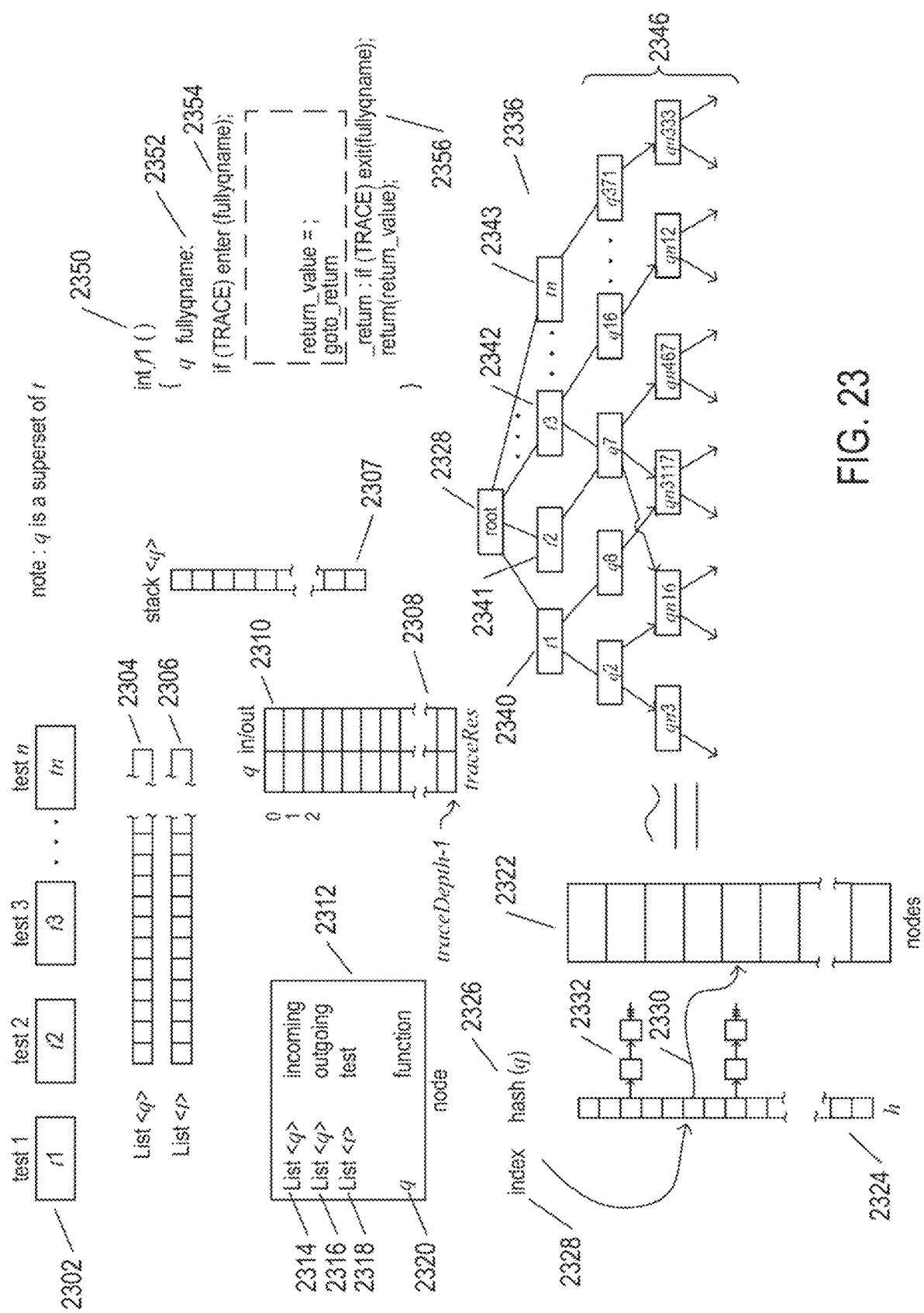
FIG. 23 illustrates the data structures and information used in an implementation, discussed below, of the method and subsystem that determines relevant tests to apply to a revised application or system, discussed above with reference to step 2250 in FIG. 22B.

FIG. 23 illustrates the data structures and information used in an implementation, discussed below, of the method and subsystem that determines relevant tests to apply to a revised application or system, discussed above with reference to step 2250 in FIG. 22B. First, there are n tests 2302 each associated with an identifier or unique name, $t_1, t_2, t_3, \ldots t_n$. In FIG. 23, the symbol q is used to represent fully qualified function and routine names, discussed above with reference to FIG. 21A, and the symbol t is used, in certain contexts, to represent the product of applying the function q( ) to a test name or identifier. In this case, application of the function q( ) to a test name or test identifier simply produces a corresponding unique name for a test that has the same format and encoding as fully qualified routine and function names.

The list data structure 2304 is used to contain lists of fully qualified function and routine names and test names or test identifiers having the same format as fully qualified routine and function names. The list data structure 2306 is used to contain lists of test names or test identifiers having the same format as fully qualified routine and function names. These lists may be implemented in a variety of different ways, including as arrays or as linked lists, and support normal list operations, including accessing list members by index or by traversal, adding and deleting list members, and other such operations. The stack data structure 2307 is used to contain fully qualified function and routine names and test names or test identifiers having the same format as fully qualified routine and function names. The stack data structure supports normal stack operations, including push( ) and pop( ) The traceRes data structure 2308 is a two-dimensional array indexed from 0 to traceDepth, each indexed entry, such as entry "0" 2310, including a fully qualified function name or routine name, or other names having the same format as a fully qualified function name or routine name, as well as one of two possible indications: in and out. The traceRes data structure is used to store entry and exit messages produced by executing functions and routines when each of the n tests 2302 are applied to a system or application.

The node data structure 2312 is associated with each function or routine in a system or application, including both entry point and internal functions and routines. The node data structure 2312 encapsulates information needed to construct a graph, similar to graph 2150 discussed above with reference to FIG. 21C, of the various execution paths through the application or system routines and functions during application of the n test routines. The node data structure includes a first list 2314 of the fully qualified function and routine names of routines that call the function or routine represented by the node, a second list 2316 that includes the fully qualified names of functions and routines called by the function and routine represented by the node, and a third list 2318 of the names or identifiers of those tests that, when applied to the system or application, result in the function or routine represented by the node being called at least once. The node data structure also includes the fully qualified name of the function or routine represented by the node 2320. As discussed below, nodes represent both the entry points and internal functions and routines of the system and application as well as a special root node and first-level nodes that represent the n tests 2302. The nodes are stored in an array or list of nodes 2322 that are indexed, through a hash table h 2324, by the fully qualified function or routine name 2320 contained within the node. Thus, to access a particular node in the nodes list or array 2322, a hash function 2326 is applied to a fully qualified function or routine name to generate an index 2328. That index is then used to access either a reference to the node 2330 or a reference to a collision list 2332, each entry of which contains a reference to a node in the array nodes. The array nodes essentially includes an encoding of an execution-path tree 2336, similar to the execution-path tree 2150 discussed above with reference to FIG. 21C. This tree, also referred to as an "execution-trace tree" or "trace tree," contains a single root node 2328, first-level nodes 2340-2343, each corresponding to one of the n tests 2302, and additional layers of nodes 2346 that represent each of the entry point and internal routines and functions that are executed as a result of application of the n tests to the system or application. The information contained in the nodes array is obtained during execution of each of the n tests against a complete system or application built by an automated application-release-management system. Logically, this can be thought of as information produced by instrumentation inserted into each entry point and internal function or routine, as illustrated in the pseudocode 2350 for an exemplary routine ƒ1. The instrumentation includes a fully qualified name for the routine 2352, a conditional call to an enter function 2354, and a conditional call to an exit function 2356. When the global variable TRACE has the Boolean value true, then, whenever the function is called, the instrumentation function enter is called, before any of the actual function code, to place an entry into the traceRes data structure 2308 of type in. Whenever the routine exits, and the TRACE global variable has the Boolean value true, the exit routine 2356 is called to place an entry of type out in the traceRes data structure 2308. Thus, once all the tests have been run, a complete trace of all of the routines and functions invoked by the tests is entered into the traceRes data structure. Note that, in the implementation discussed below, the traceRes data structure is populated, used, and then re-initialized to an empty state during application of each test, rather than accumulating the trace results for all of the tests prior to use. It should also be noted that, rather than incrementing routines and functions, as indicated by pseudocode 2350, more efficient methods can be used to generate trace information during execution of application or system entry points. These may involve trapping routine calls and routine exits at the hypervisor or operating-system level during execution of system or application functions and entering traceRes entries into the traceRes data structure by operating system or hypervisor trap handlers. Many other techniques can be used, as well. Clearly, use of such techniques is generally preferred to laborious instrumentation of source code.

Figure 24:
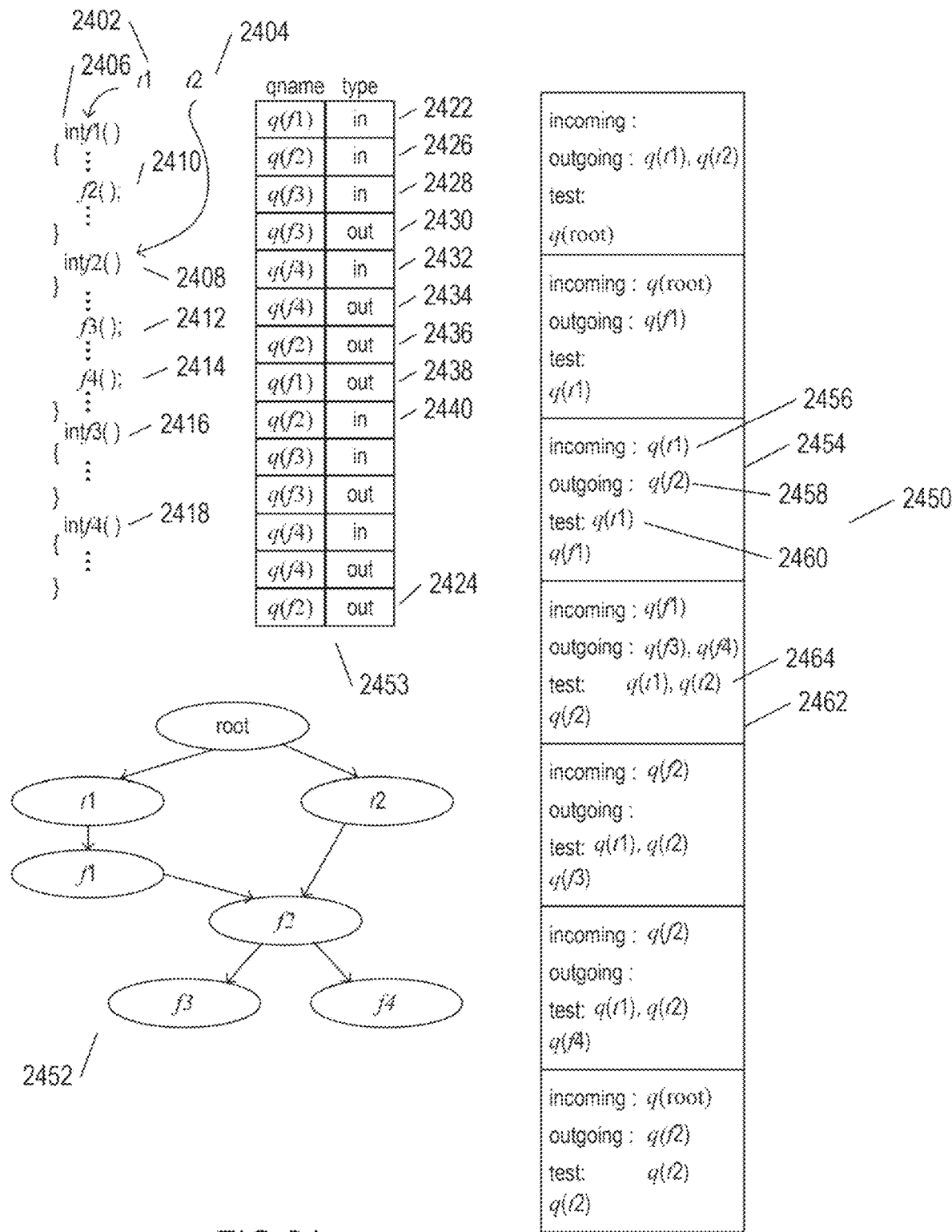
FIG. 24 shows a simple example of determination of an execution-trace tree (2336 in FIG. 23) obtained by running two tests against an application or system.

FIG. 24 shows a simple example of determination of an execution-trace tree (2336 in FIG. 23) obtained by running two tests against an application or system. The first test $t_1$ 2402 and second $t_2$ 2404 call entry-point routines ƒ1 2406 and ƒ2 2408, respectively. Entry point function ƒ1 calls entry point function ƒ2 2410. Entry point function ƒ2 calls internal functions ƒ3 and ƒ4 2412 and 2414. Internal functions ƒ3 and ƒ4 2416 and 2418 do not call other internal functions. The traceRes data structure 2420 produced by executing tests $t_1$ and $t_2$ includes 14 entries ordered from first 2422 to last 2424. The first entry 2422 corresponds to the call to entry-point function ƒ1 by test $t_1$. The second entry 2426 is produced when function ƒ2 is called by function ƒ1 2410. The third entry 2428 is produced when function ƒ3 is called by function ƒ2 2412. The fourth entry 2430 is produced when function ƒ3 returns. The fifth entry 2432 is produced when function ƒ4 is called by function ƒ2 2414. The sixth entry 2434 is produced when function ƒ4 returns. The next entry 2436 is produced when function ƒ2 returns and the following entry 2438 is produced when function ƒ1 returns. Entry 2440 is produced when function ƒ2 is called by test $t_2$ and the remaining entries in the traceRes data structure are produced in similar fashion to entries 2430-2436. The traceRes data structure 2420 can then be processed to produce the nodes shown in FIG. 24 within the nodes data structure 2450. This process is described below with reference to a number of control-flow diagrams. This information is sufficient to generate an execution-trace tree 2452 for execution of tests $t_1$ and $t_2$. For example, node 2454 represents entry-point function ƒ1 2406. This entry point function is called by a test $t_1$ 2456 and calls function ƒ2 2458. It is only called by the first test $t_1$ 2460.

The information contained in the nodes array 2450 is also sufficient to determine the relevant tests needed to be applied to a rebuilt system or application, discussed above with reference to step 2250 in FIG. 22B. The node data structure for any routine that is modified and checked in can be quickly found by hashing, as discussed above with reference to FIG. 23. That node contains a list of all the tests that, when run, result in the function or routine corresponding to the node being called. For example, node 2462, which represents routine ƒ3, includes the list of tests 2464 that indicates that function ƒ3 is executed when both tests $t_1$ and $t_2$ are called. Thus, the set of unique test names or identifiers produced as the union of the lists of tests in nodes corresponding to modified routines is the set of relevant tests to be applied to a system or application following rebuilding of the system or application.

Figure 25A:
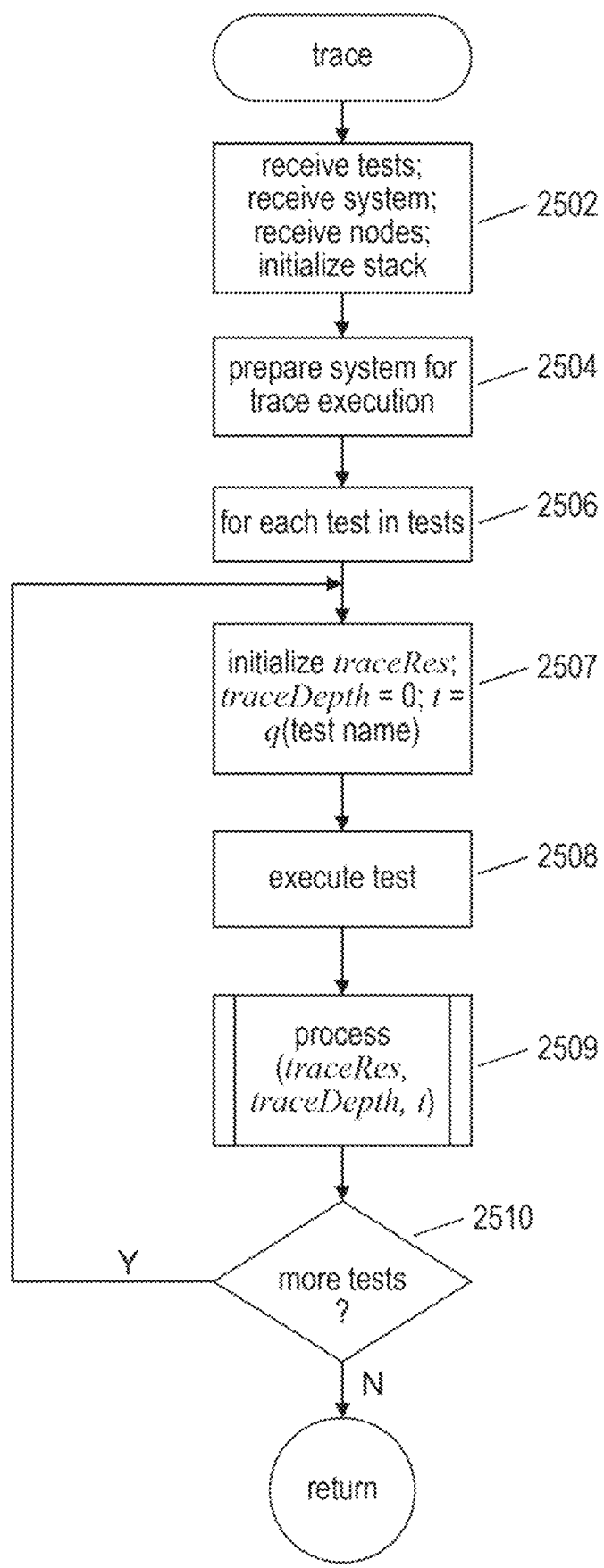
Figure 25C:
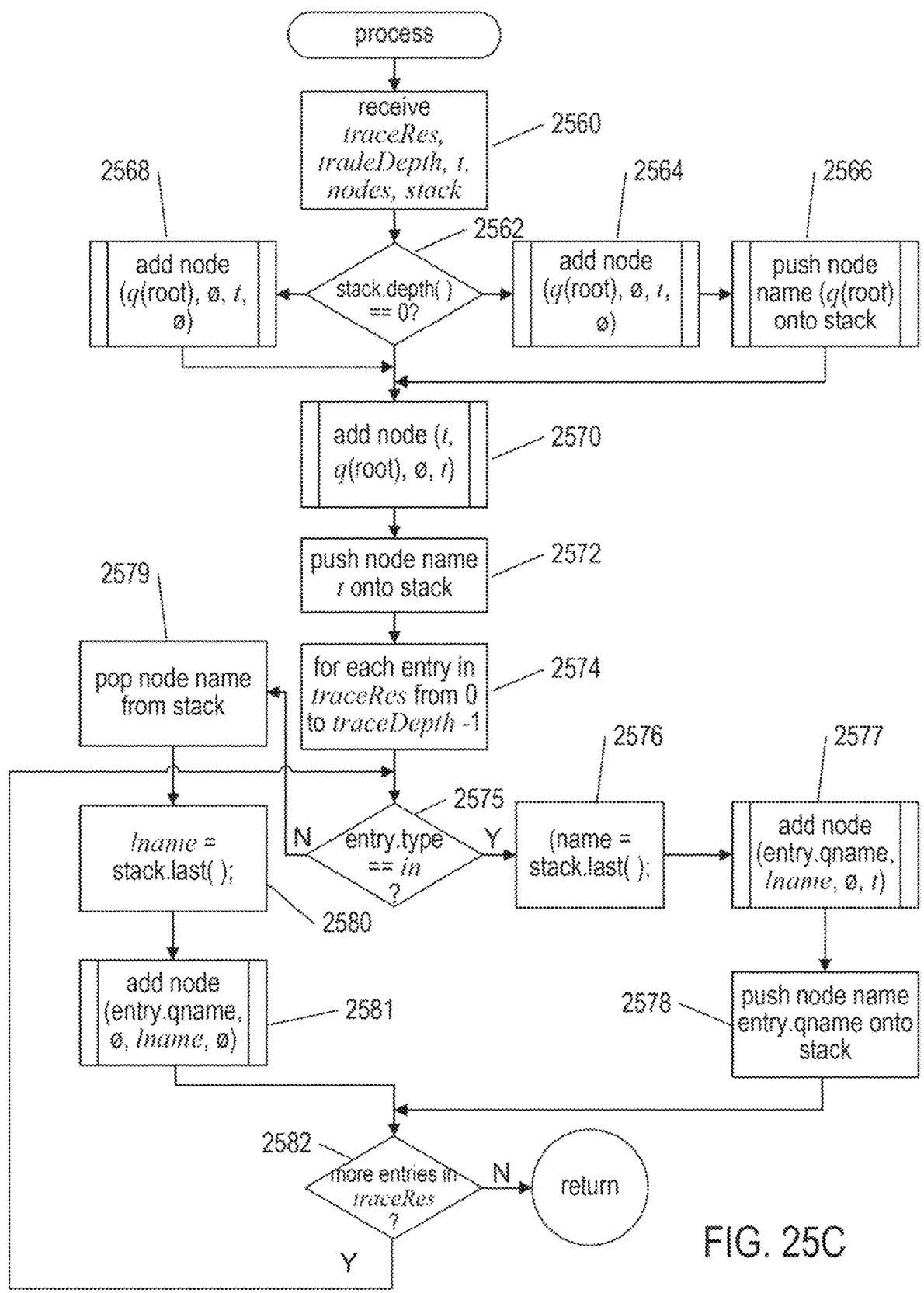

FIGS. 25A-C provide control-flow diagrams that illustrate one implementation of a method that converts the contents of a traceRes data structure (2308 in FIG. 23), generated during execution of multiple tests against a system or application, into a set of node data structures (2312 and 2322 in FIG. 23) that contain information equivalent to an execution-trace tree (2336 in FIG. 23). FIG. 25A provides a control-flow diagram for the routine "trace," which carries out the conversion of traceRes entries to a nodes set or list. In step 2502, the routine "trace" receives a reference to the set of n tests developed for testing a system or application and a reference to the system or application to be tested. In addition, the routine trace receives a reference to an initialized and empty nodes data structure that the routine "trace" populates with data obtained by processing the contents of a traceRes data structure. Finally, in step 2502, the routine "trace" initializes a stack data structure (2307 in FIG. 23). In step 2504, the routine "trace" prepares the system, application, and/or execution environment to collect trace information when the tests are executed. As discussed above, this may involve setting the value of a global variable to invoke instrumentation within routines and functions, initializing trace data collection by an operating system or hypervisor providing the execution environment for the tests and system or application, or by various alternative tracing methodologies. In the for-loop of steps 2506-2510, the routine "trace" iteratively executes each of the tests against the system or application. In step 2507, the routine "trace" initializes or re-initializes the traceRes data structure and generates a test name or test ID t having the formatting and encoding of fully qualified routine and function names. In step 2508, the currently considered test is executed, resulting in collection of trace entries in the traceRes data structure, as discussed above with reference to FIGS. 23 and 24. In step 2509, the routine "process" is called to process the collected traceRes entries. When the for-loop finishes, information is stored in the nodes data structure that, as discussed above with reference to FIG. 24, is equivalent to an execution-trace tree.

FIG. 25B provides a control-flow diagram for a routine "add node." This routine either adds a new node to the nodes data structure or updates the contents of an existing node. Thus, a more descriptive name for the routine would be "add or update node," but, for the sake of brevity, it is simply called "add node." In step 2520, the routine "add node" receives four fully qualified routine or function names, which may include test names or IDs having the same format and encoding of fully qualified function and routine names: (1) node_name, the function or routine associated with the node; (2) in, a routine that calls the routine associated with the node; (3) out, a routine called by the function or routine associated with the node; and (4) a test name or ID that has invoked the routine or function represented by the node. In step 2522, the received node name node_name is hashed to index the hash table h in order to find a reference to a node in the nodes data structure identified by the node name node_name. When an existing node is found, as determined in step 2524, then, for each of the received fully qualified function or routine names in, out, and test-name that are non-null, the test or routine name is added to a corresponding list within the found node data structure. When the argument in is not null and is not already a member of the incoming list of the node, as determined in step 2526, the function or routine name received in the in argument is added to the incoming list of the found node in step 2528. Similarly, when the function or routine name received in the out argument is not null and not already contained in the outgoing list of the found node, as determined in step 2530, the function or routine name is added to the outgoing list in step 2532 and when the test name or ID received in the test_name argument is not null and is not already contained in the test list within the found node, as determined in step 2534, the test name is added to the test list of the found node in step 2536. Otherwise, when access through the hash table in step 2522 fails to find an existing node in the nodes data structure, as determined in step 2524, then, in step 2540, a new node is created and a reference to the new node is added to the hash table in step 2542. Then, in steps 2544-2548, any non-null node names in the received arguments in, out, and test name are added to the new node in similar fashion to already discussed steps 2526, 2528, 2530, 2532, 2534, and 2536.

FIG. 25C provides a control-flow diagram for the routine "process," called in step 2509 of FIG. 25A. In step 2560, the routine "process" receives references to the re-initialized or initialized traceRes data structure, the name of a test, t, just executed against the system or application, a reference to the nodes data structure, and a reference to the stack data structure. When the depth of the stack is 0, as determined in step 2562, then a new node is added to the nodes array to represent the root of the execution-trace tree, in step 2564, and the name for that node is pushed onto the stack in step 2566. Otherwise, when the root node already exists in the stack, it is updated, in step 2568, to add the name of the just-executed test to the outgoing list of the root node. Next, in step 2570, the routine "process" adds a new test node for the just-executed test in the nodes array and, in step 2572, pushes the name of the test onto the stack. Finally, in the for-loop of steps 2574-2582, the routine "process" processes each entry in the traceRes data structure from the 0th entry to the entry indexed by the value traceDepth-1. For each entry, the type of entry is determined in step 2575. When the entry is an in-type entry, representing data entered into the traceRes data structure by an entry routine invoked when a routine or function is first called, then, in step 2576, the most-recently stacked routine or function name is obtained, in step 2576, from the stack data structure and used to add a new node or update an existing node corresponding to the node name in the currently considered traceRes entry, in step 2577. In step 2578, the name for the new or updated node is then pushed onto the stack. When the currently considered traceRes entry is of the type out, having been entered by a call to the exit function or function exits, the last name is popped from the stack in step 2579 and the name of the remaining last-stacked name in the stack is obtained in step 2580. Then, in step 2581, the node corresponding to the currently considered traceRes entry is updated to include the name accessed from the stack in step 2580 in its outgoing list. The for-loop of steps 2574-2582 continues to iterate and process each of the traceRes entries until there are no more entries to process, as determined in step 2582.

Figure 26:
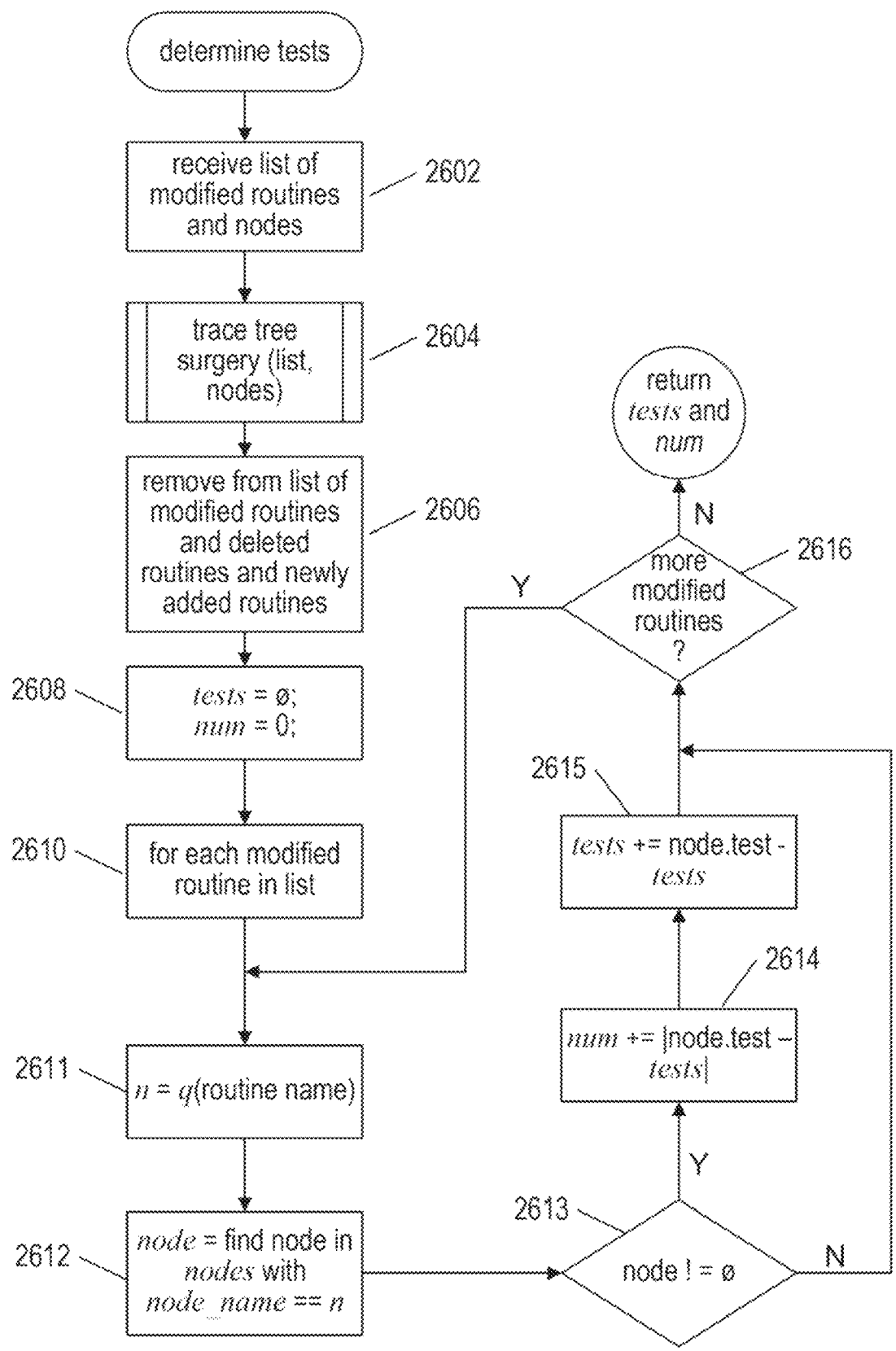
FIG. 26 provides a control-flow diagram for the routine "determine tests" which uses a nodes data structure and a list of modified routines recently checked in through an automated application-release-management system to determine the relevant tests that need to be executed in order to verify the rebuilt system or application, as discussed above with reference to step 2250 in FIG. 22B.

FIG. 26 provides a control-flow diagram for the routine "determine tests" which uses a nodes data structure and a list of modified routines recently checked in through an automated application-release-management system to determine the relevant tests that need to be executed in order to verify the rebuilt system or application, as discussed above with reference to step 2250 in FIG. 22B. In step 2602, the routine "determine tests" receives a list of the modified routines and the nodes data structure. In step 2604, the routine "determine tests" calls a trace-tree-surgery routine to update the contents of the nodes data structure in the case of the checked-in source-code changes delete existing entry point and internal routines and functions, add new routines and functions, or change the calls to routines and functions from inside the modified routines. This is discussed below with reference to FIGS. 27A-C. Then, in step 2606, any deleted routines or newly added routines are removed from the list of modified routines, since deleted routines do not need to be tested and because the nodes data structure would need to be recompiled, and new tests might be needed, in certain cases, to properly address newly added routines. Note that it cannot easily be determined, by examining source code alone, from what routines and functions a particular system routine or function is called and what routines and functions are called by a particular routine or function. In step 2608, the set variable test is set to null and the variable num is set to 0. In the far-loop of steps 2610-2616, each remaining routine or function name in the modified routine and function list is considered. In step 2611, a fully qualified routine or function name is generated for the currently considered modified routine or function and, in step 2612, this fully qualified name is used to identify the corresponding node in the nodes array. When a node is found, as determined in step 2613, then the variable num is incremented by the number of tests that need to be carried out in order to exercise the currently considered modified routine or function and the names identified for those tests are added to the tests set variable in step 2615. Note that the notation "node.test-tests" means the test names or IDs in the list test within the node that do not already appear in the set of tests stored in the set variable tests. This is a set produced by a set difference, and the cardinality of this set is the number of new tests added to the tests set variable.

Figure 27A:
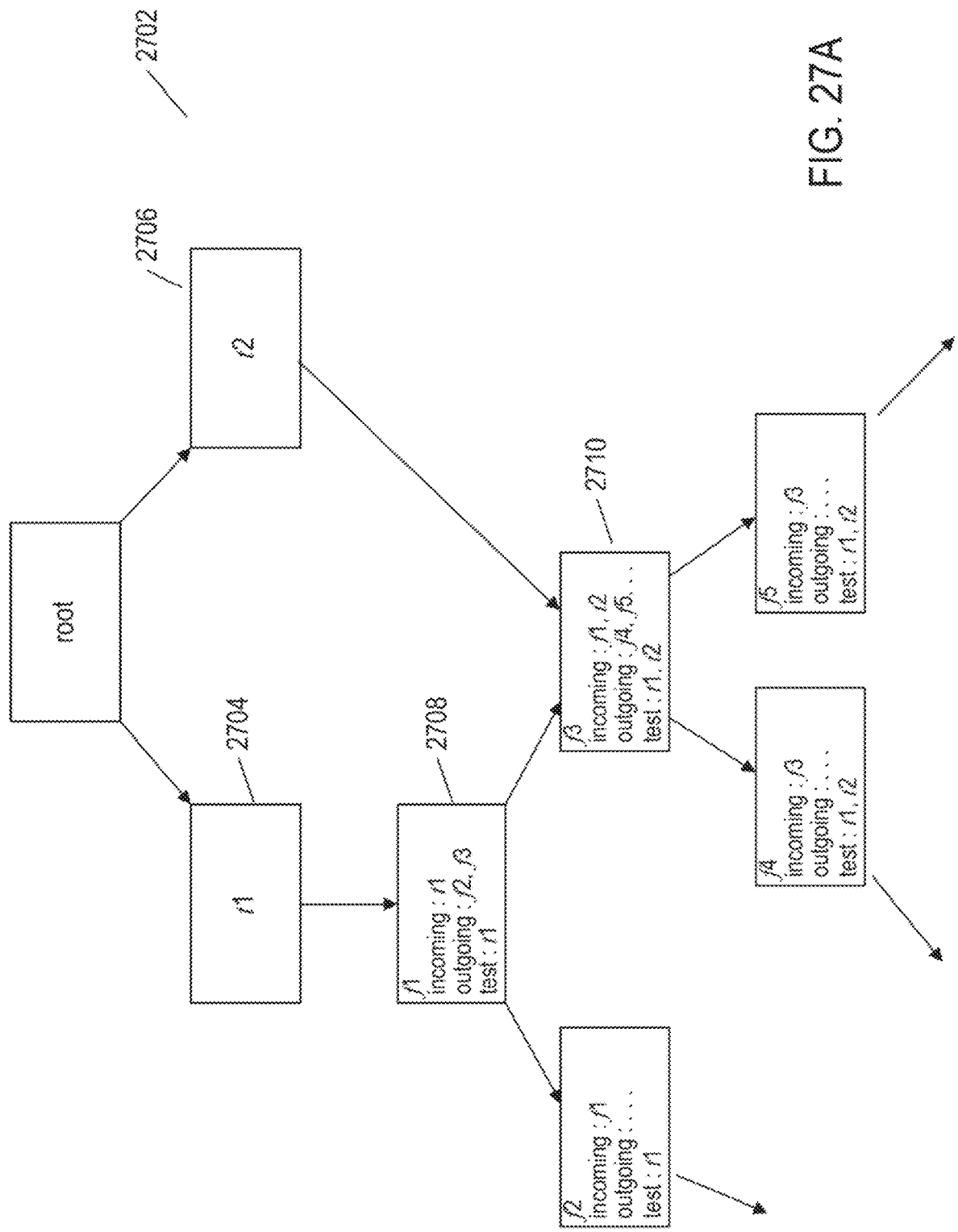
FIGS. 27A-C illustrate an example of the types of update operations that may be carried out by the routine "trace tree surgery" called in step 2604 of FIG. 26.
Figure 27B:
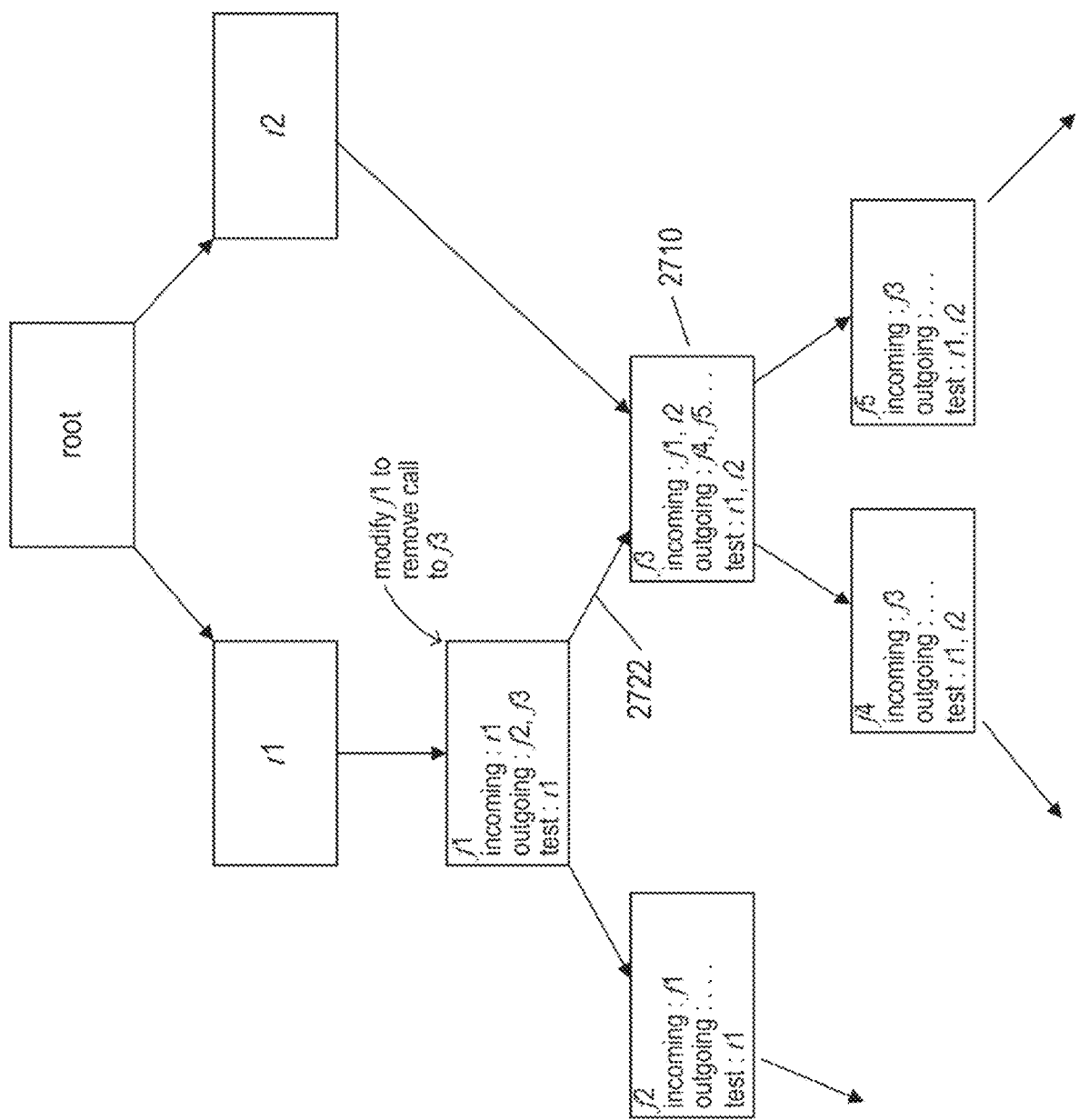
Figure 27C:
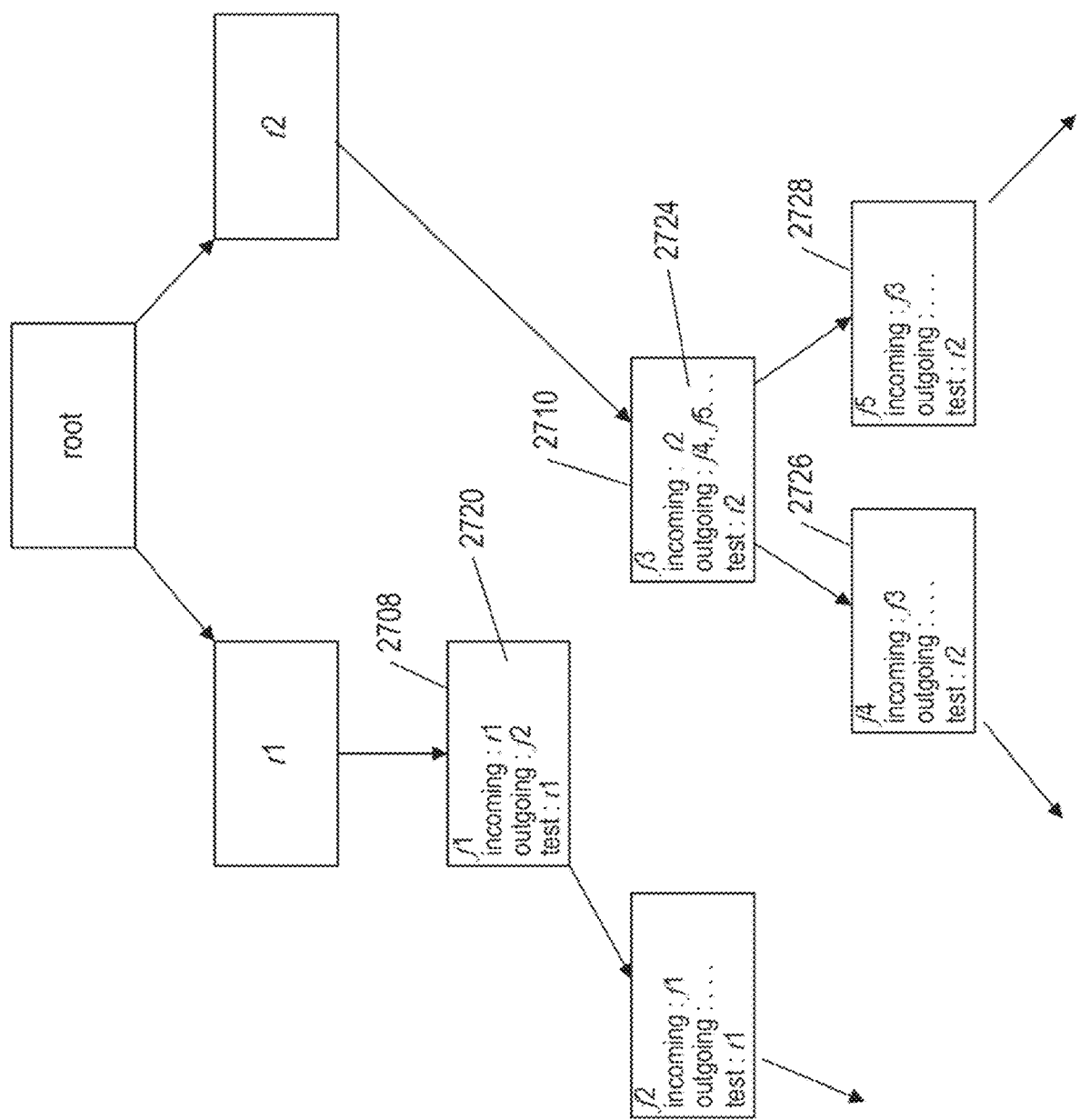

FIGS. 27A-C illustrate an example of the types of update operations that may be carried out by the routine "trace tree surgery" called in step 2604 of FIG. 26. FIG. 27 provides a portion of an execution-trace tree. The execution-trace tree 2702 includes two test nodes 2704 and 2706. Test t1 2704 calls entry point routine ƒ1 2708 and test t2 calls entry point routine ƒ3 2710. As shown in FIG. 27B, a developer may check in a modified ƒ1 routine that no longer calls the function ƒ3. Because the call to ƒ3 has been deleted, it is possible to modify the execution-trace tree, as shown in FIG. 27C, to update the execution-trace tree to reflect the modification of entry point routine ƒ1. As can be seen by comparing FIG. 27C to 27B, the outgoing list 2720 of the node 2708 for function ƒ1 has been modified to remove the function ƒ3. The link 2722 from the node corresponding to ƒ1 to the node corresponding to ƒ3 has been removed. Test t1 has been removed from the incoming list 2724 of the node 2710 corresponding to routine ƒ3. Finally, test t1 has been removed from the test list of node 2710 and nodes 2726 and 2728 corresponding to the routines ƒ4 and ƒ5. This is but one example of many different types of update operations that may be carried out based on an analysis of the modifications made to checked-in routines. By making these modifications, the execution trace tree can continue to accurately reflect the routines invoked by each test over many check-in operations.

Although the present invention has been described in terms of particular embodiments, it is not intended that the invention be limited to these embodiments. Modifications within the spirit of the invention will be apparent to those skilled in the art. For example, any of many different implementation and design parameters may be altered to produce alternative implementations for the currently disclosed methods and subsystems, the design and implementation parameters including trace of hardware platform, operating system, programming language, modular organization, control structures, data structures, and other such design and implementation parameters. Various types of node indexing, in addition or instead of hash-style indexing may be alternatively employed. Rather than re-initializing the traceRes data structure for incrementally processing the trace results from each executed task, all of the tests may be executed prior to processing the traceRes data structure to generate the nodes data structure. Many other such changes can be made to produce alternate implementations.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A testing-optimization subsystem incorporated within an automated application-release-management system, the testing-optimization subsystem implemented as computer instructions stored in one or more computer systems each including one or more processors, that when executed, control the one or more computer systems to perform stages comprising:
   receiving a set of tests that each call one or more entry points in a system;
   preparing at least one of the system and an execution environment in which the system executes, to produce execution trace information for each routine or function executed by the tests in the set of tests; and
   performing, for each test in the set of tests, stages including:
      executing the test,
      directing trace information to a trace-information data structure,
      processing the trace information in the trace-information data structure, and
      storing the processed trace information in a nodes data structure,
   wherein the trace-information data structure includes an array of indexed entries that store entry and exit messages respectively produced by executing each routine or function executed as a result of an application of each test in the set of tests to the system, and
   wherein the nodes data structure defines a node-based representation of an execution-trace tree for the system and is configured to be implemented in source-code check-in for the system.

2. The testing-optimization subsystem of claim 1, wherein the trace information produced by each routine or function executed by the tests in the set of tests includes:
   a unique indication of the routine or function, and
   one of an indication that the trace information was produced on entering the routine or function and an indication that the trace information was produced on exiting the routine or function.

3. The testing-optimization subsystem of claim 2, wherein the unique indication of the routine or function is a fully qualified function or routine name.

4. The testing-optimization subsystem of claim 1, wherein preparing the at least one of the system and the execution environment in which the system executes comprises:
   configuring the at least one of the system and the execution environment to produce trace information when each routine or function is called, prior to each of:
      an execution of routine or function logic, and
      a termination of each routine or function following the execution of routine or function logic.

5. The testing-optimization subsystem of claim 1, wherein each node in the nodes data structure represents one of the following entities:
   a root node;
   a test in the set of tests;
   a routine implemented in one or more of the tests in the set of tests; and
   a function implemented in one or more of the tests in the set of tests.

6. The testing-optimization subsystem of claim 5,
   wherein each node in the nodes data structure includes a set of elements including:
      an incoming list of calling tests, routines, and functions that call an entity represented by the node;
      an outgoing list of called tests, routines, and functions invoked by the entity represented by the node;
      a list of tests that result in execution of the entity represented by the node; and
      a unique indication of the entity represented by the node, and
   wherein each of the set of elements for each respective node is derived from indexed entries in the trace-information data structure that correspond to the respective node.

7. The testing-optimization subsystem of claim 6, wherein the nodes data structure is indexed such that a node can be efficiently located by specifying a unique indication of a respective entity represented by the node.

8. The testing-optimization subsystem of claim 6, wherein the nodes data structure includes:
   a single root node;
   a single test node for each test of the set of tests; and
   a node for each routine and each function executed during execution of the tests in the set of tests.

9. The testing-optimization subsystem of claim 6, wherein processing the trace information in the trace-information data structure comprises:
   adding a root node to the nodes data structure; and
   performing, for each test in the set of tests, stages including:
      adding a test node to the nodes data structure, and
      performing, for each entry in the trace-information data structure, further stages including:
         determining whether a respective routine or function identified by the entry is represented in the nodes data structure, and
         one of:
            adding a node to the nodes data structure to represent the respective routine or function that is not yet represented, and updating a node in the nodes data structure that represents the respective routine or function based on the entry to include information not already added to the node.

10. A testing-optimization subsystem incorporated within an automated application-release-management system, the testing optimization subsystem implemented as computer instructions stored in one or more computer systems each including one or more processors, that when executed, control the one or more computer systems to perform stages for determining a subset of a set of tests needed to verify a system built from source code that has been modified, the stages comprising:
   receiving a list of modified routines and functions and a set of indications of tests in the set of tests in response to a source-code check-in of the system;
   initializing a test-indication accumulator set;
   performing, for each modified routine and function, stages including:
      locating a node in a nodes data structure,
      determining indications of node-associated tests, listed in the node, that invoke the modified routine or function represented by the node, and
      determining a subset of the indications of node-associated tests that are not already members of the test-indication accumulator and adding the determined subset of indications of node-associated tests to the test-indication accumulator; and
   returning the test-indication accumulator to the automated application-release-management system to cause the automated application-release-management system to execute tests indicated in the test-indication accumulator to test and verify the system,
   wherein the nodes data structure is processed from a trace-information data structure that includes an array of indexed entries that store entry and exit messages respectively produced by executing each modified routine or function and each unmodified routine or function executed as a result of an application of each test in the set of tests to the system, and
   wherein the nodes data structure defines a node-based representation of an execution-trace tree for the system and is configured to be implemented in the source-code check-in for the system.

11. The testing-optimization subsystem of claim 10, wherein each node in the nodes data structure represents one of the following entities:
   a root node;
   a test in the set of tests;
   a routine implemented in one or more of the tests in the set of tests; and
   a function implemented in one or more of the tests in the set of tests.

12. The testing-optimization subsystem of claim 11, wherein each node in the nodes data structure includes a set of elements including:
   an incoming list of calling tests, routines, and functions that call an entity represented by the node;
   an outgoing list of called tests, routines, and functions invoked by the entity represented by the node;
   a list of tests that result in execution of the entity represented by the node; and
   a unique indication of the entity represented by the node, and wherein each of the set of elements for each respective node is derived from indexed entries in the trace-information data structure that correspond to the respective node.

13. The testing-optimization subsystem of claim 10, wherein the nodes data structure is indexed such that a node can be efficiently located by specifying a unique indication of a respective entity represented by the node.

14. Computer instructions, stored in a non-transitory physical data-storage device, that when executed by one or more computer systems, control the one or more computer systems to implement a testing-optimization subsystem within an automated application-release-management system to perform stages for determining a subset of a set of tests needed to verify a system following a rebuild of the system from source code by that has been modified, the stages comprising:
   performing, for each modified routine and function, stages including:
      locating a node in a nodes data structure,
      determining indications of node-associated tests, listed in the node, that invoke the modified routine or function represented by the node,
      determining a subset of the indications of node-associated tests that are not already members of a test-indication accumulator, and
      adding the determined subset of indications of node-associated tests to the test-indication accumulator; and
   returning the test-indication accumulator to the automated application-release-management system to cause the automated application-release-management system to execute tests indicated in the test-indication accumulator to test and verify the system,
   wherein the nodes data structure is processed from a trace-information data structure that includes an array of indexed entries that store entry and exit messages respectively produced by executing each modified routine or function and each unmodified routine or function executed as a result of an application of each test in the set of tests to the system, and
   wherein the nodes data structure defines a node-based representation of an execution-trace tree for the system and is configured to be implemented in a source-code check-in for the system.

15. The computer instructions of claim 14, wherein each node in the nodes data structure represents one of the following entities:
   a root node;
   a test;
   a routine implemented in one or more of the tests in the set of tests; and
   a function implemented in one or more of the tests in the set of tests.

16. The computer instructions of claim 15,
wherein each node in the nodes data structure includes a set of elements including:
   an incoming list of calling tests, routines, and functions that call an entity represented by the node;
   an outgoing list of called tests, routines, and functions invoked by the entity represented by the node;
   a list of tests that result in execution of the entity represented by the node; and
   a unique indication of the entity represented by the node, and wherein each of the set of elements for each respective node is derived from indexed entries in the trace-information data structure that correspond to the respective node.

17. The computer instructions of claim 15, wherein the nodes data structure is indexed such that a node can be efficiently located by specifying a unique indication of a respective entity represented by the node.

18. The computer instructions of claim 14, the stages further comprising:
   receiving the set of tests, that each call one or more entry points in the system;
   preparing at least one of the system and an execution environment in which the system executes, to produce execution trace information for each routine or function executed by the tests in the set of tests; and
   performing, for each test in the set of tests, stages including:
      executing the test,
      directing trace information to the trace-information data structure,
      processing the trace information in the trace-information data structure, and
      storing the processed trace information in the nodes data structure.

19. The computer instructions of claim 18, wherein the trace information produced by each routine or function executed by the tests in the set of tests includes:
   a unique indication of the routine or function, and
   one of an indication that the trace information was produced on entering the routine or function and an indication that the trace information was produced on exiting the routine or function.

20. The computer instructions of claim 18, wherein the processing the trace information in the trace-information data structure comprises:
   adding a root node to the nodes data structure; and
   performing, for each test in the set of tests, stages including:
      adding a test node to the nodes data structure, and
      performing, for each entry in the trace-information data structure, further stages including:
         determining whether a respective routine or function identified by the entry is represented in the nodes data structure, and
         one of:
            adding a node to the nodes data structure to represent the respective routine or function that is not yet represented, and
            updating a node in the nodes data structure that represents the respective routine or function based on the entry to include information not already added to the node.

* * * * *